United States Patent
Jennings

(10) Patent No.: US 11,675,906 B1
(45) Date of Patent: Jun. 13, 2023

(54) SIMULTANEOUS MULTI-PROCESSOR (SIMULPRO) APPARATUS, SIMULTANEOUS TRANSMIT AND RECEIVE (STAR) APPARATUS, DRAM INTERFACE APPARATUS, AND ASSOCIATED METHODS

(71) Applicant: QSigma, Inc., Sunnyvale, CA (US)

(72) Inventor: Earle Jennings, Santa Fe, NM (US)

(73) Assignee: QSIGMA, INC., Denton, TX (US)

( * ) Notice: Subject to any disclaimer, the term of this patent is extended or adjusted under 35 U.S.C. 154(b) by 0 days.

(21) Appl. No.: 16/680,899

(22) Filed: Nov. 12, 2019

Related U.S. Application Data

(62) Division of application No. 16/154,293, filed on Oct. 8, 2018, now Pat. No. 10,474,822.

(Continued)

(51) Int. Cl.
  *G06F 21/57* (2013.01)
  *G06F 21/71* (2013.01)
  *G06F 15/80* (2006.01)

(52) U.S. Cl.
  CPC .............. *G06F 21/57* (2013.01); *G06F 21/71* (2013.01); *G06F 15/8053* (2013.01); *G06F 2221/034* (2013.01)

(58) Field of Classification Search
  CPC ............................ G06F 21/57; G06F 9/30036
  See application file for complete search history.

(56) References Cited

U.S. PATENT DOCUMENTS

| | | | |
|---|---|---|---|
| 4,371,931 A * | 2/1983 | Catiller | G06F 9/30043 712/248 |
| 7,430,655 B2 * | 9/2008 | Hansen | G06F 9/30014 712/220 |

(Continued)

OTHER PUBLICATIONS

Snapshot relevant parts of the Institute for Electrical and Electronic Engineering (IEEE) P802.3bs 200Gb/s and 400 Gb/s Ethernet Task Force url: https://www.ieee802.org/3/bs/ whose last update occurred Jan. 15, 2018. This snapshot shows the print to file of the web page and a second frame showing the objectives of the Task Force approved Mar. 17, 2016 showing that both 200 Gb/s and 400 Gb/s physical transports was to specified.

(Continued)

*Primary Examiner* — Michael J Metzger
(74) *Attorney, Agent, or Firm* — Earle Jennings

(57) ABSTRACT

Infection by viruses and rootkits from data memory devices, data messages and data operations are rendered impossible by construction for the Simultaneous Multi-Processor (SiMulPro) cores, core modules, Programmable Execution Modules (PEM), PEM Arrays, STAR messaging protocol implementations, integrated circuits (referred to as chips herein), and systems composed of these components. Greatly improved energy efficiency is disclosed. A system implementation of an Application Specific Integrated Circuit (ASIC) communicating with a DRAM controller interacting with a DRAM array is presented with this resistance to virus and rootkit infection, and simultaneously capable of 1 Teraflop (Tflop) FP16, 1 TFlop FP32 and 1 Tflop FP64 performance while accessing 1 Tbyte of DRAM with a power budget comparable to today's desktop or notebook computers accessing 8 Gbytes of DRAM. Innovations to the STAR communication apparatus will enable the optical communication between chips to carry at least ½ Tbit/second data to and from DRAMs, and each other.

20 Claims, 36 Drawing Sheets

Related U.S. Application Data

(60) Provisional application No. 62/742,417, filed on Oct. 7, 2018, provisional application No. 62/696,315, filed on Jul. 10, 2018, provisional application No. 62/595,583, filed on Dec. 6, 2017, provisional application No. 62/582,282, filed on Nov. 6, 2017, provisional application No. 62/569,566, filed on Oct. 8, 2017.

(56) References Cited

U.S. PATENT DOCUMENTS

| | | | | |
|---|---|---|---|---|
| 2007/0219771 A1* | 9/2007 | Verheyen | G06F 30/33 | 703/15 |
| 2007/0266223 A1* | 11/2007 | Nguyen | G06F 9/38 | 712/25 |
| 2008/0133889 A1* | 6/2008 | Glew | G06F 9/3875 | 712/214 |
| 2009/0240895 A1* | 9/2009 | Nyland | G06F 9/3851 | 711/149 |
| 2010/0077259 A1* | 3/2010 | Inoue | G06F 11/277 | 714/45 |
| 2011/0078690 A1* | 3/2011 | Fahs | G06F 9/30087 | 718/102 |
| 2012/0017062 A1* | 1/2012 | Goel | G06F 9/3851 | 711/170 |
| 2012/0203814 A1* | 8/2012 | Jennings | G06F 9/3001 | 708/517 |
| 2013/0117541 A1* | 5/2013 | Choquette | G06F 9/3851 | 712/214 |
| 2013/0232322 A1* | 9/2013 | Fetterman | G06F 9/3887 | 712/225 |
| 2017/0019142 A1* | 1/2017 | Mitsuishi | G06F 13/385 | |
| 2017/0185406 A1* | 6/2017 | Lu | G06F 9/3887 | |
| 2018/0020476 A1* | 1/2018 | Aijaz | G06F 13/385 | |

OTHER PUBLICATIONS

IEEE Standard for Ethernet Amendment 3: Media Access Control Parameters for 50 Gb/s and Physical layers and Management parameters for 40 Gb/s, 100 Gb/s and 200 Gb/s Operations, sponsored by LAN/MAN Standards Committee of the IEEE Computer Society, pp. 1-10. This excerpt shows that only the 200 Gb/s physical transport specification was actually finalized.

* cited by examiner

Fig. 3A

| 1st Local process index 352 | → | 1st Inst 0 | 1st Inst 1 | 1st Inst 2 | 1st Inst 3 | 1st Inst 4 | 1st Inst 5 | 1st Inst 6 | 1st Inst 7 |

| 2nd Local process index 354 | → | 2nd Inst 0 | 2nd Inst 1 | 2nd Inst 2 | 2nd Inst 3 | 2nd Inst 4 | 2nd Inst 5 | 2nd Inst 6 | 2nd Inst 7 |

Fig. 3B

| 1st Inst 0 | 2nd Inst 0 | 1st inst 2 | 2nd Inst 0 | 1st inst 4 | 2nd Inst 0 | 1st inst 6 | 2nd Inst 0 |
|---|---|---|---|---|---|---|---|
| 1st Inst 0 | 2nd Inst 1 | 1st inst 2 | 2nd Inst 1 | 1st inst 4 | 2nd Inst 1 | 1st inst 6 | 2nd Inst 1 |
| 1st Inst 0 | 2nd Inst 2 | 1st inst 2 | 2nd Inst 2 | 1st inst 4 | 2nd Inst 2 | 1st inst 6 | 2nd Inst 2 |
| 1st Inst 0 | 2nd Inst 3 | 1st inst 2 | 2nd Inst 3 | 1st inst 4 | 2nd Inst 3 | 1st inst 6 | 2nd Inst 3 |
| 1st Inst 0 | 2nd Inst 4 | 1st inst 2 | 2nd Inst 4 | 1st inst 4 | 2nd Inst 4 | 1st inst 6 | 2nd Inst 4 |
| 1st Inst 0 | 2nd Inst 5 | 1st inst 2 | 2nd Inst 5 | 1st inst 4 | 2nd Inst 5 | 1st inst 6 | 2nd Inst 5 |
| 1st Inst 0 | 2nd Inst 6 | 1st inst 2 | 2nd Inst 6 | 1st inst 4 | 2nd Inst 6 | 1st inst 6 | 2nd Inst 6 |
| 1st Inst 0 | 2nd Inst 7 | 1st inst 2 | 2nd Inst 7 | 1st inst 4 | 2nd Inst 7 | 1st inst 6 | 2nd Inst 7 |

| 1st inst 1 | 2nd Inst 0 | 1st inst 3 | 2nd Inst 0 | 1st inst 5 | 2nd Inst 0 | 1st inst 7 | 2nd Inst 0 |
|---|---|---|---|---|---|---|---|
| 1st inst 1 | 2nd Inst 1 | 1st inst 3 | 2nd Inst 1 | 1st inst 5 | 2nd Inst 1 | 1st inst 7 | 2nd Inst 1 |
| 1st inst 1 | 2nd Inst 2 | 1st inst 3 | 2nd Inst 2 | 1st inst 5 | 2nd Inst 2 | 1st inst 7 | 2nd Inst 2 |
| 1st inst 1 | 2nd Inst 3 | 1st inst 3 | 2nd Inst 3 | 1st inst 5 | 2nd Inst 3 | 1st inst 7 | 2nd Inst 3 |
| 1st inst 1 | 2nd Inst 4 | 1st inst 3 | 2nd Inst 4 | 1st inst 5 | 2nd Inst 4 | 1st inst 7 | 2nd Inst 4 |
| 1st inst 1 | 2nd Inst 5 | 1st inst 3 | 2nd Inst 5 | 1st inst 5 | 2nd Inst 5 | 1st inst 7 | 2nd Inst 5 |
| 1st inst 1 | 2nd Inst 6 | 1st inst 3 | 2nd Inst 6 | 1st inst 5 | 2nd Inst 6 | 1st inst 7 | 2nd Inst 6 |
| 1st inst 1 | 2nd Inst 7 | 1st inst 3 | 2nd Inst 7 | 1st inst 5 | 2nd Inst 7 | 1st inst 7 | 2nd Inst 7 |

Fig. 4

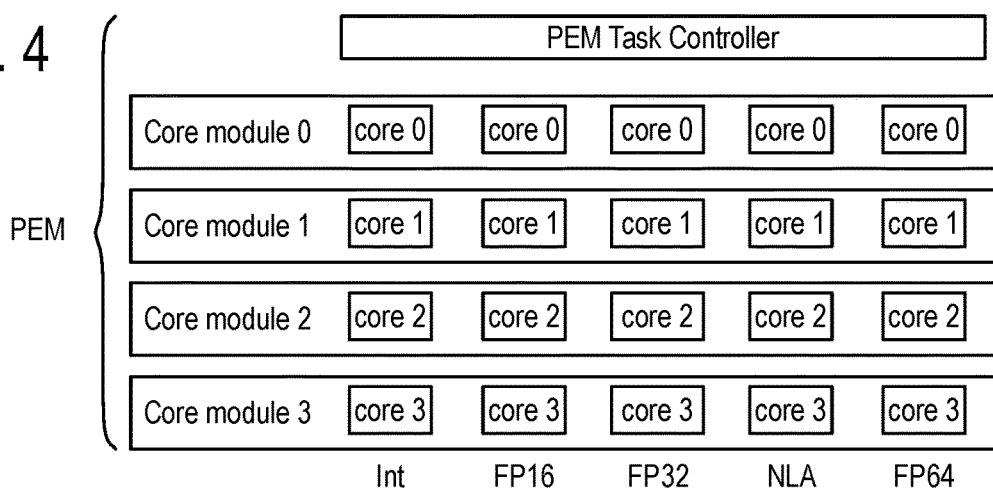

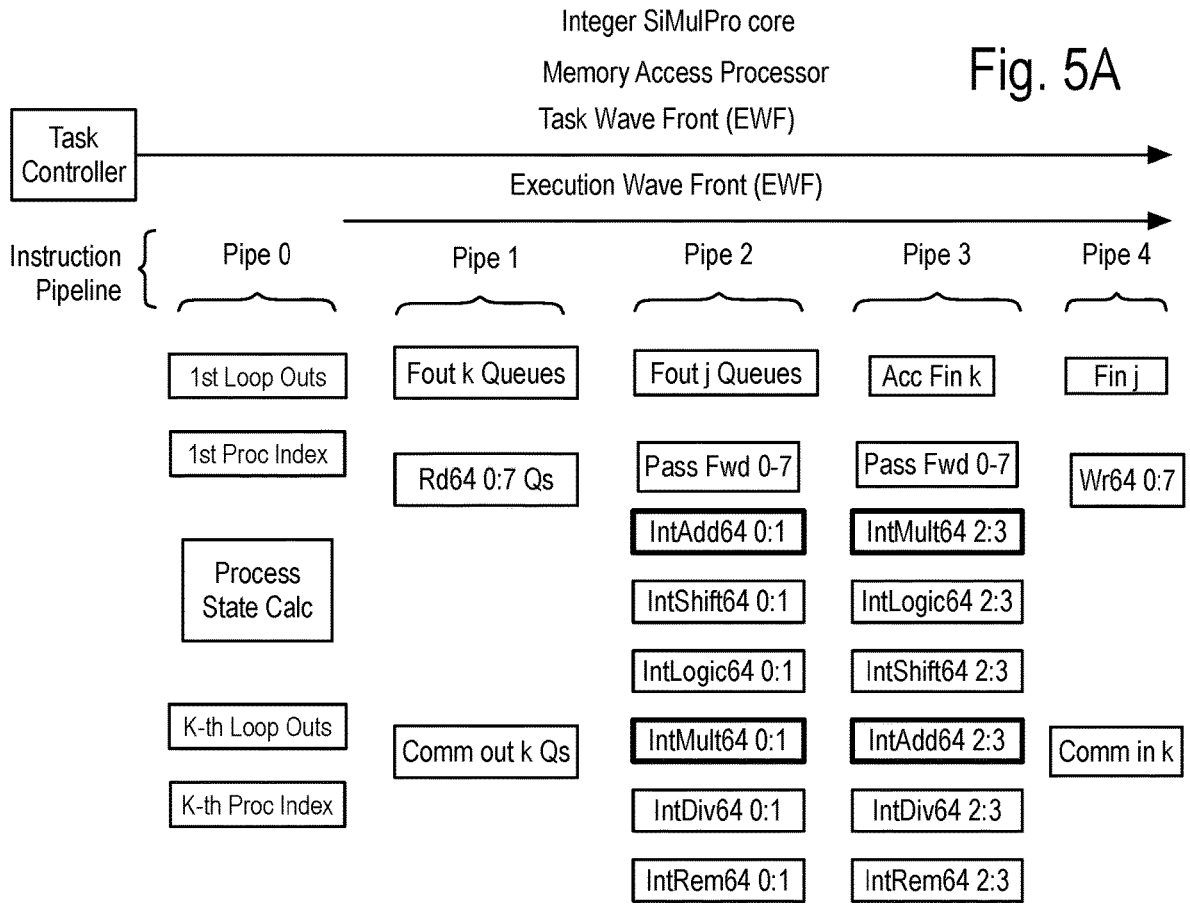
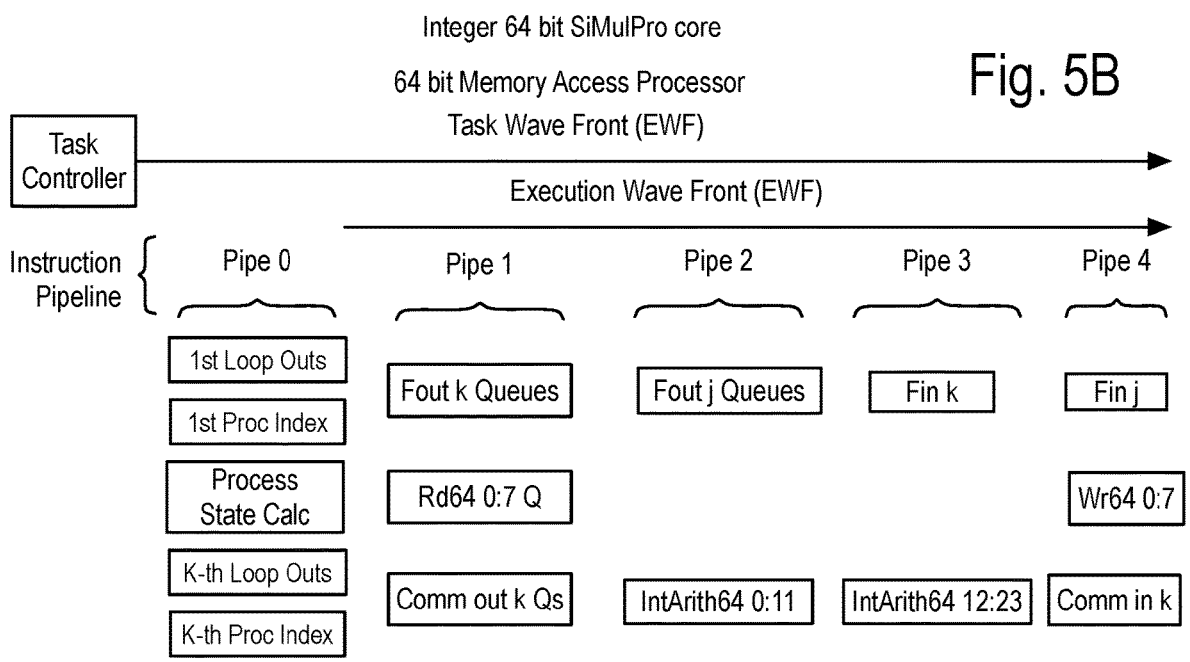

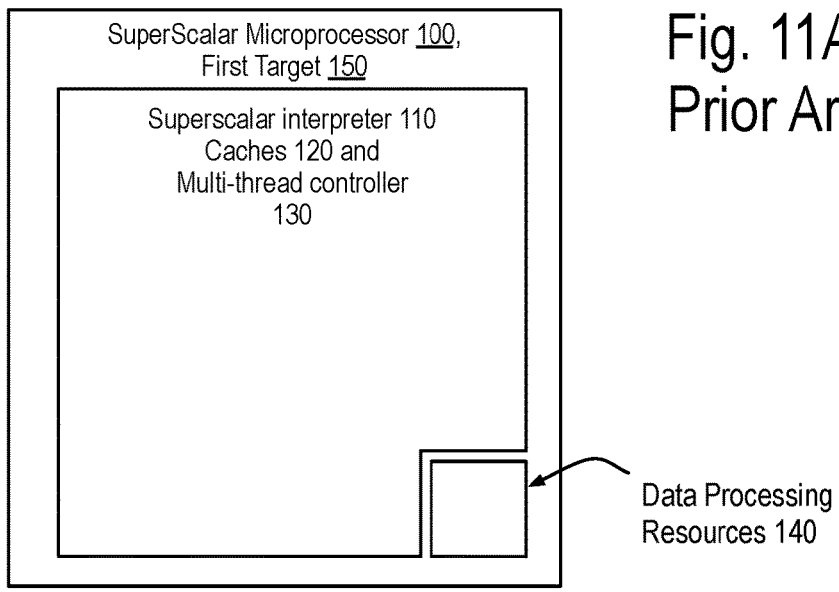
Fig. 11A Prior Art
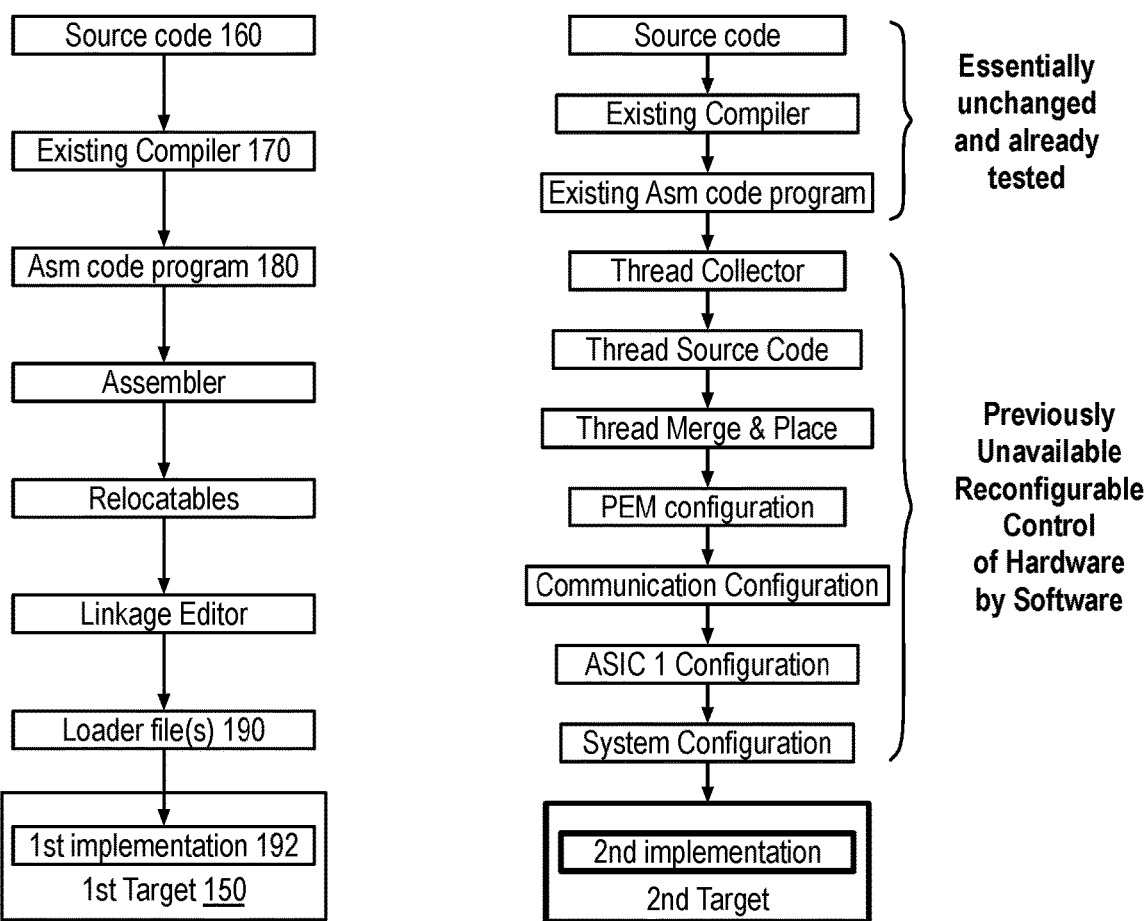
Fig. 11B Prior Art
Fig. 12

Fig. 17B

| Command | Opcode | Parameter discussion | Remarks |
|---|---|---|---|
| 0x00 | No-op | None | Do nothing |
| 0x01 | Halt | Local addr used to indicate task state<br>00 both tasks inactive<br>01 task 0 active 1 inactive<br>10 task 1 active 0 inactive<br>11 illegal | All EWF and Processes halt<br>And set Task State |
| 0x02 | WR inst | | Write instruction memory |
| 0x03 | Rd Inst | | Read instruction memory |
| 0x04 | WR literal | | Write literal memory |
| 0x05 | Rd literal | | Read literal memory |
| 0x06 | Set in loc | Local addr used to indicate which parm TWF.info32 holds where | Set parameter input location in Incoming EWF |
| 0x07 | Get in loc | Local addr used to indicate which parm TWF.info_lo returns where | Read parm input location in Incoming EWF |
| 0x08 | Set out loc | Local addr used to indicate which parm TWF.info_hi holds where | Set parameter output location in Outgoing EWF |
| 0x09 | Get out loc | Local addr used to indicate which parm TWF.info_lo returns where | Read parm output location in Outgoing EWF |
| 0x0a | Set Owner | Lcl adder indicates which process | Set owning process index no In incoming EWF |
| 0x0b | Get Owner | TWF.info_lo indicate which process | Read owning process index no |
| 0x0c | Reset Capture | None | Previous capture eliminated Capture anything in last 8 EWF before next Halt or Trap |
| 0x0d | Dump Capture | None | Dump captured states |
| | | | l |
| --- | --- | --- | Later: |
| TBD | Reset Traps | None | Reset all trap registers |
| TBD | Set Trap | | Sets a trap register |
| TBD | Rd Trap | | Reads a trap register |
| | Run | Local address is 5 bit run field<br>0x0q<br>0x1y | Run for q+1 EWF<br>Run for 16+q+1 EWF |
| | Unhalt | Local address is a process bit vector | Unhalted processes can run |
| | Reset | Local address is a process bit vector | Reset selected processes |

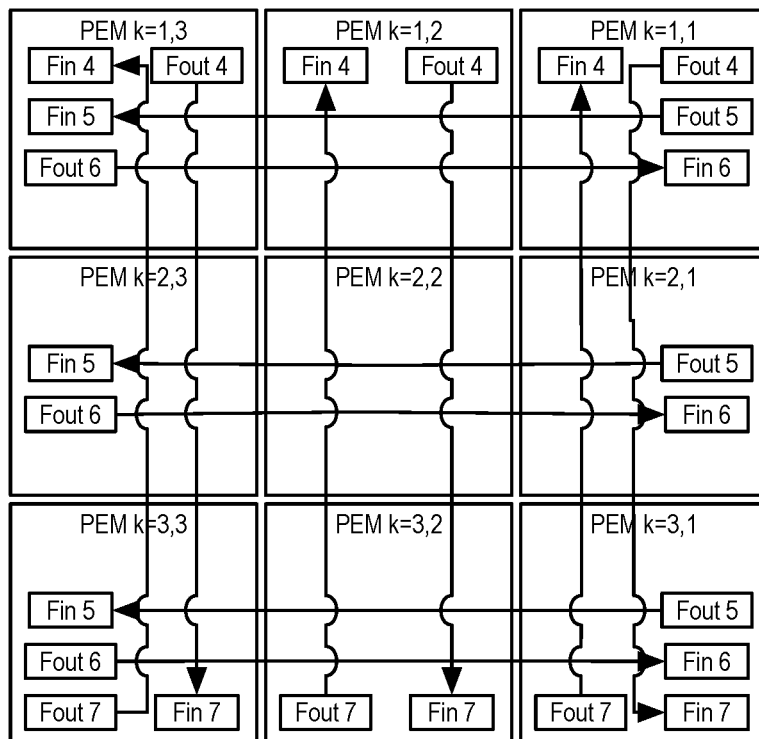
Fig. 22C
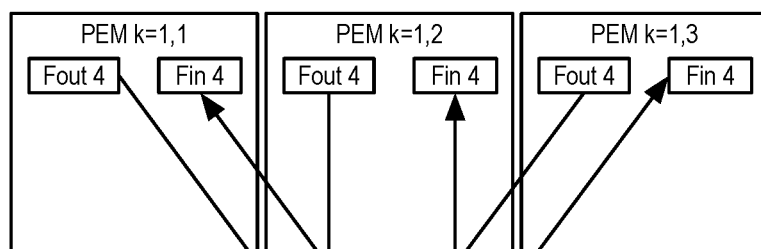
Fig. 22D
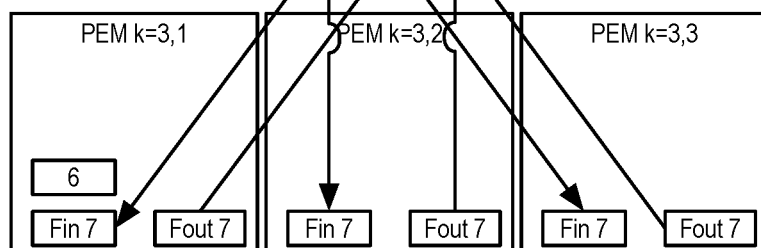

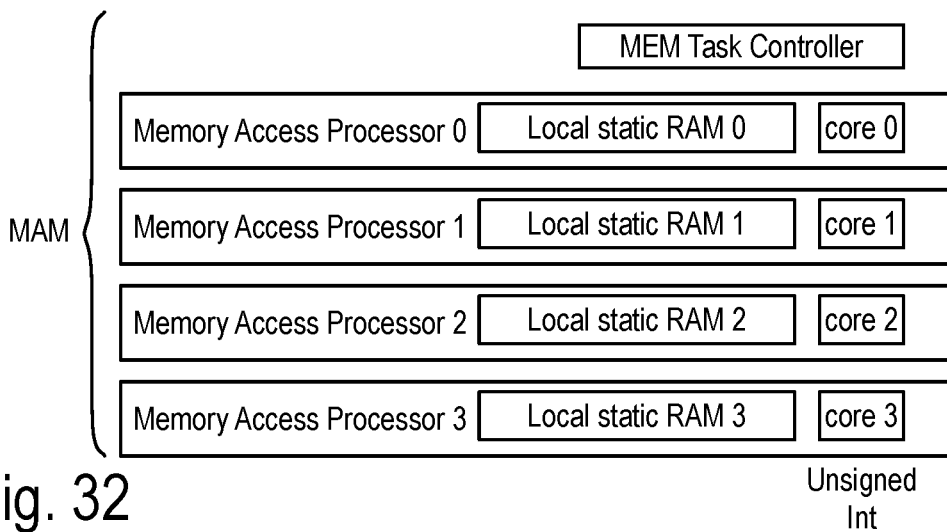
Fig. 32
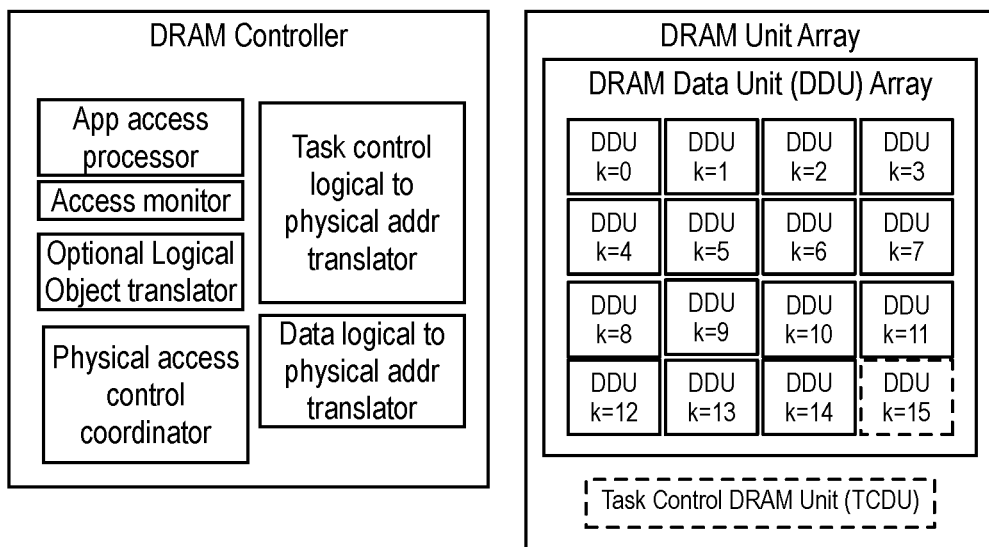
Fig. 33
Fig. 34
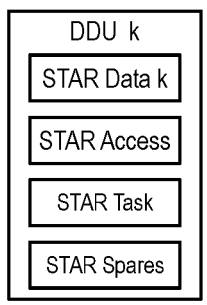
Fig. 35A
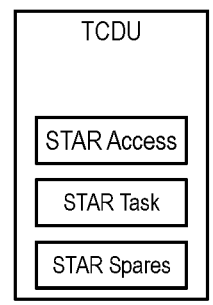
Fig. 35B

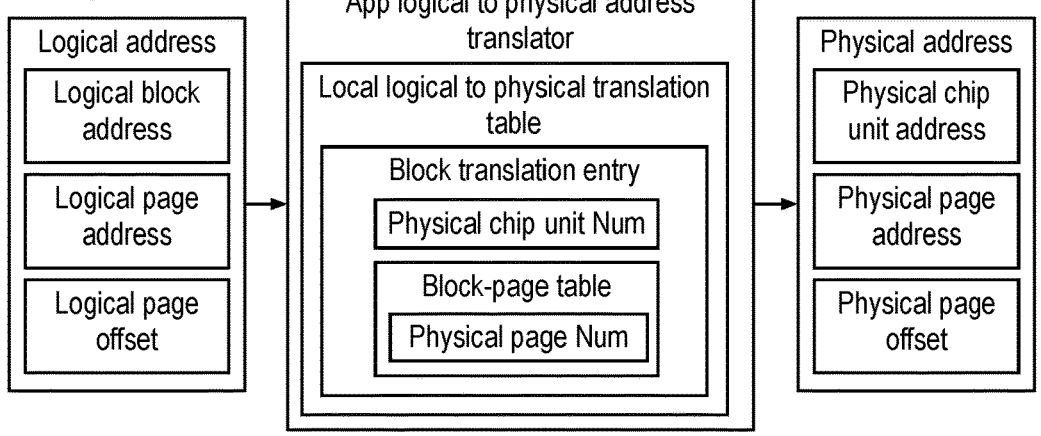
Fig. 37A
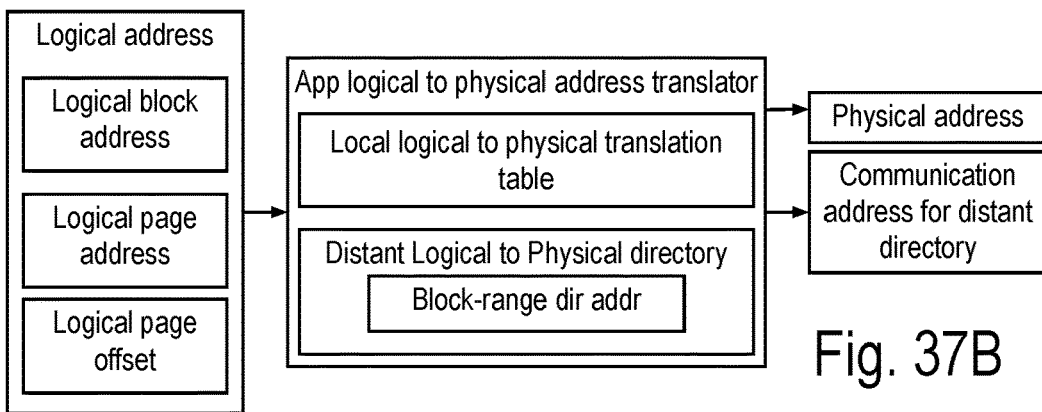
Fig. 37B
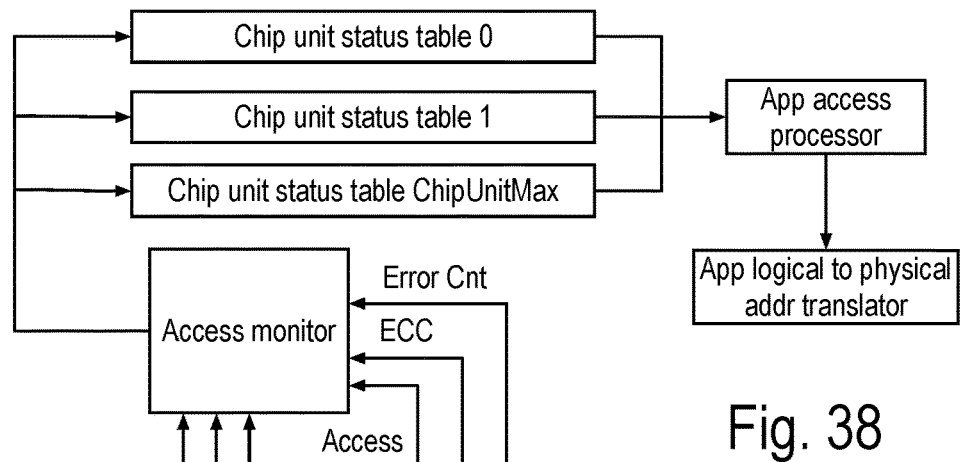
Fig. 38
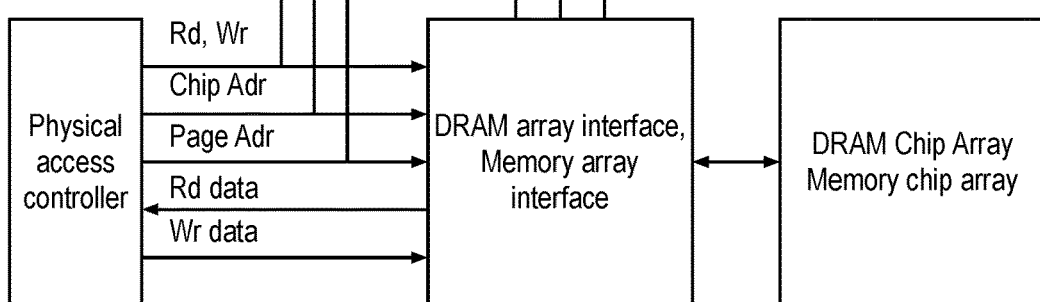

Fig. 47  Primitive operation translation
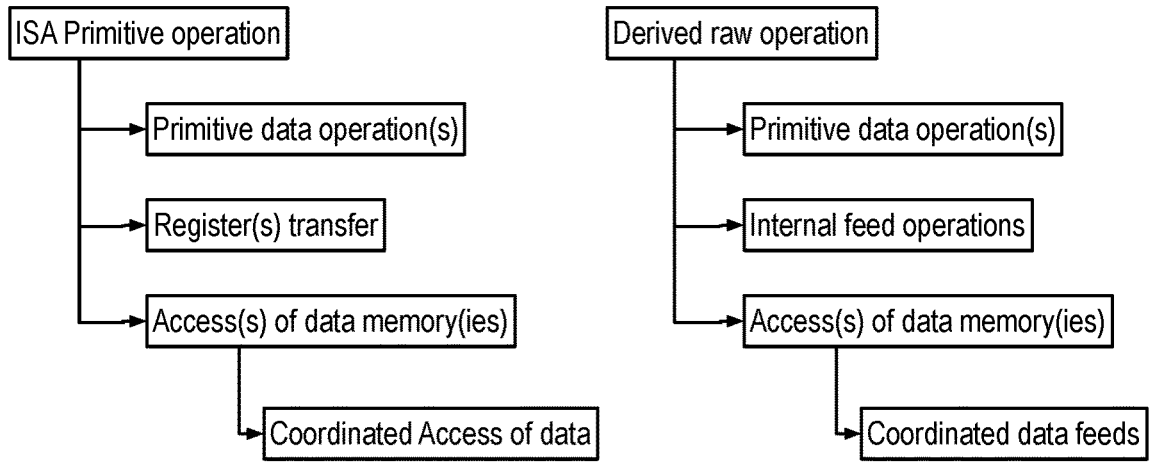
Fig. 48  Raw thread translation
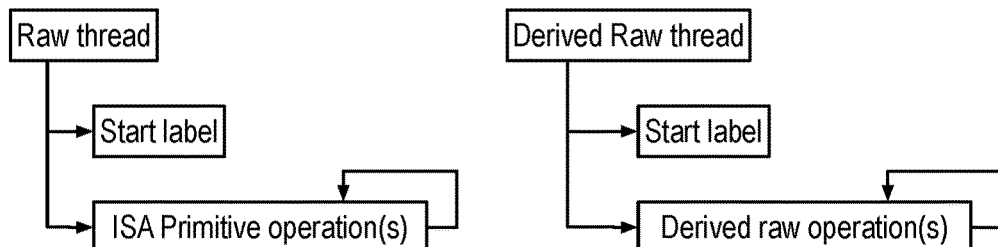
Fig. 49  Data type partitioning
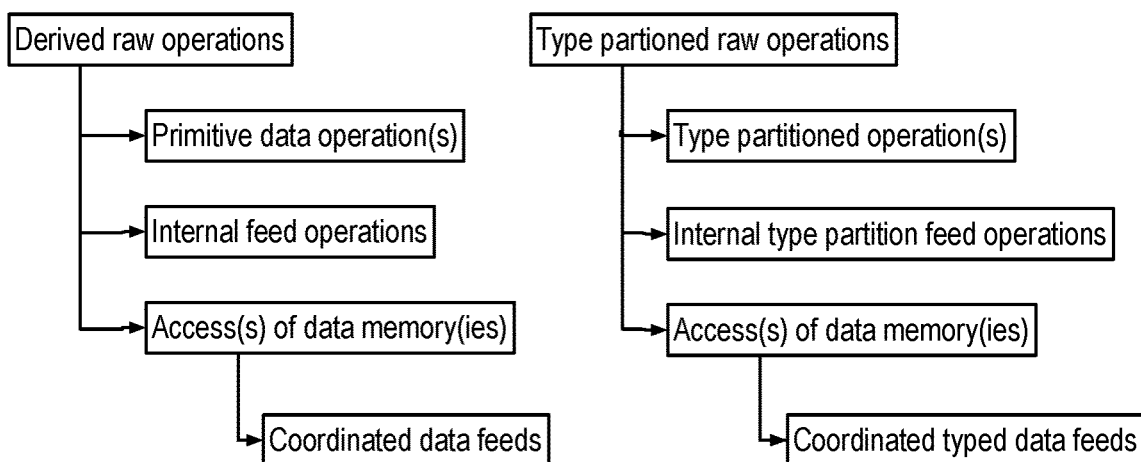

Fig. 50

```
Type_1 A[N]{M}, B[M], C[N];    // Memory allocations
size_t i, j;                    // size_t unsigned ints
Type_2 Sum;                     // insures sufficient rounding
for (i=0; i<N; i++){            // outer loop
   Sum = 0.0;                   // initialize Sum
   for (j=0; j<M; j++){         // inner loop
      Sum += A[[i][j]*B[j]};    // unsigned int addresses
                                // perform multiply in Type_1
                                // accumulate in Type_2
   };
   C[i] = Sum;                  // convert to Type_1 and store
}
```

Fig. 51

| Type_1 | Type_2 | M Worst case | Usual |
|---|---|---|---|
| Fp16 | FP16 | 1K | 16K |
|  | FP32 | 1M | 16M |
|  | FP64 | 1 Trillion | 16 Trillion |
| FP32 | FP32 | 256K | 16M |
|  | FP64 | 1 Billion | 4 Trillion |
| FP64 | FP64 | 1 Billion | 1 Trillion |

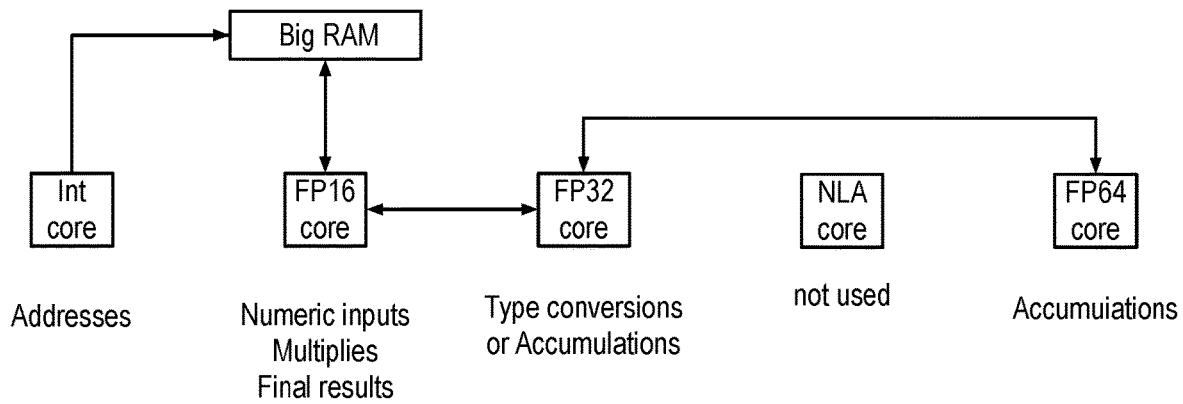

Fig. 52

SIMULTANEOUS MULTI-PROCESSOR (SIMULPRO) APPARATUS, SIMULTANEOUS TRANSMIT AND RECEIVE (STAR) APPARATUS, DRAM INTERFACE APPARATUS, AND ASSOCIATED METHODS

TECHNICAL FIELD

Infection by viruses and rootkits from data memory devices, data messages and data operations are rendered impossible by construction for the Simultaneous Multi-Processor (SiMulPro) cores, core modules, Programmable Execution Modules (PEM), PEM Arrays, STAR messaging protocol implementations, integrated circuits (referred to as chips herein), and systems composed of these components. Greatly improved energy efficiency is disclosed. A system implementation of an Application Specific Integrated Circuit (ASIC) communicating with a DRAM controller interacting with a DRAM array is presented with this resistance to virus and rootkit infection, and simultaneously capable of 1 Teraflop (Tflop) FP16, 1 TFlop FP32 and 1 Tflop FP64 performance while accessing 1 Tbyte of DRAM with a power budget comparable to today's desktop or notebook computers accessing 8 Gbytes of DRAM. Innovations to the STAR communication apparatus will enable the optical communication between chips to carry at least ½ Tbit/second data to and from DRAMs, and each other.

BACKGROUND

There have been several public disclosures and there are several patent documents that have either been published or issued for QSigma's Simultaneous Multi-Processor (SiMulPro) core architecture, the Simultaneous Transmit And Receive (STAR) communications method and apparatus, and QSigma's anticipatory DRAM and related memory technology. Over the last several months, extensive work by the inventor has led to new insights, and unexpected results.

SUMMARY OF THE INVENTION

This application technically discloses innovations including at least the following:

Systems and system components which, by construction, are immune to infection of their program task control and instruction spaces from data memory devices, data messages and data operations. The system level perspective is discussed with FIG. 39 and FIG. 40. The instruction processing perspective is discussed with FIG. 2, and FIG. 14A to FIG. 20. The distinction between task-control memory and data memory is further seen in FIG. 33 to FIG. 35B. The distinction between task control communications and data communications is further seen in FIG. 24, FIG. 31A, FIG. 31B, FIG. 35A, and FIG. 35B.

Implementations, at the processor, network, memory device, and system levels, are shown, by construction, to be immune to virus and rootkits infection by data messages, data memory (devices) and data operations.

Instruction processing implementations, application compatible to microprocessors, implementing one or more Instruction Set Architectures. Application compatibility is meant to apply to the assembler language source files generated or compatible with, compiler output from a computer language, such as C, C++, or Java, for example. This is shown in FIG. 1, FIG. 41B to FIG. 52. Of particular note are embodiments of the core architecture which can be proven to be compiler compatible with the bulk of the Instruction Set Architectures (ISAs) of this time. In particular:

Implementations of vector processing, Single Instruction Multiple Datapath (SIMD) engines, found in microprocessors and Graphical Processing Units (GPUs). These provide simultaneous processing of multiple floating-point formats with greatly increased performance and fault resilience. This is discussed in particular, regarding FIG. 4 and FIG. 7A to FIG. 10C.

Integer SiMulPro cores shown to outperform integer processors, such as the RISC V 32-bit integer microprocessor, by an unexpectedly large factor. Integer SiMulPro cores may include integer arithmetic instruction resources, runtime configured by a parameter to act as an adder, a logic unit, a bit flip-shifter, a multiplier, a divider and/or a remainder circuit. Several of these resources support flow through comparison sorting units. These resources bring unexpected performance and fault resilience. This is discussed, in particular, with FIG. 4 to FIG. 6C.

Error Control Circuitry (ECC) able to correct from any N error bits to as many as 8*N bit errors, and detect from 2*N error bits to 16*N bit errors, for long data payloads of N*32 bits, by varying the ECC overhead of a message, shown in FIG. 25A to FIG. 25E.

Error correction and detection is implemented in such a way that burst errors are essentially treated like random errors across the entire data payload. This will be disclosed to support varying the ECC correct/detection scheme based upon a real-time assessment of the channel noise indicated by the receiver's error detection rates, which can resiliently respond to massive and rapid changes in the noise envelope without loss of data. This noise flexibility shows promise as a mechanism to withstand proximity to the Sun or to Jupiter for space borne computers.

Structured injection of multiple errors into a single code word could disrupt the error detection mechanism. However, implementations can include multiple code words of differing length, possibly implemented with further scrambling of the code words. The scrambling could be different on every channel, rendering the scrambled, encoded messages nearly immune to disruption.

This capability, combined with previously disclosed fault resilience response circuitry, can enable the advent of optical communications to carry the bulk of the communication between chips in a data center, removing today's limitation of optical communications to only communications between racks and similar units.

The memory controllers are shown with separate implementations, one for data memory and one for task-control memories to further implement immunity to virus and rootkit infection. This is shown and discussed regarding FIG. 32 to FIG. 36B, and FIG. 40.

Memory controllers implementing only unsigned integer arithmetic, removing the possibility of negative offsets from a base address, cutting bounds checking calculations in half. FIG. 5A to FIG. 6C, and FIG. 32.

Instruction caches are proved, again by construction, to be no longer needed from a discussion of FIG. 2 through FIG. 3B.

This application discloses, and certain versions of this application, will claim, one or more of the following: a SiMulPro core, a module of SiMulPro cores, referred to herein as a SiMulPro core module, a module of SiMulPro modules, referred to as a Programmable Executable Module (PEM), a PEM Array, referred to as a PEMA, an Application Specific Integrated Circuit (ASIC) implementing at least one instance of these cores and modules.

One embodiment is the focus of a good deal of this discussion, referred to as ASIC 1, which includes a 16 instance PEM Array, communicating with the Simultaneous Transmit And Receive (STAR) communications protocol using opto-transceivers to support 16 data channels delivering 2 Terabits (Tb) of data communications into and out of ASIC 1. ASIC 1 is discussed primarily with regards to FIG. 21, and FIG. 31A. Communications regarding the ASIC1 is discussed regarding FIG. 22A to FIG. 31B. The memory subsystem of FIG. 21 is further discussed in FIG. 31B to FIG. 38.

This approach, when confirmed experimentally, will usher in a new era, when integrated circuits are no longer limited to electrical signal constraints over wires or metallic conductive paths.

BRIEF DESCRIPTION OF THE DRAWINGS

FIG. 3A and FIG. 3B show how the Virtual Very Long Instruction Word ($V^2LIW$) is implemented with the simultaneous processors of FIG. 2, which removes the need for instruction caches.

FIG. 4 shows an example of the Programmable Execution Module (PEM) shown in FIG. 1, including 4 instances of the SiMulPro core module. Each core module includes several instances of different implementations of the SiMulPro core of FIG. 2, each operating on a different type of data, integer, Floating Point 16 bit (FP16), FP32, FP64 and Non-Linear Accelerators of FP32 and/or FP64.

FIG. 5A, FIG. 5B, and FIG. 5C show examples of various implementations of the integer SiMulPro cores shown in FIG. 4, with some implementations being suggested for the memory access processors shown later.

FIG. 7A and FIG. 7B show two implementations of the FP16 cores shown in previous drawings which can be configured to accumulate arithmetic products using FP32 and/or FP64 adders in FP32 and/or FP64 cores through the use of FP16 Up input (in) and FP16 Queues interacting with the components of an implementation of FP32 and/or FP64 cores. FIG. 7B shows configurable type FP16 instructed resources, possibly implementing the configuration in a manner similar to FIG. 7C.

FIG. 8A and FIG. 8B show corresponding SiMulPro FP32 cores to FIG. 7A and FIG. 7B, respectively. FIG. 8C shows an example FP32 configuration for the configurable FP32 arithmetic, instructed resources of FIG. 8B.

FIG. 11A and FIG. 11B show aspect of the prior art. FIG. 11A shows a simplified die may of a superscalar microprocessor, which serves as the first target in the discussion of some of the software aspects found in later drawings. FIG. 11B shows a contemporary software toolchain based upon a compiler and assembly language, which generate an assembler language program from source code.

FIG. 12 shows a new toolchain, which uses the existing compiler for the first target, which may be the superscalar microprocessor of FIG. 11A, to generate the existing assembly code program, which then is used by a new tool chain to configure a second target, which can include one or more SiMulPro cores, core modules, PEM, communications, and integrated circuits (chips), such as ASIC 1, to create a second implementation of the source code and its assembly code program.

FIG. 17A to FIG. 17B are now briefly described: FIG. 17A shows some details of the TWF progressing between Instruction Pipe 1 to Instruction Pipe 4, again showing the fixed and changeable components. FIG. 17B shows some details of the TWF command of the TWF shown in FIG. 16.

FIG. 22A, FIG. 22B, FIG. 22C, and FIG. 22D show a simplified one hop nearest neighbor communications network using the components of the Feed In (Fin) and Feed output (Fout) shown in previous drawings.

FIG. 32 shows an example of the Memory Access processor Module (MAM) including 4 instances of the Memory Access Processors, first shown FIG. 5A to FIG. 5C.

FIG. 33, FIG. 34, FIG. 35A, FIG. 35B, FIG. 36A, FIG. 36B, FIG. 37A, FIG. 37B, and FIG. 38 show some details of the memory controllers of FIG. 40 implementing separate controllers and data memory devices for data and for task control to enforce, by construction, immunity to virus infection by viruses and rootkits as discussed in FIG. 40.

FIG. 33 shows some details of the DRAM controller of FIG. 21, which maintains separate task control and data related logical to physical address translators, each separately configured to access separate elements of the DRAM Unit Array shown in FIG. 34. This is a system component virus and rootkit immune system of FIG. 40. It contains separate memory controllers for data and for task control memory components shown in FIG. 34.

FIG. 34 shows some details of the DRAM Unit Array of FIG. 21, which includes a DRAM Data Unit (DDU) array and at least one Task Control DRAM Unit (TCDU), which provides separate DRAM devices for data and task control information. This is a system component which supports virus and root kit infection immunity as discussed in FIG. 40.

FIG. 35A shows the STAR communication ports of the DRAM Data Unit (DDU) of FIG. 34.

FIG. 35B shows the STAR communication ports of the Task Control DRAM Unit (TCDU) of FIG. 34. Note that the TCDU does not show the STAR data channel found in the DDU of FIG. 35A. If the TCDU and DDU are both instances of a single manufactured chip, this indicates that the TCDU instance is configured by the hardware to not interact with the circuitry related with the STAR data channel Often in today's technology, this can be achieved by tying a pin of the chip to a fixed logic signal, which in the instances of the DDU is ties to the opposite logic signal, assuming two valued logic signals. In other implementations, this may be achieved in other well understood ways.

FIG. 36A and FIG. 36B show examples of the DDU interface chip and the TCDU interface chips, respectively. Each of these chips operates the DRAM unit including at least one DRAM chip organized as multiple pages, with each page typically including at least one row.

FIG. 37A to FIG. 38 show further details regarding the DRAM controller.

FIG. 44, FIG. 45, FIG. 46, FIG. 47, FIG. 48 and FIG. 49 show some details related to the existing compiler and the new software toolchain of FIG. 12.

FIG. 41A shows a definition of semantically compatibility between two implementations of the same assembly code program targeting two separate targets, the first target (represented as a microprocessor) and a second target.

FIG. 41B shows a definition compiler compatibility using an existing compiler to generate the assembly code program. The assembly code program is then used to generate two implementations, which when run, generate essentially the same output streams. This can be implemented to prove to industrial standards that the first and second targets are compiler compatible for a programming languages such as C, C++ and/or Java, and possibly other languages.

FIG. 42 shows an example of the assembly code from the compiler.

FIG. 43 shows an example of a program unit structure for a program unit of FIG. 42.

FIG. 44 shows some details of the program thread list of FIG. 43. The program thread list includes a raw thread list, a starting raw thread, and a branch coupling list.

FIG. 45 shows an example of the raw thread implemented in FIG. 44 either as the starting raw thread and/or as a member of the raw thread list. In the simplest situation, a raw thread includes a start label. In many situations, the raw thread may further include at least one primitive operation.

FIG. 46 shows an example of a primitive operation of a standard Instruction Set Architecture (ISA), which will in subsequent drawings be referred to as an ISA primitive operation.

FIG. 47 shows an example of part of the thread collector utility as a process of primitive operation translation between the ISA primitive operation to a derived raw operation.

FIG. 48 shows the raw thread translation of the thread collector using the primitive operation translation to transform the raw thread of FIG. 45 into the derived raw thread typically including derived raw operations essentially replacing the ISA primitive operations of the raw thread.

FIG. 49 shows a process of the thread collector known as data type partitioning which transforms derived raw operation(s) into a type partitioned raw operation(s).

FIG. 50 shows an example C (or C++) program unit without any input or output arguments, which acts upon a 2-D matrix A and a column vector B to form a row vector C. A, B and C elements are of floating point Type_1 and the internal Sum is of floating point Type_2. The comments on the right show the basic considerations to be discussed. Essentially, how big can M become before there is a significant chance of overwhelming rounding errors, or overflow.

FIG. 51 shows a table of potentially exemplary values for M, particularly for Type_1 being FP16, given the various choices for Type_2.

FIG. 52 shows the operational use of the SiMulPro cores of a core module of FIG. 4 implementing the type partitioned operations of FIG. 49. The integer core (or memory access processor) generates addresses, which are used to access the Big RAM, providing the FP16 core with data.

DETAILED DESCRIPTION OF THE DRAWINGS

Figure 1:
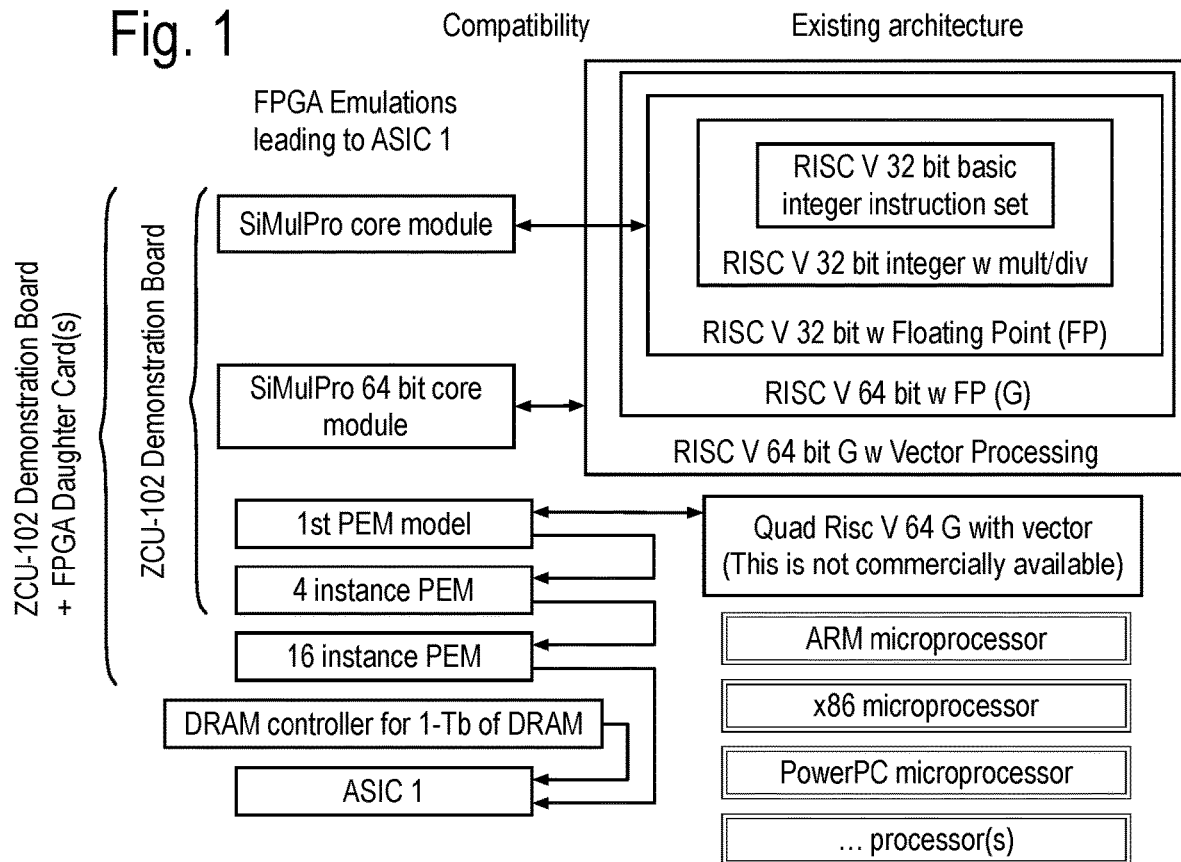
FIG. 1 shows on the left side, various embodiments of the apparatus of this application compatible (shown in the middle) with most, if not all, existing microprocessors (also known as processors) found in handheld computers, network sensors, servers, Systems on a Chip (SOC) integrated circuits (often referred to as 'chips'), including ASIC 1.

FIG. 1 shows on the left side, various embodiments of the apparatus of this application compatible (shown in the middle) with most, if not all, existing microprocessors (also known as processors) found in handheld computers, network sensors, servers, Systems on a Chip (SOC) integrated circuits (often referred to as 'chips'), including ASIC 1.

Application compatibility with existing software tools, such as C/C++ compilers for a variety of computer architectures, can be implemented. In this proposal we will target application compatibility with the RISC V C/C++ compiler and assembler output to immediately support developer productivity, and ease of porting existing applications. There is the potential to support emerging programming environments like *Julia* and Pliny Compute as well as existing environments such as PET Sci. The inventor's Independent Research and A proof of concept prototype is under development to demonstrate reconfiguration times, performance, power, and resistance to infection by viruses and rootkits, as well as application development tools for selected applications.

The instruction processing architecture is based on QSigma's completed pre-deliverable on the top left side of FIG. 1. Note that the standard High Performance Computing (HPC) rule of thumb is 1 byte for each flop, which points to the ASIC 1 potentially requiring 1 Terabyte of DRAM. However, space borne computing and payloads may have different requirements.

Rather than caching, a memory access processor protocol is implemented that can change access patterns and registers within a ns in ASIC 1. The memory access processes are completely software defined and malleable.

Each SiMulPro core embodies multiple simultaneous processes in its hardware. Each embodiment acts as an independent, simultaneously executing processor in the core. Each software-defined simultaneous processor owns a component of the process state calculator, which generates a process state for that processor, first shown in FIG. 2.

A Simultaneous Multi-Processor (SiMulPro) core is a software-defined entity. Each of the chips resulting from our SDH program includes versions of the SiMulPro core. Each SiMulPro core embodies multiple simultaneous processes in its hardware. Each embodiment acts as an independent, simultaneously executing processor in the core. Each software-defined simultaneous processor owns a component of the process state calculator, which generates a process state for that processor. The simultaneous processor also owns instructed resources in the core. Each instructed resource includes a local instruction processor, which responds to the process state. The local instruction processor generates a local instruction instructing its resource. Instruction processing is always local to each instruction resource. Data processing resources, such as a data memory port, an adder, etc., are instructed resources. Only one processor can own a resource and stimulate the instruction processing of its resource. Consequently, there are no resource collisions. This fact is important, because one of the major contributors to the inefficiency of caches, superscalar interpreters, and multi-thread controllers, is that each of them generates collisions, requiring them to implement collision aversion and/or management circuits, which are huge, consume lots of energy, and are inherently complex.

Figure 2:
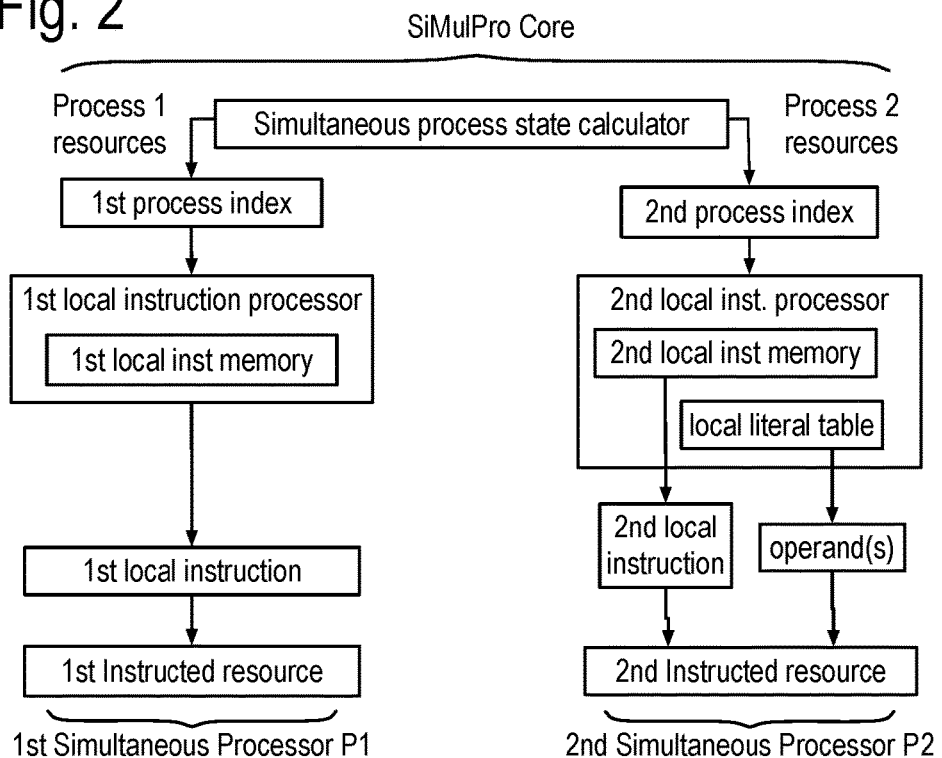
FIG. 2 shows a simple example of the Simultaneous Multi-Processor (SiMulPro) core, forming components of the left side of FIG. 1.

The SiMulPro core includes a simultaneous process state calculator issuing two process states for executing the P1 and P2 processes, shown in FIG. 1, simultaneously on each clock cycle. Compiled SiMulPro programs specify the resources owned by the specific processes for each task, the process states, and when those states are triggered. Ownership may vary for different tasks, but is fixed in one task. The SiMulPro core simultaneously performs both processes P1 and P1, compared to a scalar microprocessor, which executes, at most, one of the processes at a time. A superscalar microprocessor can simultaneously perform two processes, but does so with a large hardware overhead as shown in FIG. 2. Our SDH SiMulPro cores, core modules, etc. do not need, nor include superscalar interpreters, caches nor multi-thread controllers to achieve this.

FIG. 2 shows a simple example of the Simultaneous Multi-Processor (SiMulPro) core, forming components of the left side of FIG. 1.

The simultaneous processor also owns instructed resources in the core. Each instructed resource includes a local instruction processor, which responds to the process state. The local instruction processor generates a local instruction instructing its resource. Instruction processing is always local to each instruction resource. Data processing resources, such as a data memory port, an adder, etc., are instructed resources. Only one processor can own a resource and stimulate the instruction processing of its resource.

The data processing resources also include a literal memory as shown for the second processor and the second instructed resource, which can be read along with the local instruction, to create the parameters acted upon by the data processing unit of the resource. These literals can be read by data processing, but can only be written by the task configuration and control mechanism known as the Task Wave Front (TWF). Because both the local instructions and the literals can only be altered by the TWF, they are immune to infection by data memory devices, data operations and data memory. This is where the immunity to virus and rootkit infection is tested.

One of the major contributors to the inefficiency of caches, superscalar interpreters, and multi-thread controllers, is that each of them generates collisions, requiring them to implement collision aversion and/or management circuits, which are huge, consume lots of energy, and are inherently complex. In this architecture, the simultaneous processors cannot have resource collisions.

The SiMulPro core includes a simultaneous process state calculator issuing two process states for executing the P1 and P2 processes (see FIG. 2), simultaneously on each clock cycle. Compiled SiMulPro programs specify the resources owned by the specific processes for each task, the process states, and when those states are triggered. Ownership may vary for different tasks, but is fixed in one task. The SiMulPro core simultaneously performs both processes P1 and P2, compared to a scalar microprocessor, which executes, at most, one of the processes at a time. A superscalar microprocessor can simultaneously perform two processes, but does so with a large hardware overhead. Our SiMulPro cores, PEMs, etc. do not need, nor include superscalar interpreters, caches, nor multi-thread controllers in the hardware. Software performs the functions of the superscalar interpreter and the multi-thread controller.

The replacement of the instruction caching results from the following implication of the SiMulPro core of FIG. 3, known as the $V^2LIW$ instruction mechanism. Suppose that two processes each have 8 process states. A typical, contemporary VLIW instruction memory supports these same independent operations, but requires a large VLIW memory of 64 instructions. Instructed resources are typically used 6-8 different ways for each algorithm: For example, processing a 2-D array traverses the array in some of the following ways: from top to bottom, bottom to top, left to right, right to left, along the diagonal, and traverse a column from the diagonal down. Each of these array accesses usually involves one or two local instructions.

Consider implementing 256 instruction memories for each task, in each resource. Implement 8 or more simultaneous processes in the core. This is a Virtual VLIW (V²LIW) instruction space of $256^8=(2^8)^8=2^{64}$ V²LIW states, which removes the need for, and therefore the overhead of instruction caches.

In the proposed implementation, the SiMulPro core module is proven, by emulation, to be C/C++ compiler compatible with the 64 bit RISC V including the 256 bit Vector processing extension of its Instruction Set Architecture (ISA).

The V²LIW instruction processing with compiler compatibility enables rapid, cost-effective porting of the existing, tested program libraries written in C/C++ languages for high performance numeric processing, graph algorithms, and other big data tools, enabling rapid development of big data programs targeting the system. C++ is our stable intermediate language with a consistent interface to configuring all reconfigurable, software defined hardware from the start.

Our proposed solution, neither implements the RISC V ISA, nor includes/requires any cache structure, superscalar instruction interpreter, nor multi-thread controller. Therefore, the SiMulPro core requires less than 10% of the silicon, and consumes less than 10% of the energy of an Intel Xeon core. This enables ASIC 1 to perform about 1 Teraflop. On each clock cycle of each SiMulPro core throughout the system, an Execution Wave Front (EWF) and a Task Wave Front (TWF) are initiated, and proceed through a fixed succession of instruction pipes of instructed resources as in FIG. 4. The EWF performs data operations of the simultaneous processes of the active task and the TWF performs task/instruction operations on the resources for an inactive task. Further energy minimization, without limiting performance, is implemented by only powering those execution units used by the EWF and those components used by the TWF. The TWF effectively hides the reconfiguration of the core in an inactive task, while the EWF is processing the active task. This gives essentially 0 overhead to runtime task configuration, throughout the system.

FIG. 3A and FIG. 3B show how a Virtual Very Long Instruction Word (V²LIW) is implemented with the simultaneous processors of FIG. 2, which removes the need for instruction caches. FIG. 3A shows the V²LIW approach, with each of the simultaneous processes using 8 process index states to fetch the local instructions. FIG. 3B shows those same local instructions in a VLIW memory accessed by a single instruction index, requiring a much larger memory to achieve comparable results. A typical, contemporary VLIW instruction memory supports these same independent operations, but requires a much larger VLIW memory of 64 instructions. For example, one of these processes may generate addressing with these states to access a 2-D array, to traverse the array from top to bottom, bottom to top, left to right, right to left, along the diagonal, and traverse a column from the diagonal down.

Now consider implementing 256 instruction memories for each task, in each resource. Implement 8 or more simultaneous processes in the core. This is Virtual VLIW (V²LIW) instruction space of $256^8=(2^8)^8=2^{64}$V²LIW states, removes the need for, and therefore the overhead of, instruction caches. Removing instruction caches reduces complexity, silicon size, and energy usage for integrated circuits (chips).

FIG. 4 shows an example of the Programmable Execution Module (PEM) shown in FIG. 1, including 4 instances of the SiMulPro core module. Each core module includes several instances of different implementations of the SiMulPro core of FIG. 2, each operating on a different type of data, integer, Floating Point 16 bit (FP16), FP32, FP64 and Non-Linear Accelerators of FP32 and/or FP64.

Each of the SiMulPro cores is committed to one type of arithmetic, the int cores handle all integer arithmetic, the FP16, FP32, and FP64 cores handle 16, 32, and 64 bit floating point arithmetic, respectively. The column of NLA cores may implement the NLA accelerators for FP32 and/or FP64 calculations. The V²LIW mechanism replaces the SIMD vector processing mechanism of the RISC V (and the other microprocessors of FIG. 1), so each vector processor component can be independently instructed to create SiMulPro processors, collectively implementing the V²LIW instruction spaces. Circuitry is added to support simultaneous calculation of minimums and/or maximums of vectors, as well as support for radix 4 FFT steps and Floating Point (FP) Discrete Wavelet Transforms (DWT). The DWT primary tap products are reused, scaled by power(s) of 2 to form the DWT results at a small fraction of the FP multiplications otherwise required. The NLA cores acting with the FP adders optimize transcendental functions including $\exp(x)$, $epx2(x)$, $x^y$, $\log e(x)$, $\log 2(x)$, $\log 10(x)$, $\sin e(x)$, etc. are also optimized without any overhead on the FP multipliers.

Figure 13A:
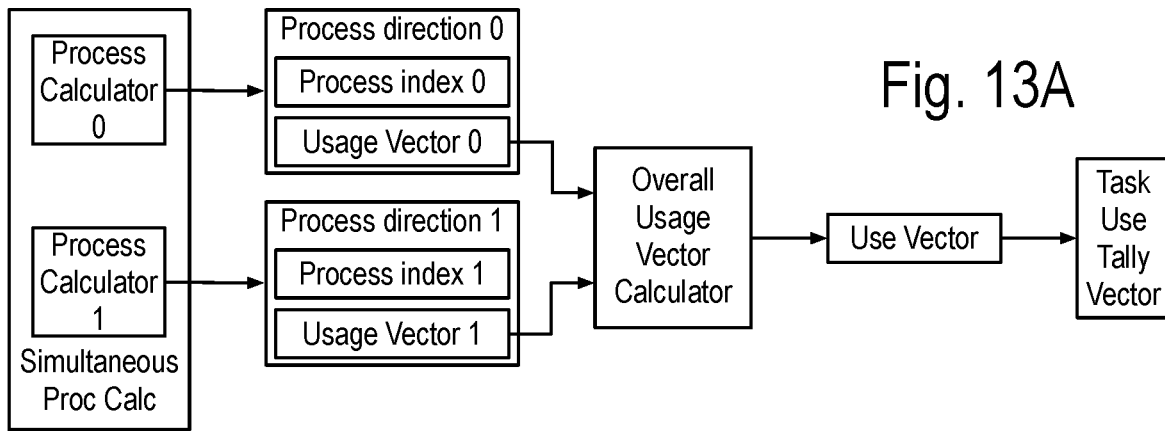
FIG. 13A to FIG. 13C show a use vector generated in instruction pipe 0, possibly by one or more of the process state calculators, to minimize energy consumption to just those instructed resources that are actually used in an Execution Wave Front (EWF), found in many of the drawings of the SiMulPro cores.
Figure 13B:
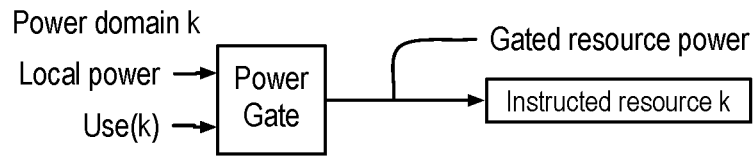
Figure 13C:
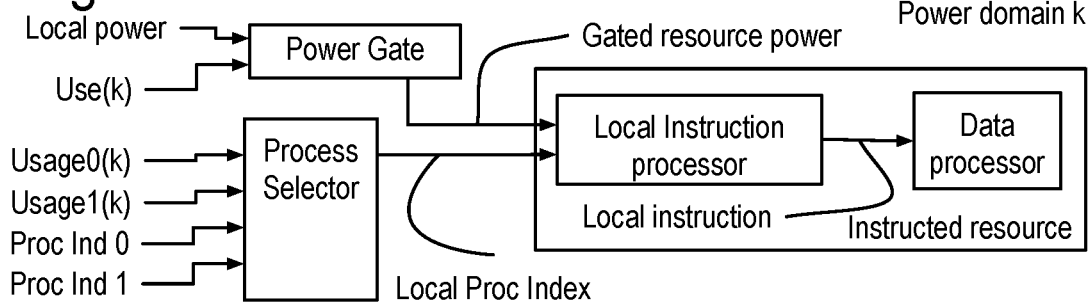

However, each instructed resource is only active and drawing energy when that instructed resource is used as shown in FIG. 13A to FIG. 13C. This enables big data analysis on the system to proceed with accurate non-linear function calculations, not only for forensic financial analyses, but also for digital beam forming and orbital calculations, while at the same time, there is no collision with the multiplier-based calculations. Today, these non-linear calculations require multiplier resources, meaning that the multiplier cannot be used for other calculations. All of this is of central advantage to NRO endeavors in Intelligence Surveillance and Reconnaissance (ISR), big data analysis, digital signal processing, which may quickly need such functions.

The Programmable Execution Module (PEM), is a SiMulPro core module integrating 4 instances of the previous SiMulPro core modules, including 4 thread condition registers, run time configurable memory allocation of 64 Kbytes internal memory across three data types, integer, FP, and the NLA format. Subsequent implementations of a PEM may include larger amounts of local RAM associated with a core module, for example, 256K, 1M or 4M bytes.

A SiMulPro core typically includes a succession of instruction pipes as shown in the next several sheets of drawings. Task control and configuration stimulates this succession of instruction pipes by a Task Wave Front (TWF), which is sent to the first of the instruction pipes, labelled instruction pipe 0. Data processing is controlled by an Execution Wave Front (EWF), which is received by the next instruction pipe, and then passed on, possibly modified as it traverses each instruction pipe. The instruction pipes of a SiMulPro core may each possess potentially different numbers of clocked pipe stages.

Figure 5C:
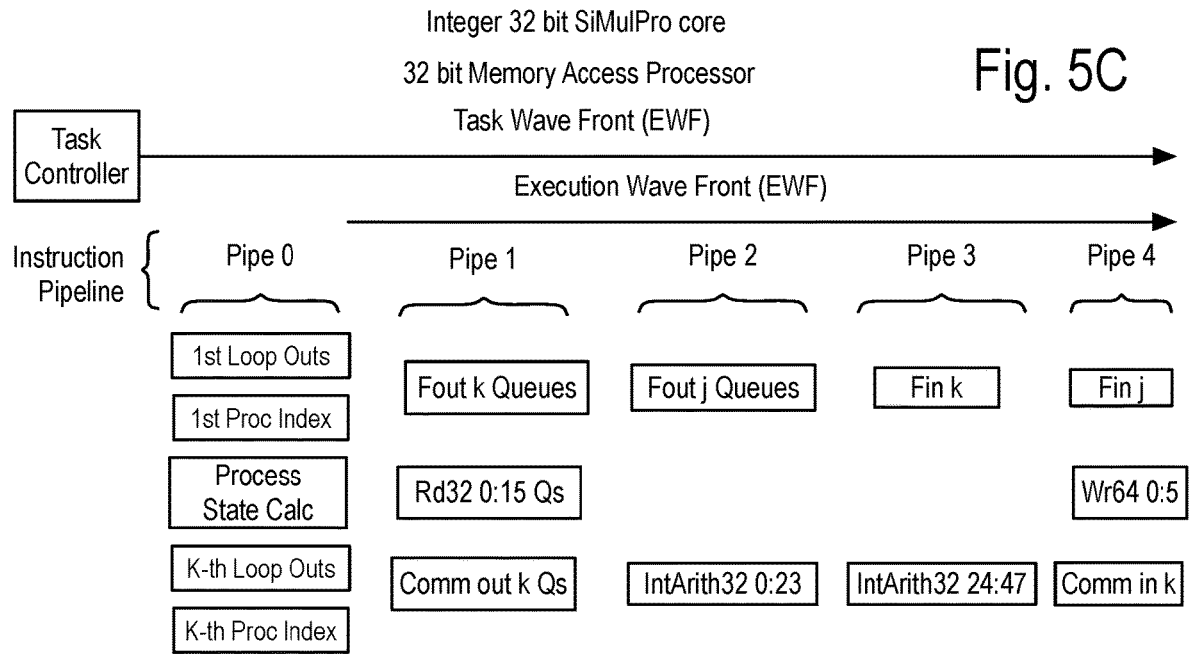

FIG. 5A to FIG. 5C show examples of various implementations of the integer SiMulPro cores shown in FIG. 4, with some implementations being suggested for the memory access processors shown later. FIG. 5A shows fixed type arithmetic instructed resources in instruction pipes 2 and 3. FIG. 5A and FIG. 5B show configurable type integer arithmetic resources in instruction pipes 2 and 3. FIG. 5A to FIG. 5C show feedback paths and queues situated in instruction pipes 1 to 4 to support accumulation by instructed resources acting as integer adders.

Figure 6A:
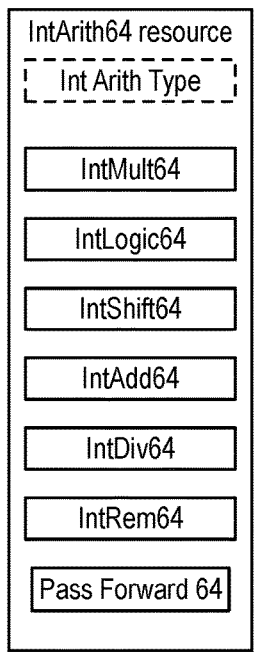
FIG. 6A, FIG. 6B and FIG. 6C show three separate implementations configurable type integer arithmetic instructed resources of FIG. 5B and FIG. 5C.
Figure 6B:
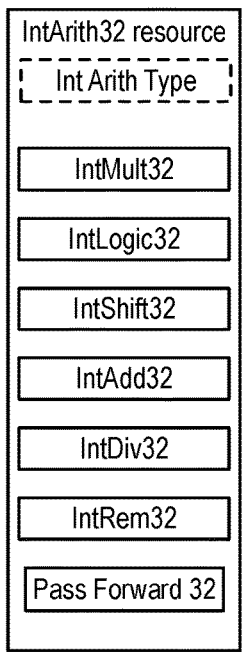
Figure 6C:
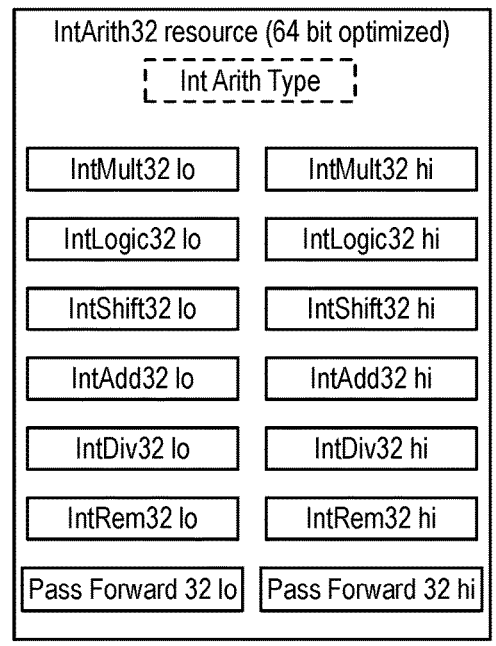

FIG. 6A to FIG. 6C show three separate implementations configurable type integer arithmetic instructed resources of FIG. 5B and FIG. 5C.

Figure 7A:
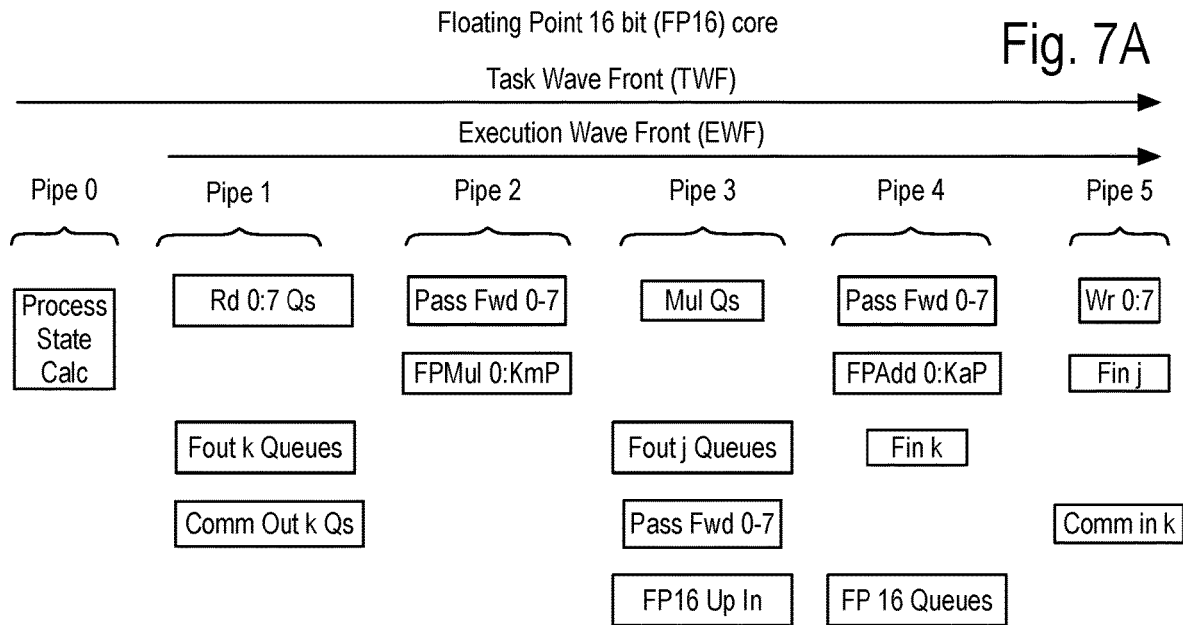
FIG. 7A to FIG. 7C are now briefly described.
Figure 7B:
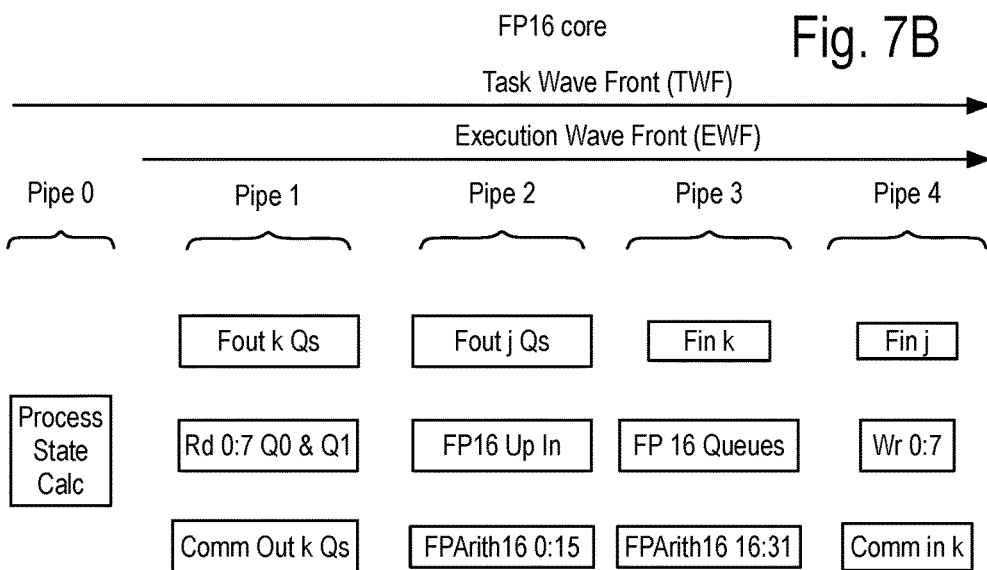
Figure 7C:
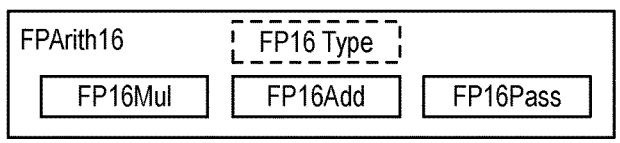

FIG. 7A and FIG. 7B show two implementations of the FP16 cores shown in previous drawings which can be configured to accumulate arithmetic products using FP32 and/or FP64 adders in FP32 and/or FP64 cores through the use of FP16 Up input (in) and FP16 Queues interacting with the components of an implementation of FP32 and/or FP64 cores. FIG. 7A shows an implementation with fixed arithmetic typed instructed resources in instruction pipe 2 and instruction pipe 4. FIG. 7B shows configurable type FP16 instructed resources, possibly implementing the configuration in a manner similar to FIG. 7C.

Figure 8A:
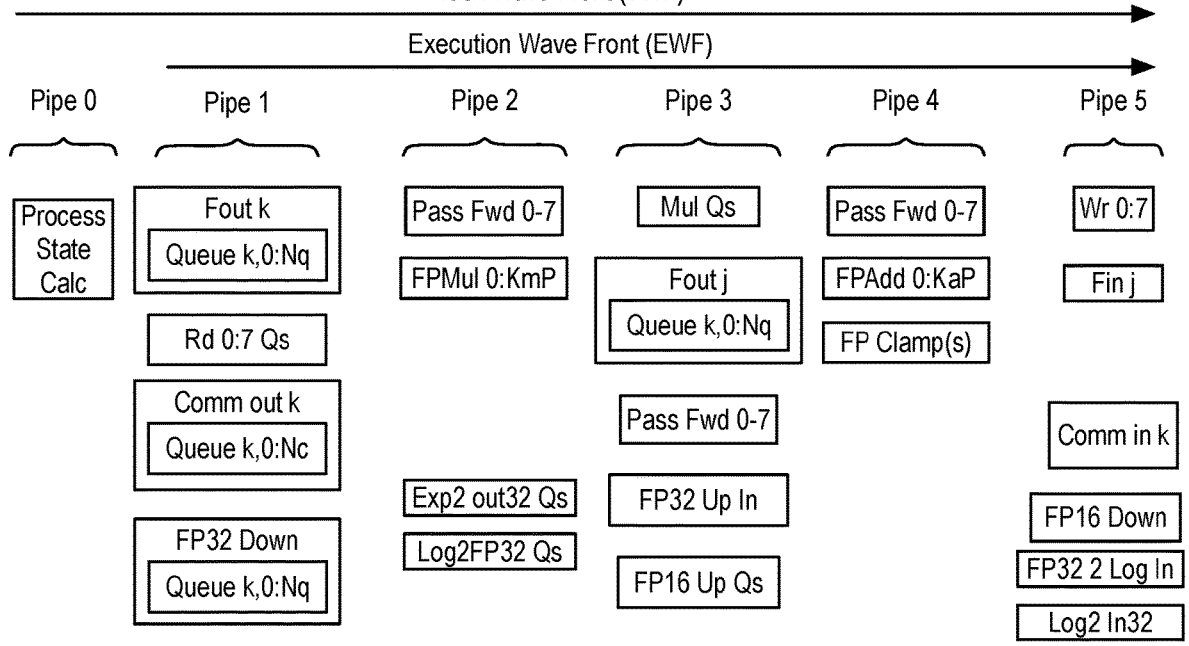
FIG. 8A to FIG. 8C are now briefly described.
Figure 8B:
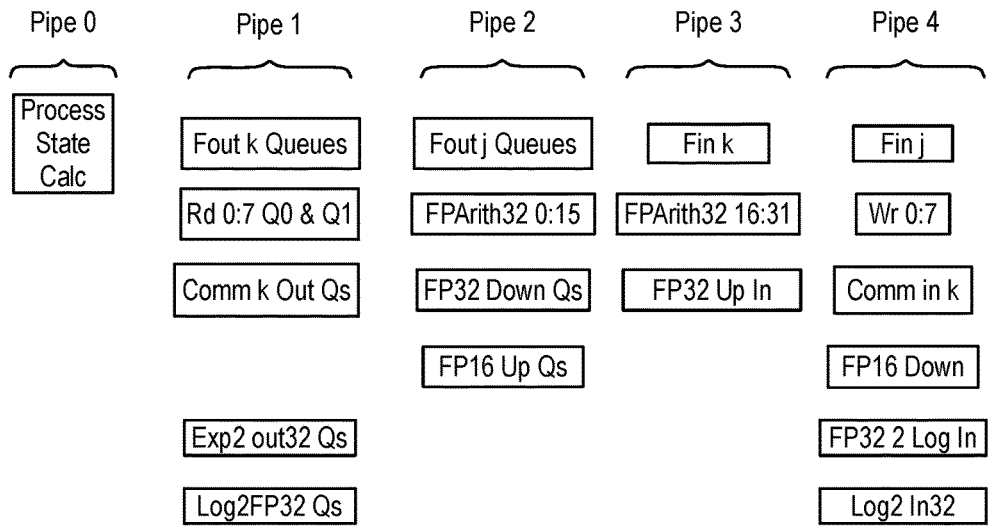
Figure 8C:
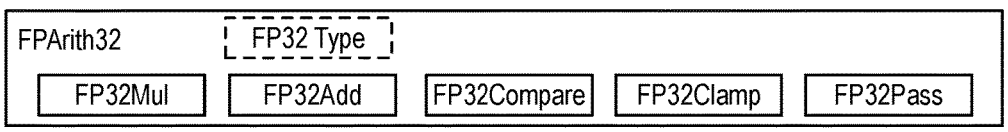

FIG. 8A and FIG. 8B show corresponding SiMulPro FP32 cores to FIG. 7A and FIG. 7B, respectively. FIG. 8C shows an example FP32 configuration for the configurable FP32 arithmetic, instructed resources of FIG. 8B. Note that the FP32 further includes FP32 compare and FP32Clamp, which are typically not required for FP16 configurable typed arithmetic instructed resources. Both FIG. 7A and FIG. 7B may further include FP32 to Log input, Log 2 input instructed resources, as well as Exp2 output and Log to FP32 output instructed resources.

Figure 9A:
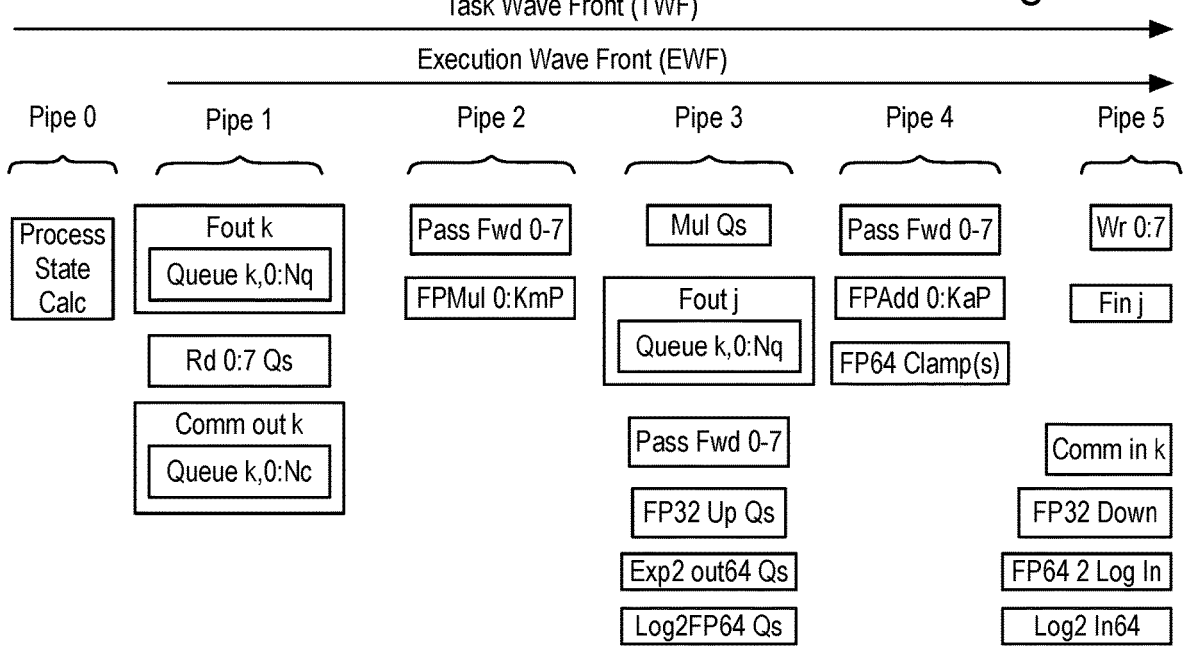
FIG. 9A, FIG. 9B and FIG. 9C show examples of the FP64 SiMulPro cores similar to the corresponding drawings of FIG. 8A to FIG. 8C.
Figure 9B:
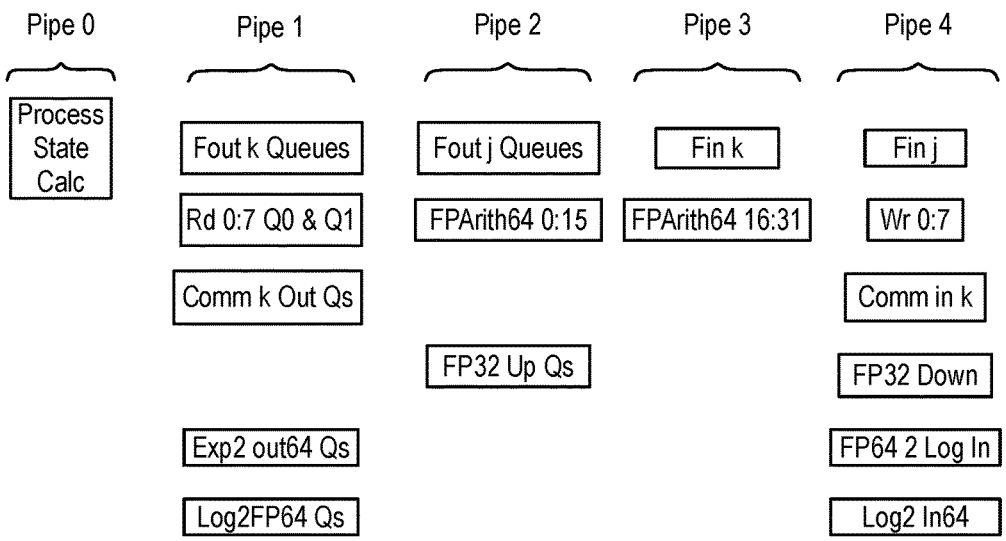
Figure 9C:
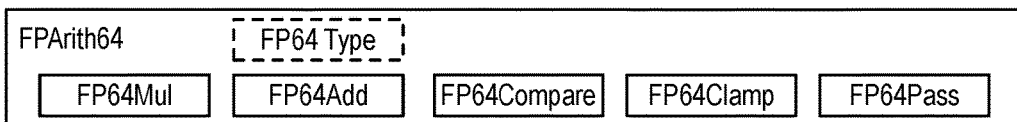

FIG. 9A to FIG. 9C show examples of the FP64 SiMulPro cores similar to the corresponding drawings of FIG. 8A to FIG. 8C.

Figure 10A:
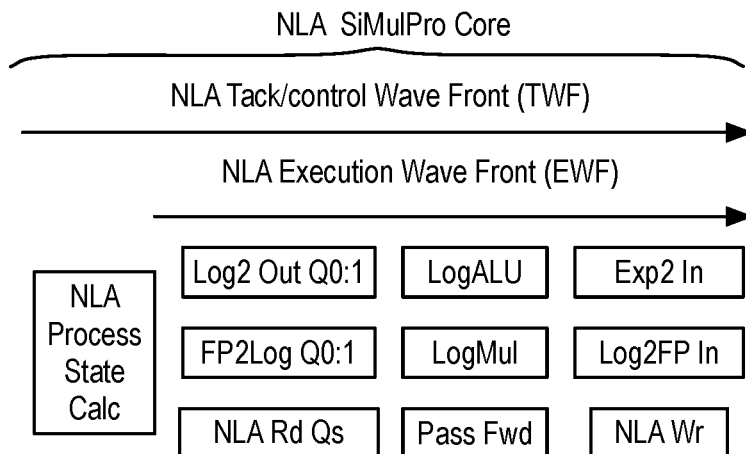
FIG. 10A, FIG. 10B, and FIG. 10C show NLA SiMulPro Cores similar to corresponding drawings in FIG. 8A to FIG. 8C, as well as corresponding drawings in FIG. 9A to FIG. 9C.
Figure 10B:
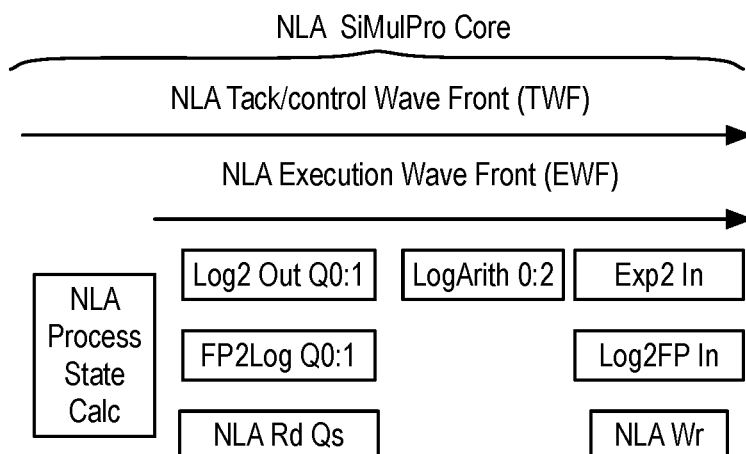
Figure 10C:
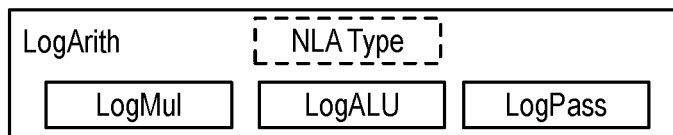

FIG. 10A to FIG. 10C show NLA SiMulPro Cores similar to corresponding drawings in FIG. 8A to FIG. 8C, as well as corresponding drawings in FIG. 9A to FIG. 9C.

In FIG. 5A to FIG. 10C, on each clock cycle of each SiMulPro core, an Execution Wave Front (EWF) and a Task Wave Front (TWF) are initiated, and proceed through a fixed succession of instruction pipes of instructed resources. The EWF performs data operations of the simultaneous processes of the active task and the TWF performs task/instruction operations on the resources for an inactive task. Further energy minimization, without limiting performance, is implemented by only powering those execution units used by the EWF and those components used by the TWF. The TWF effectively hides the reconfiguration of the core in an inactive task while the EWF is processing the active task. This gives an essentially 0 overhead to runtime task configuration, throughout the system.

FIG. 11A and FIG. 11B show aspect of the prior art. FIG. 11A shows a simplified die may of a superscalar microprocessor, which serves as the first target in the discussion of some of the software aspects found in later drawings. FIG. 11B shows a contemporary software toolchain based upon a compiler and assembly language, which generate an assembler language program from source code.

FIG. 12 shows a new toolchain, which uses the existing compiler for the first target, which may be the superscalar microprocessor of FIG. 11A, to generate the existing assembly code program, which then is used by a new tool chain to configure a second target, which can include one or more SiMulPro cores, core modules, PEM, communications, and integrated circuits, such as ASIC 1, to create a second implementation of the source code and its assembly code program.

FIG. 13A to FIG. 13B show a use vector generated in instruction pipe 0, possibly by one or more of the process state calculators, to minimize energy consumption to just those instructed resources that are actually used in an Execution Wave Front (EWF), found in many of the drawings of the SiMulPro cores. FIG. 13A shows the use vector being sent to the task use tally vector. This is being shown for the fixed configuration arithmetic instructed resources. In implementations with configurable type arithmetic resources, each instruction pipe will need to augment this arranged by generating a used type vector, so that any instructed resource which is used, is type to complete the information needed for the task use tally vector. Further, a similar approach may be applied within the configurable type arithmetic resources, so that only the type being used consumes energy.

FIG. 14A to FIG. 14G show a stepwise refinement approach to verification and testing of the instructed resources and instruction pipes of various SiMulPro cores. These drawings are provided to inform one of ordinary skill in the art how to make these embodiments, which frequently requires that their verification and testing to proceed in a manner similar to these drawings. It should be noted, that today's verification and test procedures can be written not only in traditional system design languages such as Verilog and VHDL, but also in C, C++ and/or SystemC and target various FPGA(s) and/or System On a Chip (SOC) with a logic fabric composed of components usually found in an FPGA.

Making a SiMulPro core, or its components, usually begins with a simulation running in a computer, such as an ISA microprocessor. In such a stage, there is no physical distinction between the modeled component and the host system in which the testbench is being operated, so that the host interface is initially just a software construct.

However, as soon as a FPGA or PL fabric comes into the situation, the host interface and the host testbench become palpably distinct from whatever emulates the unit under verification. At this stage, the host may well be a microprocessor inhabiting a SOC further including the PL fabric or embedded FPGA.

As the development of the component(s) and core(s) progress, there is a tendency for the emulation to move into a dedicated FPGA or FPGA network. In this situation, the host may now be a separate computer, or a network of SOCs each containing a local host and FPGA emulation of part of the system now being verified.

Eventually, sufficient confidence is developed trigger cause the manufacture of an ASIC or full custom chip. In exercising these embodiments, the new chip(s) may be coupled to a test stand, and the host interface and host may be separate components of the test stand.

In the following discussion of FIG. 14A to FIG. 14G, there is no specific discussion of instruction pipe 0 and the process state calculators. This is because the verification and testing of the integer SiMulPro core has not proceeded past the configurations of FIG. 14A and FIG. 14B. While the verification and test steps shown in the remaining drawings can be surmised, there is no further evidence as to the best mode that can be surmised for instruction pipe 0 and the process state calculators. Each of these drawings is in portrait mode.

Figure 14A:
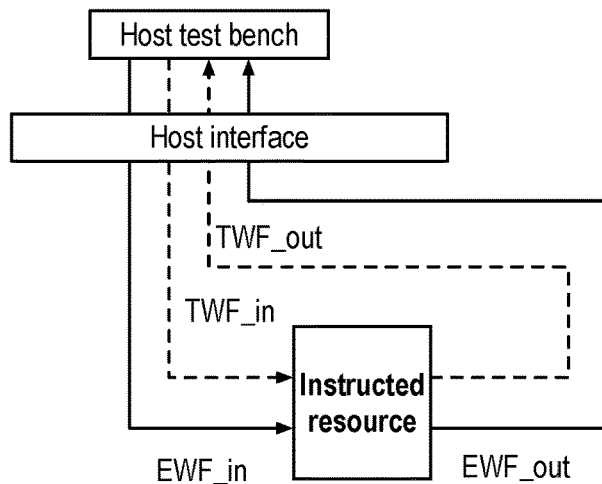
FIG. 14A, FIG. 14B, FIG. 14C, FIG. 14D, FIG. 14E, FIG. 14F, and FIG. 14G show a stepwise refinement approach to verification and testing of the instructed resources and instruction pipes of various SiMulPro cores. Each of these drawings is in portrait mode.

FIG. 14A shows an example a test bench interacting across a host interface with an instance of an instructed resource. The host testbench stimulates the instructed resource with an EWF for input (EWF_in) and a TWF for input (TWF_in) to the instructed resource. The instructed resource responds to these inputs and generates an output form of the EWF (EWF_out) and an output form of the TWF (TWF_out), which are both sent across the host interface to the host tent bench. Note that the inputs and outputs do not have to be the complete EWF or TWF, respectively. They may implement a component specific to the test being performed.

Figure 14B:
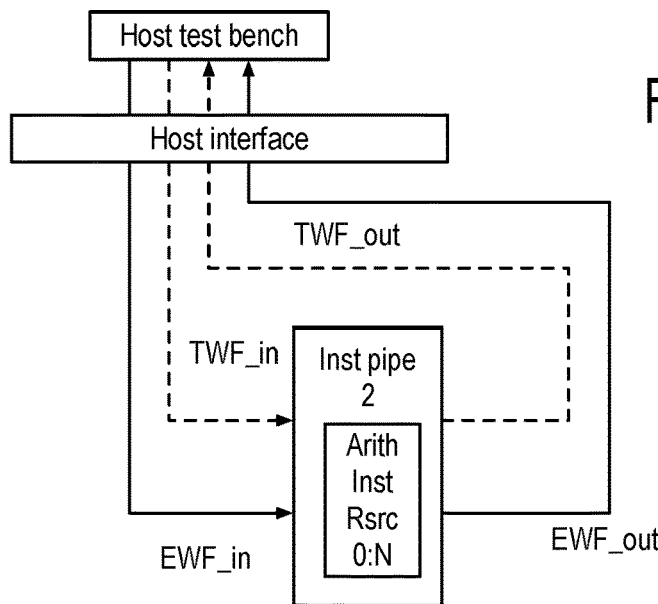

FIG. 14B shows an example host test bench using similar inputs and outputs to stimulate an instruction pipe, which has potentially multiple instructed resource instances. In this example, the instructed resources are Arithmetic instructed resources as previously discussed in FIG. 5A to FIG. 10C.

Figure 14C:
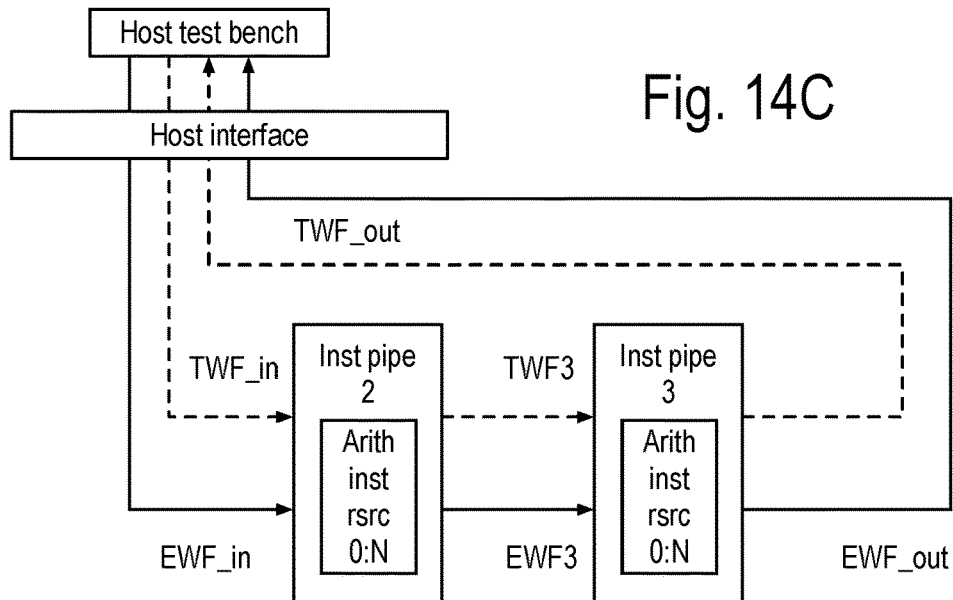

FIG. 14C shows an extension of FIG. 14B, where the FPGA or PL fabric now has instances of two instruction pipes, both of which including one or instances of instructed resources. At this stage, there is a potentially hidden signal bundle for both the EWF and the TWF. A refinement of this drawing may include bringing these bundles across the hoist interface to the host test bench. Note that the could also be implemented in the chip implementing such components, possibly as part of the JTAG scan path.

Figure 14D:
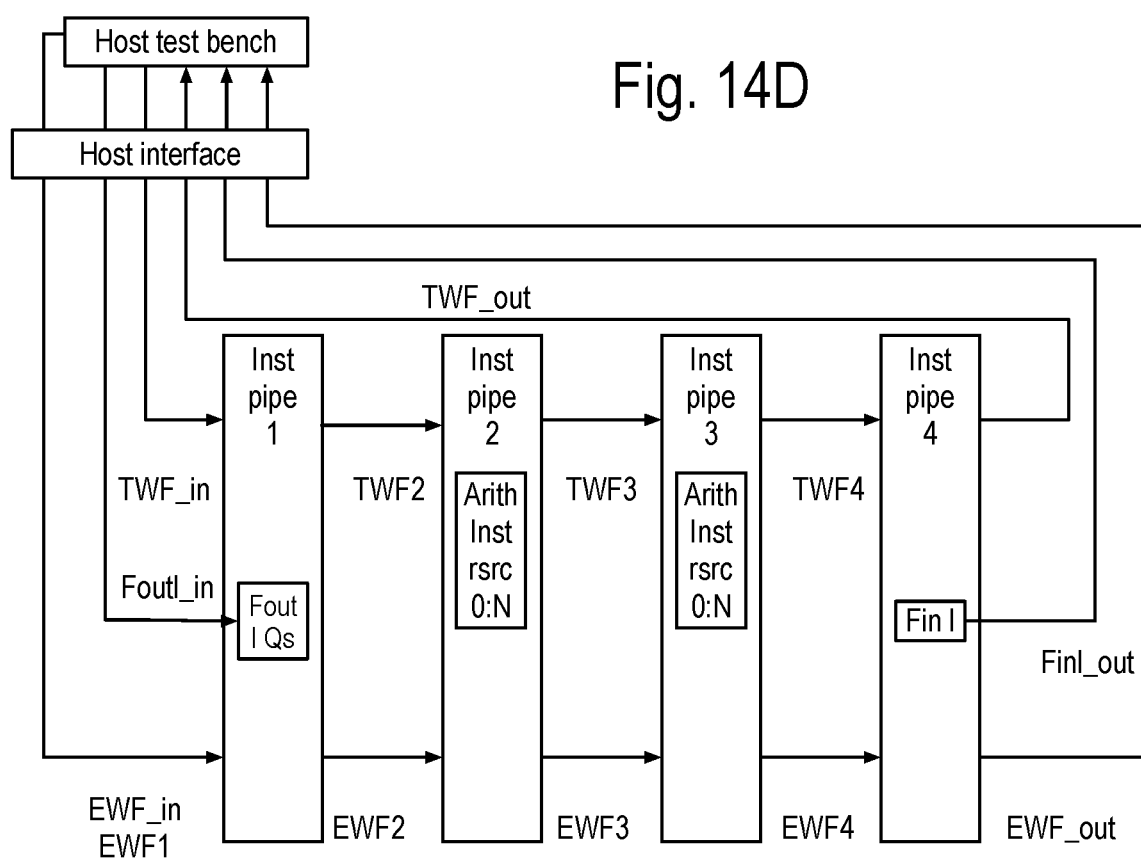

FIG. 14D shows an extension to the verification and test situation of FIG. 14C, there is now an external input and output port, which will now communicate with host test bench.

Figure 14E:
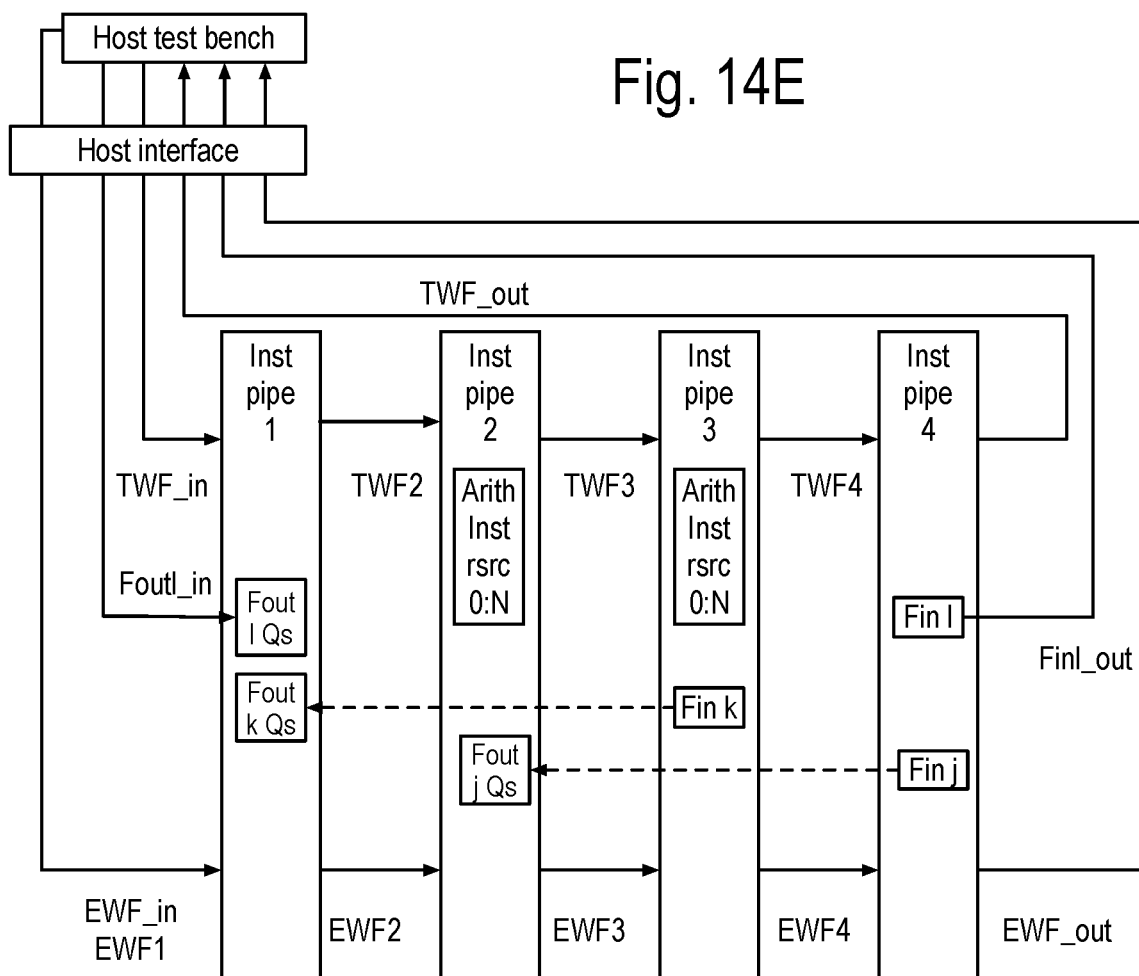

FIG. 14E shows a step-wise refinement from FIG. 14D, in which one or more feedback paths are added to the circuitry being verified and/or tested. Again, it is possible to bring out the communications between the components between the instruction pipes, but this drawing shows the minimal complexity needed to verify and/or test these circuits.

Figure 14F:
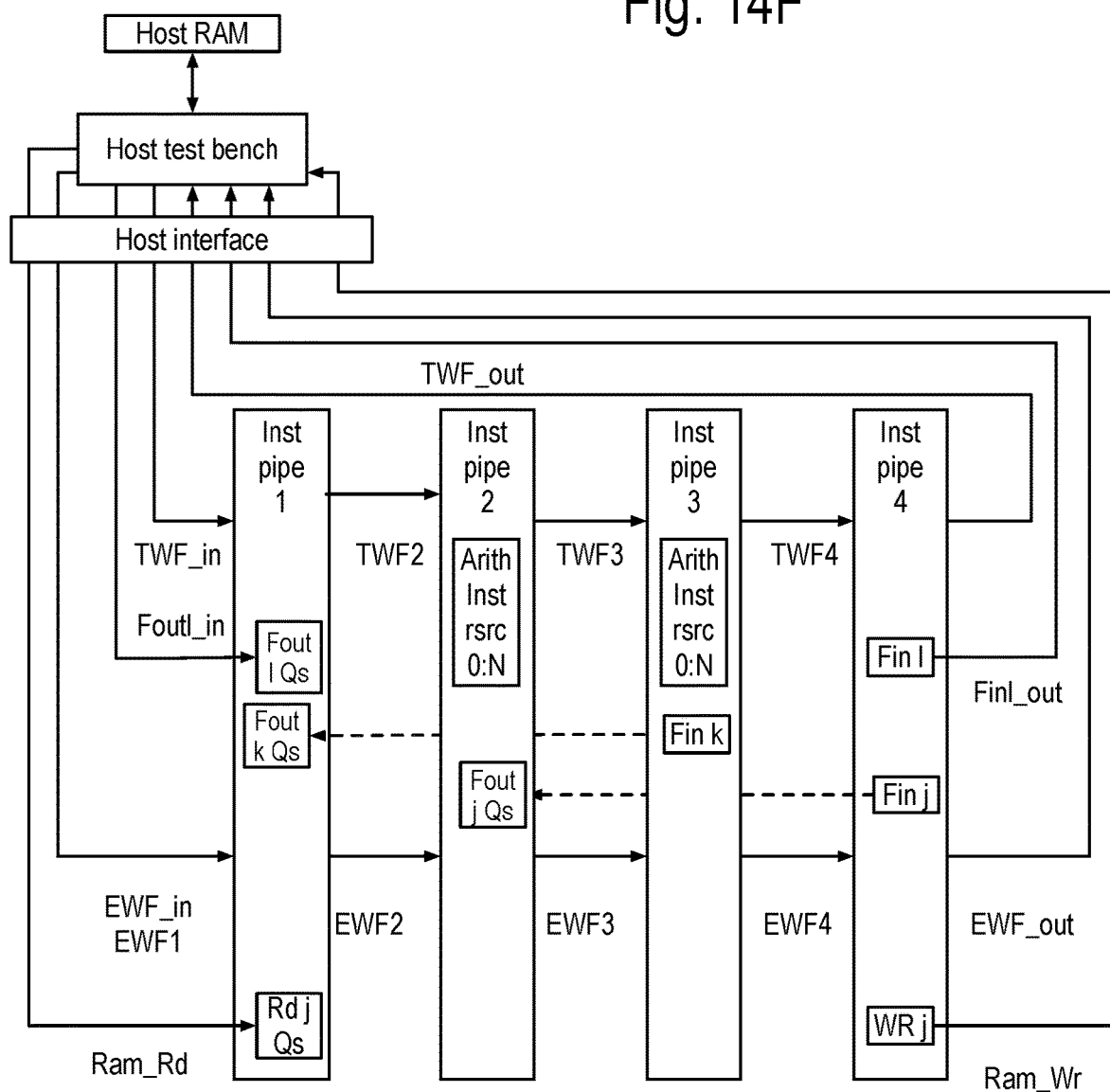

FIG. 14F shows a refinement to FIG. 14E showing the interface to a RAM in the host system, which is used to stimulate and respond to the Ram_Rd and RAM_Wr signals passed across the host interface to the host test bench.

Figure 14G:
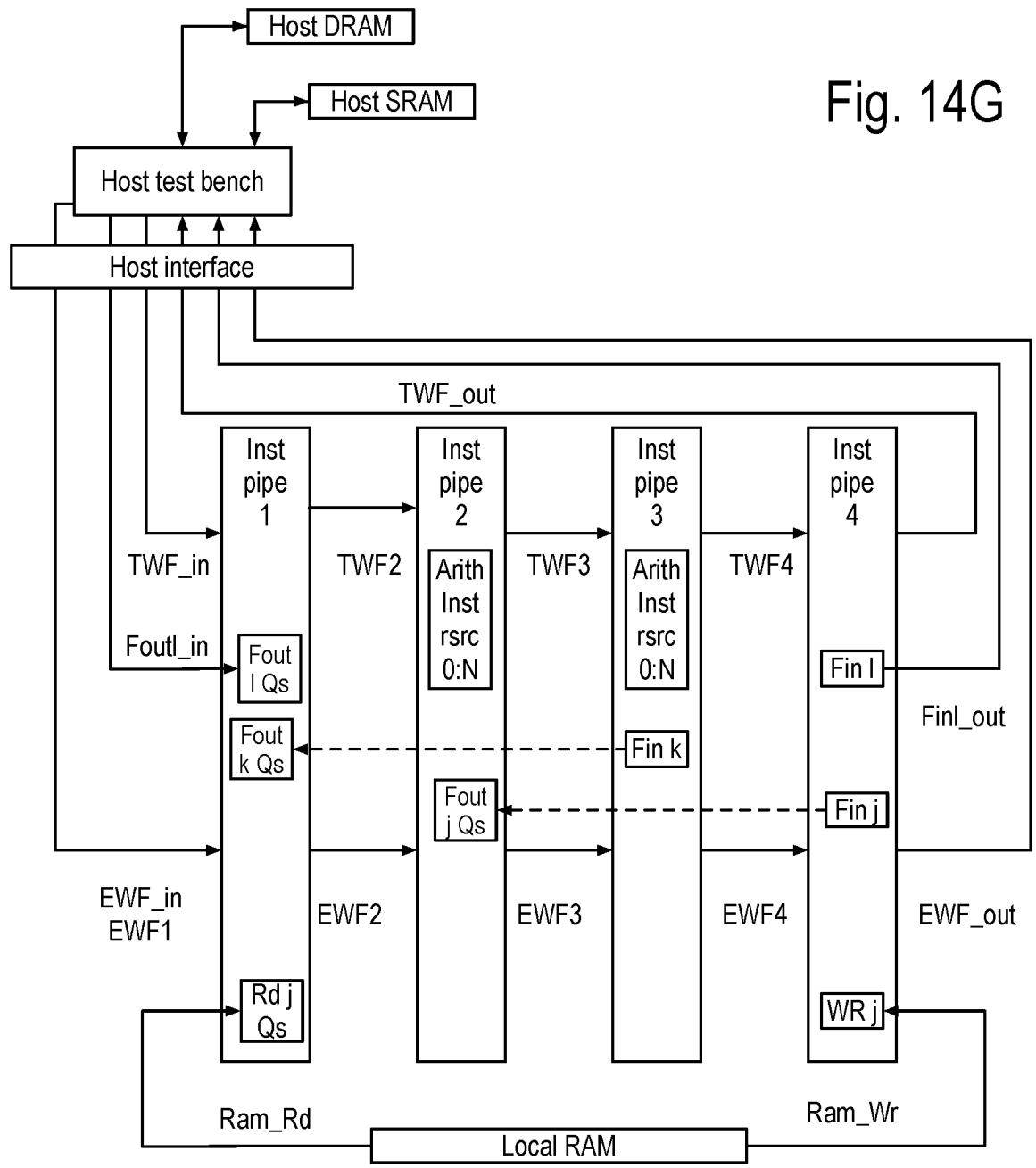

FIG. 14G shows a refinement to FIG. 14F which uses an instance of local RAM in the PL fabric. The host test bench may well interface to Host DRAM and/or Host Static RAM (SRAM).

Figure 15:
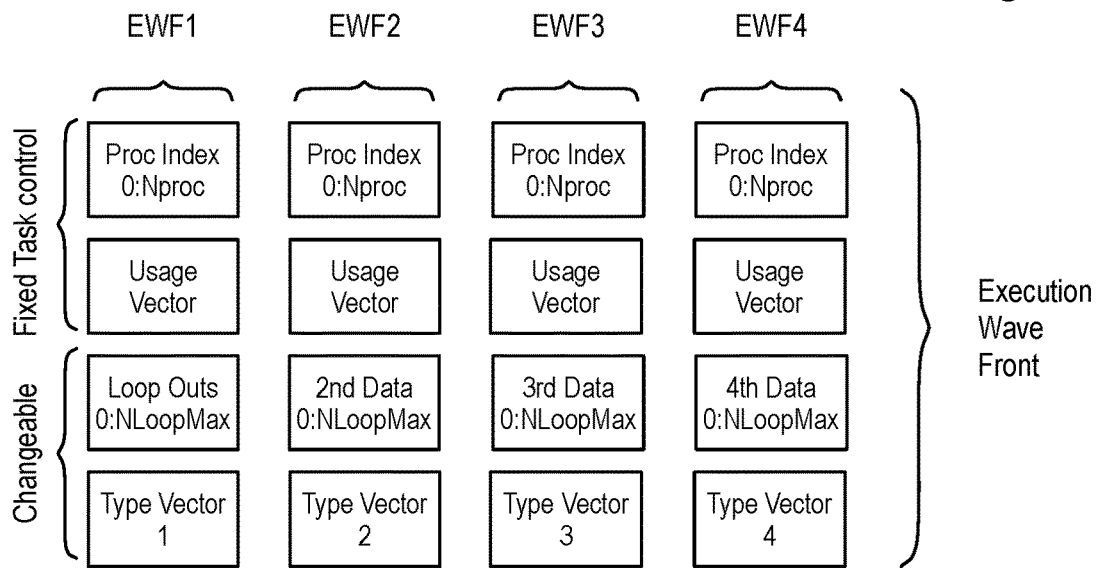
FIG. 15 shows some details of the Execution Wave Front progressing between Instruction Pipe 1 to Instruction Pipe 4, with the components which fixed task control, and the changeable loop outputs and data, as well as changeable type vector components.

FIG. 15 shows some details of the Execution Wave Front progressing between Instruction Pipe 1 to Instruction Pipe 4, with the components which fixed task control, and the changeable loop outputs and data, as well as changeable type vector components.

Figure 16:
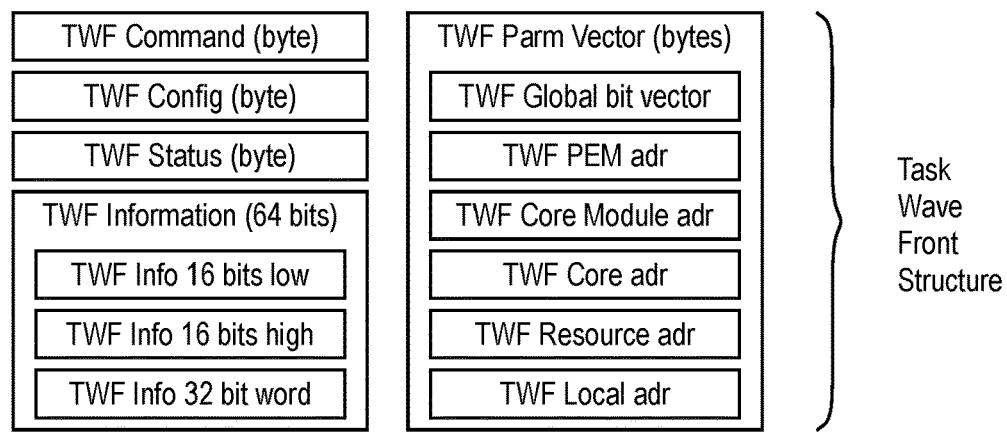
FIG. 16 shows the structure of a Task Wave Front (TWF) for an integrated circuit and/or a PEM Array.

FIG. 16 shows the structure of a Task Wave Front (TWF) for an integrated circuit and/or a PEM Array. Other implementations may further include as TWF parameters, one or more of the following: indications of a cabinet identifier (possibly for a 2-D or 3-D deployment of cabinets), a module identifier within the cabinet (1-D, 2-D, and/or 3-D), where the module may implement one or more of the ASIC 1 systems, such as found in FIG. 21.

History has shown that a system is next to useless until its application programs are developed and debugged. This is even more true with big data, which faces the added challenge of rapidly shifting algorithmic requirements. Each SiMulPro core implements a state trace mechanism for the EWF in hardware, which reveals, for each instruction pipe, and each instructed resource of the instruction pipe, the owning process, its state, the generated local instruction of the resource, the inputs to the resource, generated parameters, operations performed, results of the operation, and outputs. These traces are queued for a fixed number of EWF, for now 16. Recall that the EWF issues on each local clock cycle. There are no hidden states, nor hidden execution, or hidden configuration paths. The architecture is designed to speed program development, and hardware diagnosis, or debugging, throughout a system.

The thread condition registers are a hardware mechanism adding a second layer of organization to program development and debugging throughout each SiMulPro core. These registers relate the state of the SiMulPro core module, or PEM, to C/C++ source file(s). Each register supports internal execution of up to 16 levels of subroutine calls without any use of external memory outside each core. Parameter passing is through use of FIFO and LIFO queues, which are unloaded at the start of each function and loaded with scalar results upon return. The LIFO queues (also known as stacks) support recursion without needing extensive subroutine depth. The thread condition registers are setup to configure as a dispatching thread and agent thread(s) responding to the dispatch thread. This facilitates a structured development approach for big data applications, without forcing programmers into a fixed structure.

There is an implementation of a thread condition register which includes a subroutine/function argument and return stack. In some implementations, this is of fixed stack depth, for instance supporting 16 layers of subroutine calls. The top layer is comparable to a main program in C and/or C++. There are three implementation alternatives being considered for the subroutine/function stack.

First: each layer has a fixed size buffer and each parameter/argument inhabits a fixed size sub-buffer, for a specific maximum number of parameters/arguments. For example, each sub-buffer may be 16 bytes, and there may be a maximum of 16 parameters/arguments for each layer. There may be 16 layers.

Second, each layer's buffer may be of fixed size, but the parameters/arguments may vary in buffer size.

Third, the subroutine/function stack may be a window which can be moved to support more than the fixed number of layers which can be accessed at any time.

Figure 17A:
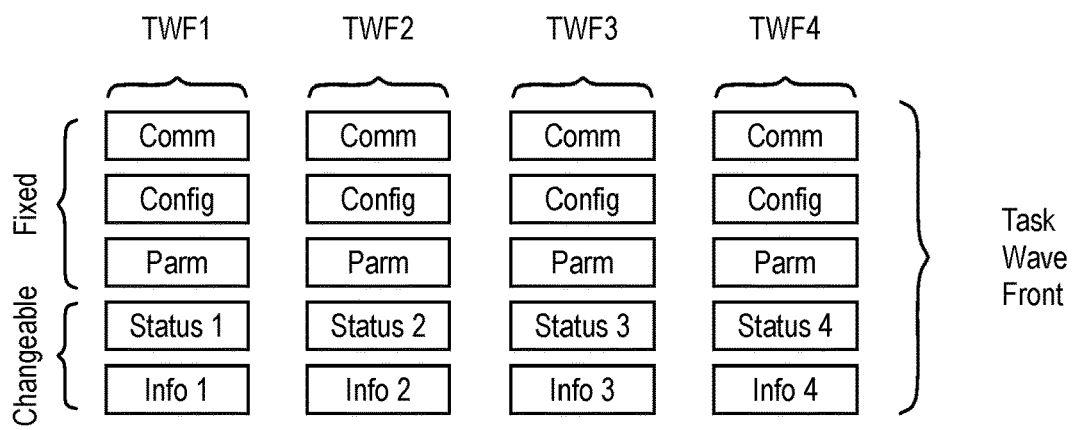

FIG. 17A shows some details of the TWF progressing between Instruction Pipe 1 to Instruction Pipe 4, again showing the fixed and changeable components.

FIG. 17B shows some details of the TWF commands.

Figure 18:
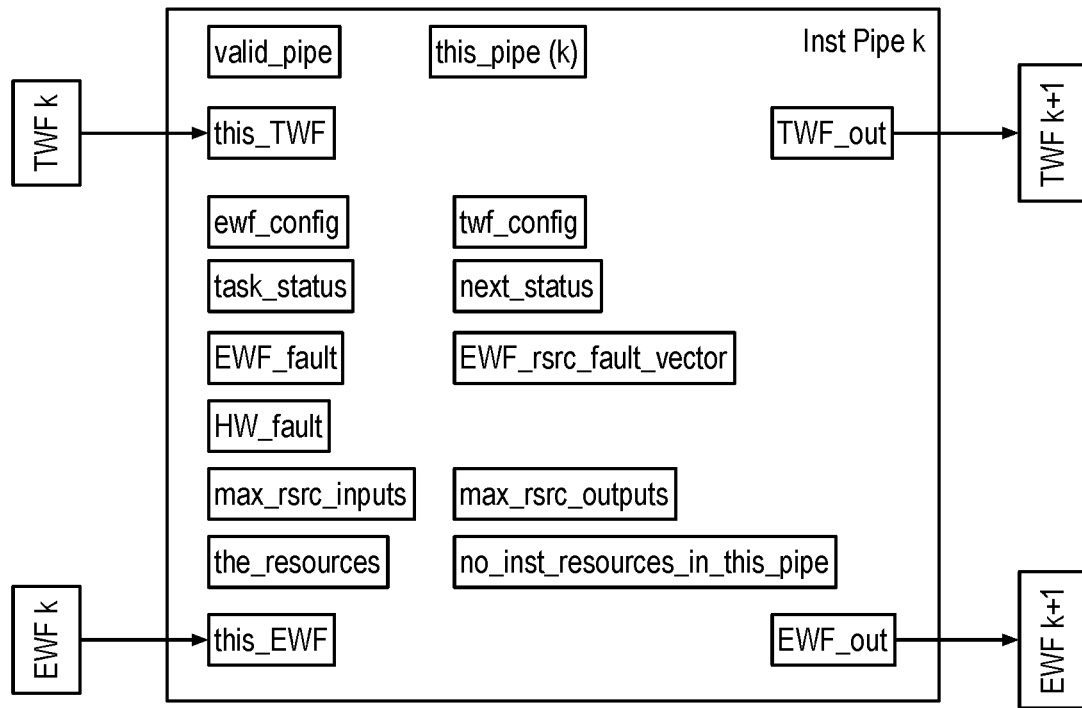
FIG. 18 shows some details of one or more of the instruction pipe k, including its instructed resources, labelled the_resources.

FIG. 18 shows some details of one or more of the instruction pipe k, including its instructed resources, labelled the_resources.

Figure 19:
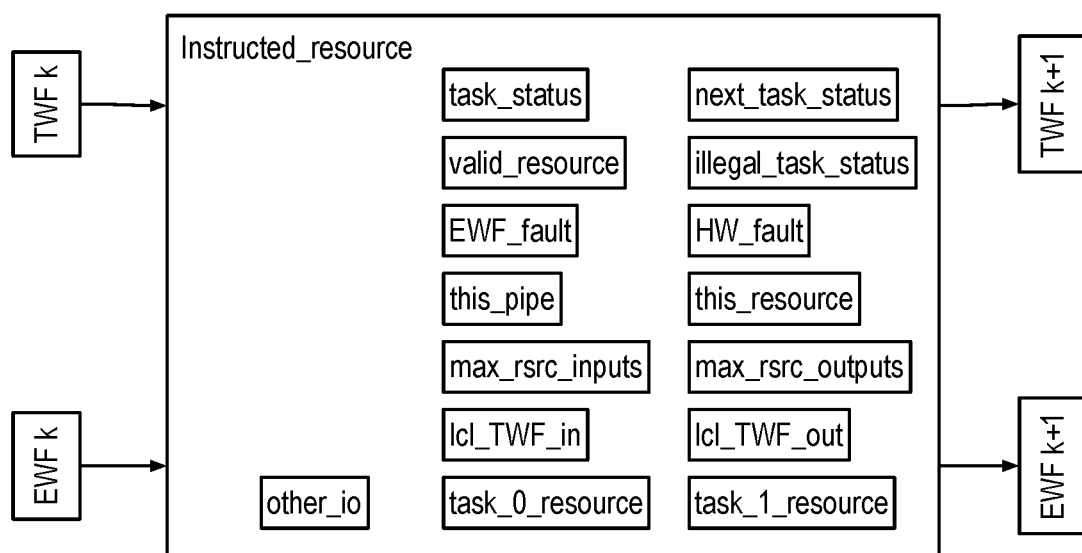
FIG. 19 shows some details of an instance of the instructed_resource found in the_resources of FIG. 18, which includes task_0_resource and task_1_resource.

FIG. 19 shows some details of an instance of the instructed_resource found in the_resources of FIG. 18, which includes task_0_resource and task_1_resource. Task_0_resource and task_1_resource implement the task components of the instructed resource. At any clock cycle, no more than 1 task_resource may be active. In certain situations, such as power up reset, both task_resources are inactive. The TWF primarily affects inactive tasks, but it can also halt the active task, and/or change the task_status by setting the next_task_status.

Figure 20:
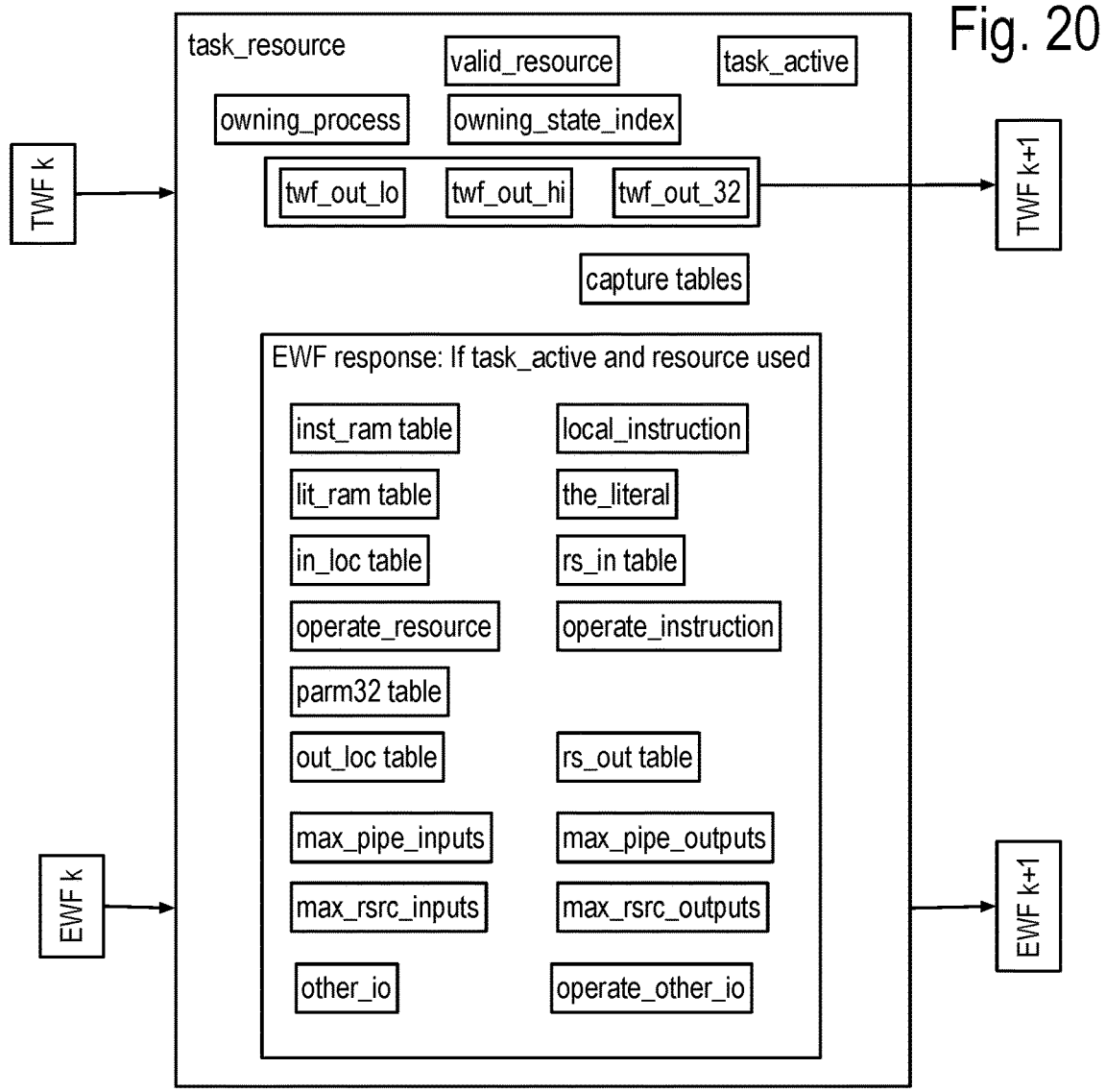
FIG. 20 shows some details of the task_resource instances of FIG. 19.

FIG. 20 shows some details of the task_resource instances of FIG. 19. For each task, its task_resource includes an inst(ruction)_ram_table, a lit(eral)ram_table, an operate resource method (or procedure) which operates the apparatus being instructed. Other_io and operate_other_io provide for configuring the mechanism by which data enters and leaves the instructed resource outside the EWF and the TWF. Examples of this are the feedback input and output queues, used both internally within the core, between cores, core modules, PEMs, and the Simultaneous Transmit And Receive (STAR) communication components.

Figure 21:
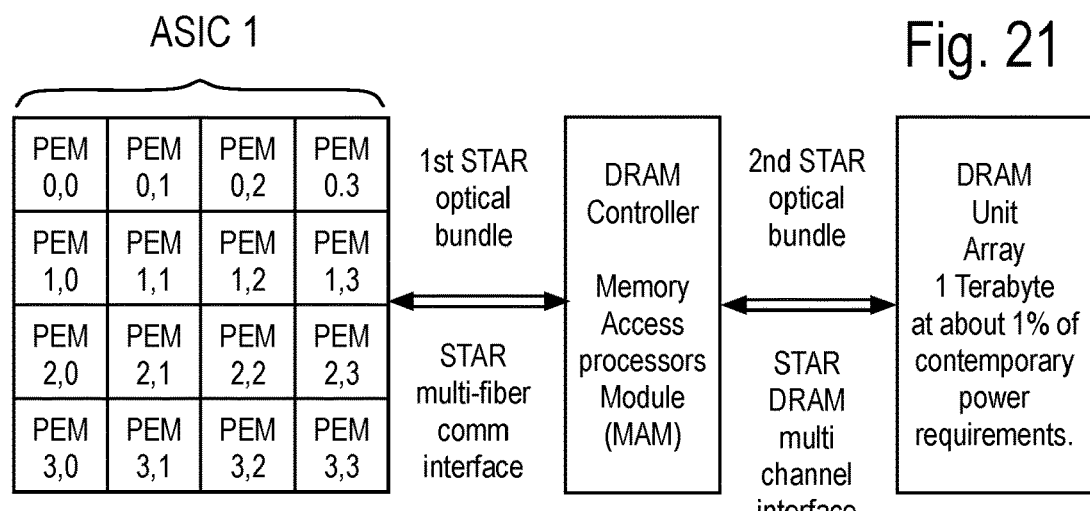
FIG. 21 shows an example system block diagram of the ASIC 1 communicating across a first STAR multi-fiber communication interface with a DRAM controller include an array of Memory Access processor Modules (MAM). The DRAM controller is further communicating across a second STAR multi-fiber channel interface with a DRAM Unit Array, which may operate a Terabyte of DRAM.
Figure 22A:
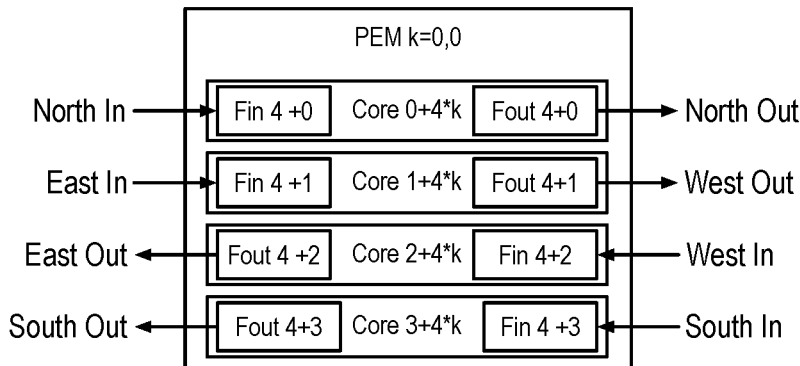
Figure 22B:
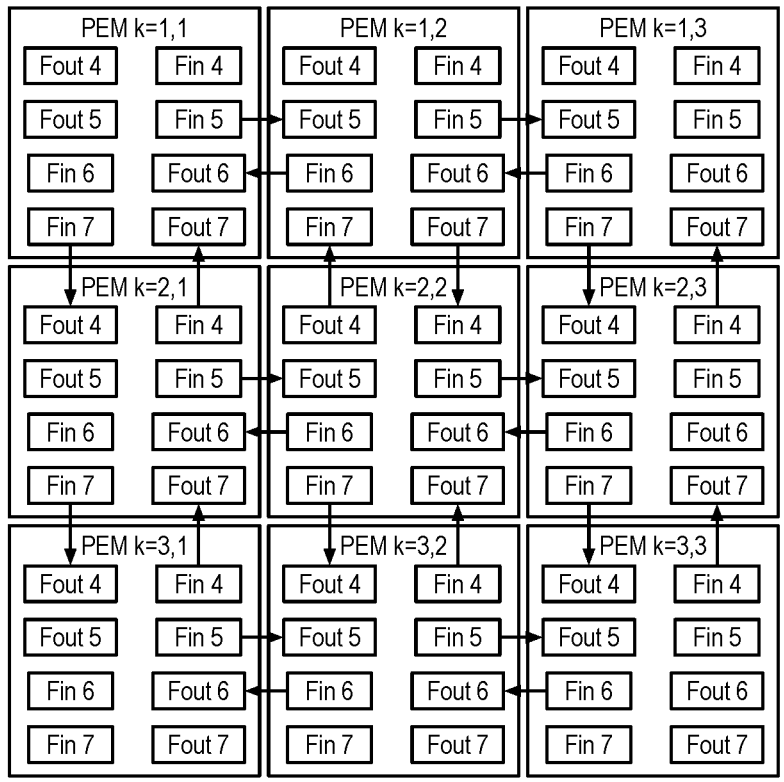

FIG. 21 shows an example system block diagram of the ASIC 1 communicating across a first STAR multi-fiber communication interface with a DRAM controller include an array of Memory Access processor Modules (MAM). The DRAM controller is further communicating across a second STAR multi-fiber channel interface with a DRAM Unit Array, which may operate a Terabyte of DRAM.

ASIC 1, operating with a 1 Giga-Herz GHz, will deliver over 1 Teraflop double precision floating point (FP64) sustained performance, as well as up to 1 Teraflop FP32 performance and up to 1 Teraflop FP16 performance. ASIC 1 is provided a DRAM interface operating across the data channels of the STAR as shown in FIG. 21, and FIG. 31A to FIG. 38. The DRAM interface supports 1 Terabyte (Decimal) of DRAM operating at about 1 percent of the energy required for standard DRAM interfaces. Standard DRAM interfaces need to support 3 level caches for both data and instruction processing in contemporary microprocessor systems. By way of example, a fetching a 64 byte buffer from DRAM, which has not been recently accessed, requires fetching 64*64 bytes (4K bytes) to fill the second layer cache buffer, which triggers a DRAM access of 64*64*64 bytes (256K bytes) to fill the third layer buffer. With the new DRAM mechanism what is fetched is either what is required, and what can be reasonably anticipated. The difference in this example is a ratio of 4K/1 between the contemporary and this new approach.

The data processing of ASIC 1 fetches no instructions from outside the chip for the task, because of the Virtual Very Long Instruction Word ($V^2LIW$) mechanism. While this architecture will also support embedded controller applications, the ASIC 1 general purpose discussion will be our discursive focus.

ASIC 1 has 16 instances of QSigma's Programmable Execution Modules (PEMs), each containing 4 instances of a SiMulPro core (module). ASIC 1 is neither an FPGA, nor a new, specialized processor. Reconfiguring of an entire ASIC 1 can occur in a millisecond. This is far faster than FPGA partial reconfiguration times today. This chip is targeted for graph processing, numerically intensive, signal processing, very high speed real-time control, and big data processing algorithm performance.

The 16 PEM implement simultaneous processing for 128 to 256 separate, independent programs, each of which can have up to 16 layers of subroutines, with no caching, superscalar interpreters, or multi-thread controllers in the hardware. These program units reside in their entirety within the 16 PEM, requiring no external instruction memory. Software utilities replace the functions of caches, superscalar interpreters, and multi-thread controllers. Interrupt latencies are measured in nanoseconds and can involve any combination of programs. We are proposing to take a multi-precision floating point accelerator, with comparable performance to the ARM v8, the RISC V BOOM with Hwacha extension, the Intel Xeon core chips, and/or the PowerPC 9. The multi-precision accelerator recasts the instruction processing from SIMD into our SiMulPro architecture. In each PEM, non-linear function calculations of logarithms, exponentials, and numerous non-linear algebraic, combinatoric, and probability related functions are accelerated and made far more accurate than found in today's implementations for both single and double precision floating point.

FIG. 22A to FIG. 22D show a simplified one hop nearest neighbor communications network using the components of the Feed In (Fin) and Feed output (Fout) shown in previous drawings. What is preferred for ASIC 1, is a one hop neighbor communications network across the 16 PEM of ASIC 1. Unfortunately, the inventor has not found a way to draw this simply, and submits these drawings to convey the idea. This simplification has been done to promote readability of this disclosure, not to limit the scope of the disclosure, nor subsequent claims.

Figure 23A:
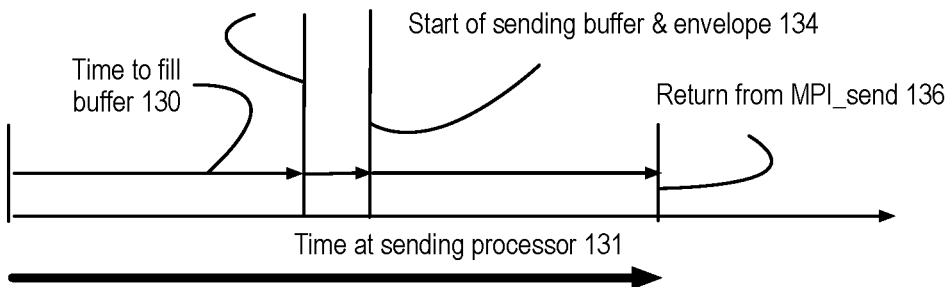
FIG. 23A, FIG. 23B and FIG. 23C show three common problems found in many message passing devices today. These problems are solved by the Simultaneous Transmit And Receive (STAR) message protocol, which will now be discussed.
Figure 23B:
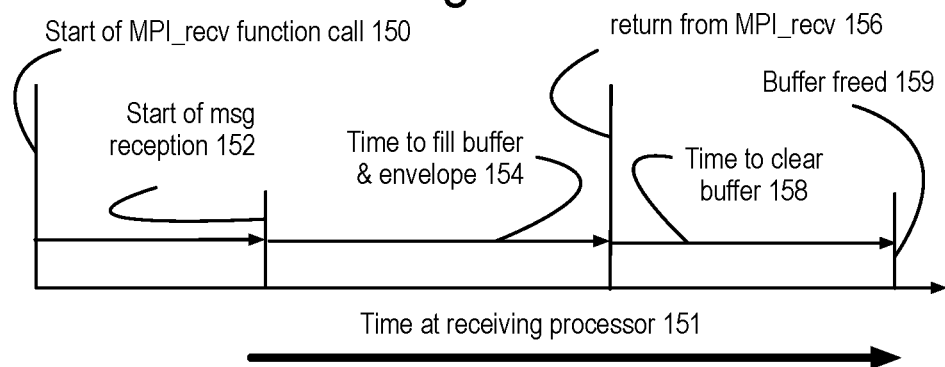
Figure 23C:
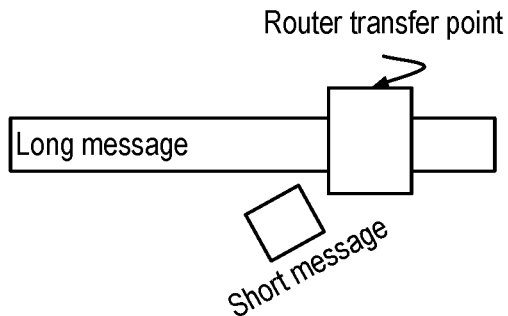

FIG. 23A to FIG. 23C show three common problems found in many message passing devices today. These problems are solved by the Simultaneous Transmit And Receive (STAR) message protocol, which will now be discussed.

Today, the Message Passing Interface (MPI) is a general purpose, function library, implemented on many machines, often across Ethernet networks. MPI has three inherent issues, and message passing in general has a fourth. First, as shown in FIG. 23A, message sending locks up the buffer until sending the message is done. Second, as shown in FIG. 23B, receiving a MPI message locks up a buffer until the message is received and for the time required to process, or move, its contents elsewhere. Third, as shown in FIG. 23C, a short message can be stalled by a long message at a router transfer point. Intel has solved the third issue, but not the first two. The fourth issue relates to large scale systems, which tend to stall when individual messages fail to be properly received. All of these issues are inherent in systems providing big data and numeric support today.

Simultaneous Transmit And Receive (STAR) message protocol: The system implements the STAR messaging protocol, as hardware primitives systematically resolving all of the above MPI and messaging issues as an example of DSAP. This gives big data application developers a hardware tool, fundamentally improving system communications.

A STAR message protocol requires that any STAR message be received in a few, preferably one clock cycle, and the receive buffer cleared on the next.

Any STAR message is sent on a few, preferably one clock cycle and its buffer is free on the next.

Each STAR message clears each local pipe stage in the routers in a few, preferably one local clock, so that no message stalls another for an unknown amount of time.

To meet these requirements, each STAR message has a fixed length payload of data and a fixed length command field to direct the routers and receivers in their disposition and transfer of the message as shown in FIG. 25A to FIG. 25E. The command and its interpretation throughout the system is under complete control of the overall big data program(s) embodied in the system. Each payload consists of a 16 byte (128 bit) data payload and a 32 bit command field.

Figure 24:
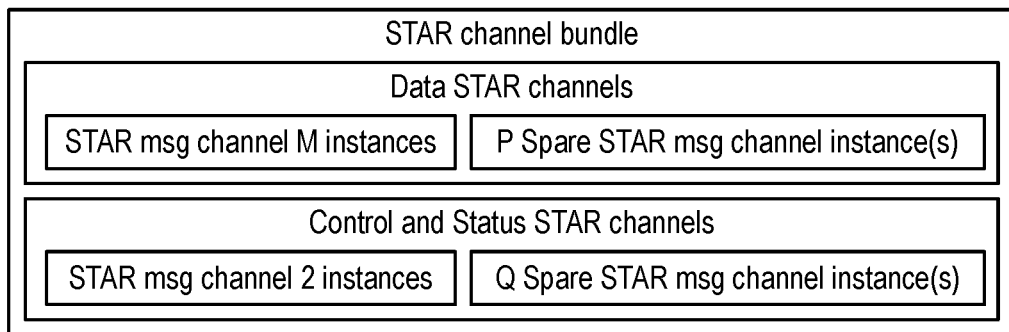
FIG. 24 shows an example of the STAR channel bundle including separate data channels and task/control channels, which are physically separated, so data and task/control cannot alter each other during communication.

FIG. 24 shows an example of the STAR channel bundle including separate data channels and task/control channels, each with spare channel(s), which are physically separated, so data and task/control cannot alter each other during communication. At least one of the control/status channels carries task and instruction related messages, such as task scheduling commands, exception trap messages, debugging controls and responses. At least one other control/status channel handles data access requests, both local or across the system.

The STAR messages traverse distances (>10 cm) at high enough densities (Terabits/per STAR bundle), which electrical conductors (such as LVDS signal paths) cannot reliably carry outside a chip. The chip interfaces need to be opto-transceivers. The SDH will use the STAR bundle opto-transceiver interface. Global Foundries has publicly announced opto-transceivers compliant with Ethernet able to operate at 50+ Gbits/sec. Each STAR channel uses 4 optical fibers, each operating opto-transceivers with sustained bandwidth of 50 Gbits/sec. This gives a data bandwidth of 2 Terabits/sec per STAR bundle. Further, as found in priority application Ser. No. 62/595,583, Ser. No. 62/396,315, and Ser. No. 62/742,417: The opto-transceivers may be compliant with an Ethernet. In claims QQ09 of these priority applications: The opto-transceivers are adapted to transmit and receive messages with a bandwidth of at least Nbits Gigabits per second, wherein Nbits is at least one member of the group consisting of 20, 40, 50, 60, 80, and 100. Additionally, an Information Disclosure Statement shows that as of the filing date of the parent application, physical transport layer specifications were in place for 50, 100 and 200 Gigabit per second, this is evidence that one of ordinary skill would know that the state of the art included up to 50, 100 and 200 Gigabit per second per opto-transceiver.

Compare this to the Sunway supercomputer in China as reported in 2016, with a system interface at the MPE/CPE chip of 16 Gbytes/second=128 Gbits/sec with a latency of 1 microsecond. The ratio of 2 Tbits/256 Gbits is roughly 16 at essentially no latency. This bandwidth insures much less chance of the SDH system stalling, unable to receive enough data, either at the chip set level, or across the SDH system network of 16 instances of this chip set. While Global Foundries is in production with their opto-transceiver, there is no evidence of any chip implementing a bank of 80 transceivers, as is implemented in the SDH DPC and DRAM controller chips during Phase 3.

An STAR Trinary Router (STR) chip can operate three times that many opto-transceivers. It is prudent to develop a second ASIC to resolve these the STR implementation quality issues through a series of experiments. The second ASIC will include 240 or more opto-transceivers, an experimental error correction circuit interfaced to units of 4 opto-transceivers neighboring each other, and then coupled to the STAR channel cores, implemented as SiMulPro cores. The STAR channel cores feed another SiMulPro core module implementing the STR Logic, which routes STAR messages from the three STAR bundles as inputs to those bundles as outputs. The STR Logic is instantiated not only in the STR chip, but also in the Data Processor Chip and DRAM controller chips, as in-chip network routers.

FIG. 25A to FIG. 25E show some examples of the relationship between a data payload and several Error Control Codings (ECC). Error correction and detection is implemented in such a way that burst errors are essentially treated like random errors across the entire data payload. This will be disclosed to support varying the ECC correct/detection scheme based upon a real-time assessment of the channel noise indicated by the receiver's error detection rates, which can resiliently respond to massive and rapid changes in the noise envelope without loss of data. This noise flexibility shows promise as a mechanism to withstand proximity to the Sun or to Jupiter for space borne computers.

The following insures the reliability of the optical network by implementing these innovations: By having a fixed payload size, all error behavior and statistics can be assessed against a stable background. Deep error correcting coding (ECC) will be implemented to support 1 bit correct and 5 bit detection on groups of 32 bits of the data payload. However, it is highly probable that the bit error distribution will not be evenly distributed across a STAR message payload through the SDH optical network. To address this, the transmitter and receiver of an optical fiber will have mirrored stages of bit distributors. The effect of the bit distributors will be to even out the distribution of errors so that they do not cluster across this fiber. Using this allows the 4-correct-5-detect to fix 20 bits out of the 160 in the payload. However, it is also possible for the bit error distribution to change over time.

Two approaches may be exercised across each fiber of an optical network based upon the STAR messaging protocol, when starting up a system:

The first approach, upon startup, or in a designated time subslice, a calibration exercise is run, and the payloads with the ECC fields may be compared against what they should be. For now, the time slice is a second and the subslice is a millisecond. A bit error location histogram is generated not only for the payload, but also for the ECC fields. This histogram is then analyzed to create a reordering incorporating the combined payload and ECC fields. Initially a payload reordering is the identity permutation, because the payload is unchanged from the payload plus ECC reordering.

In the second approach, the error bit locations of the payload, by itself, are tallied to create a $2^{nd}$ real-time error histogram, without altering the sustained communication bandwidth. The histogram is based upon the current payload plus ECC reordering. This $2^{nd}$ histogram can be reviewed in hardware, and if the bit error pattern is not distributed evenly enough, particularly when the reported bits requiring correction grows, a new reordering of the payload can be calculated. Both the current payload reordering and this new payload reordering are members of a payload permutation group, which is a subgroup of the payload and ECC permutation group. The next payload reordering is the permutation product of these two payload reorderings. The overhead of the calibration exercise is estimated as the ratio of the subslice to the time slice, causing a 0.1% performance degradation of bandwidth, which is acceptable. However, these two methods can and probably will be merged. By implementing this hardware and operational methodology, the otherwise large likelihood of risk in the opto-transceivers is reduced to an acceptably low likelihood and impact. In the operation of the STAR protocol, if nothing else works, a spare optical channel can replace any active channel which is in, or about to be in, trouble. This fault resilient response does not lose a single message, and is done correcting optical network in less than 2 microseconds.

Figure 25A:
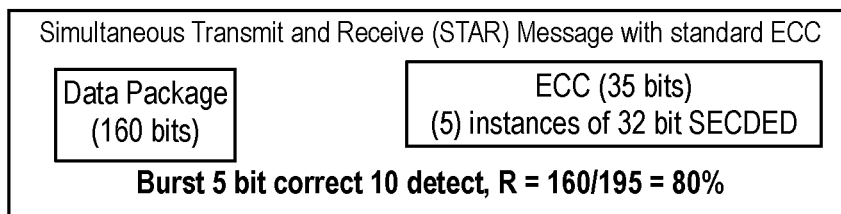
FIG. 25A, FIG. 25B, FIG. 25C, FIG. 25D and FIG. 25E show some examples of the relationship between a data payload and several Error Control Codings (ECCs).

FIG. 25A shows the use of a standard ECC mechanism, which corrects one bit and detects two bit errors in a 32 bit code word. However, there is no way to assure that will be enough. Therefore, the 160 bit data payload is partitioned into 5 interleaved 32 bit code words, each with its own 7 bit Single Error Correct Double Error Detect (SECDED) ECC field, which are also interleaved. Now burst errors of up to five bits intersect with each of the 5 interleaved code words in no more than 1 bit, so that the collective ECC mechanism can correct a 5 bit curst error.

Figure 25B:
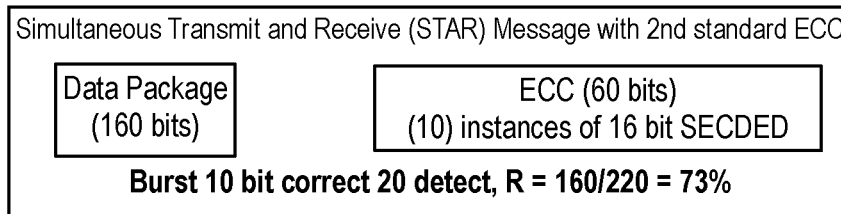

FIG. 25B shows an example of an ECC configuration based upon partitioning the 160 bits of data payload into 10 instances of 16 bit data payloads, each with their own 6 bit ECC fields capable of SEDDED. Now a burst of up to 10 bits can be corrected and up to 20 bits can be detected.

Figure 25C:
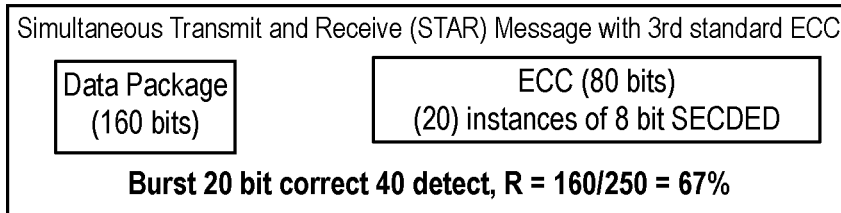
Figure 25D:
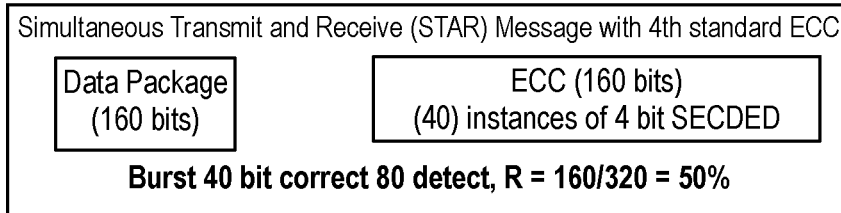

FIG. 25C shows an example of an ECC configuration based upon partitioning the 160 bits of data payload into 20 instances of 4 bit data payloads, each with their own 4 bit ECC fields capable of SEDDED. Now a burst of up to 20 bits can be corrected and up to 40 bits can be detected. The ECC coding schemes used in FIGS. 25A to 25C can be found in Hsiao's original paper, as well as FIG. 25D shows an example of an ECC configuration based upon partitioning the 160 bits of data payload into 40 instances of 4 bit data payloads, each with their own 4 bit ECC fields capable of SEDDED. Now a burst of up to 40 bits can be corrected and up to 80 bits can be detected. Interestingly, this ECC scheme is found in Hamming's original paper on error correcting and detecting codes.

Figure 25E:
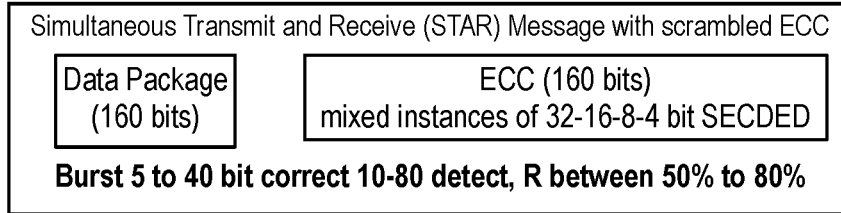
Figure 26:
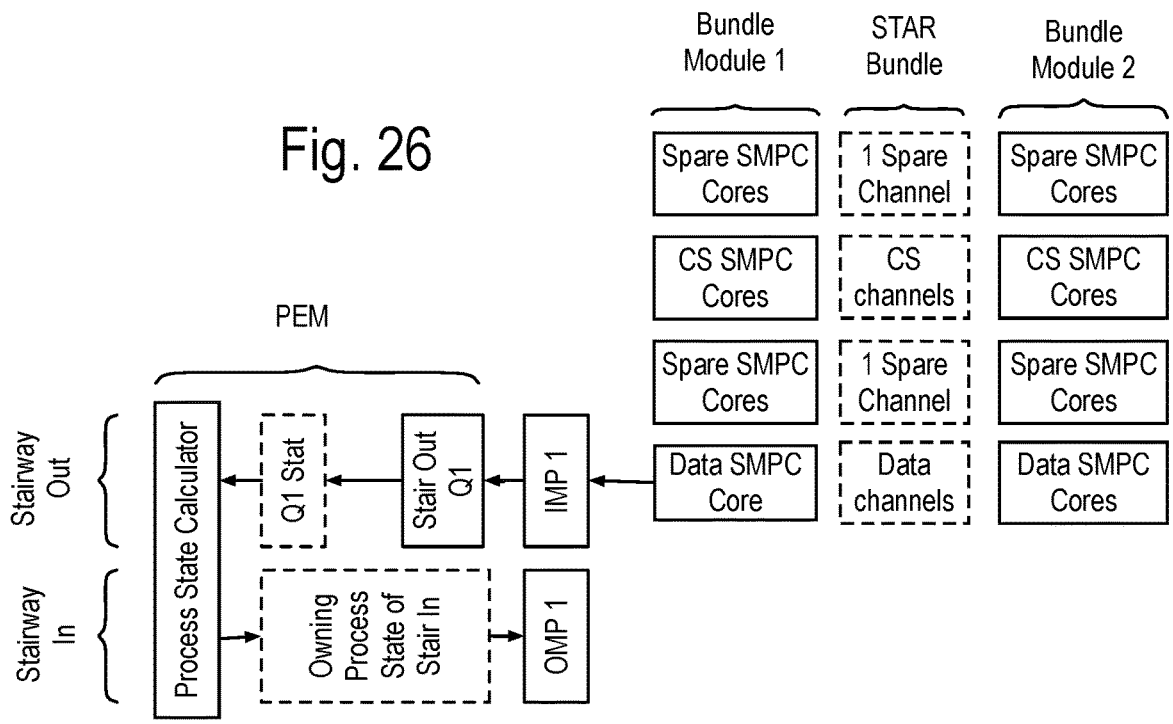
FIG. 26, FIG. 27, FIG. 28, FIG. 29, and FIG. 30 show further details of the STAR communications apparatus, providing an optical communications capability down to individual integrated circuits.
Figure 27:
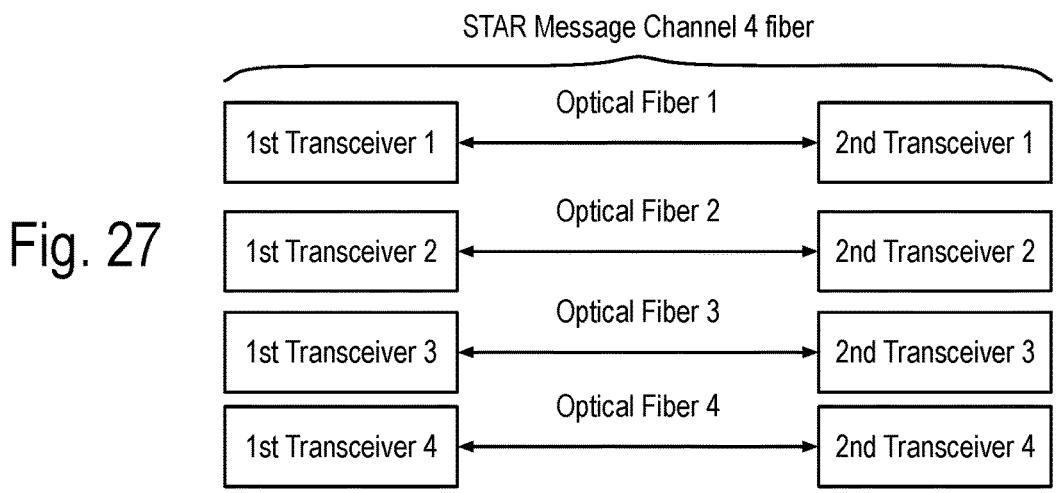
Figure 28:
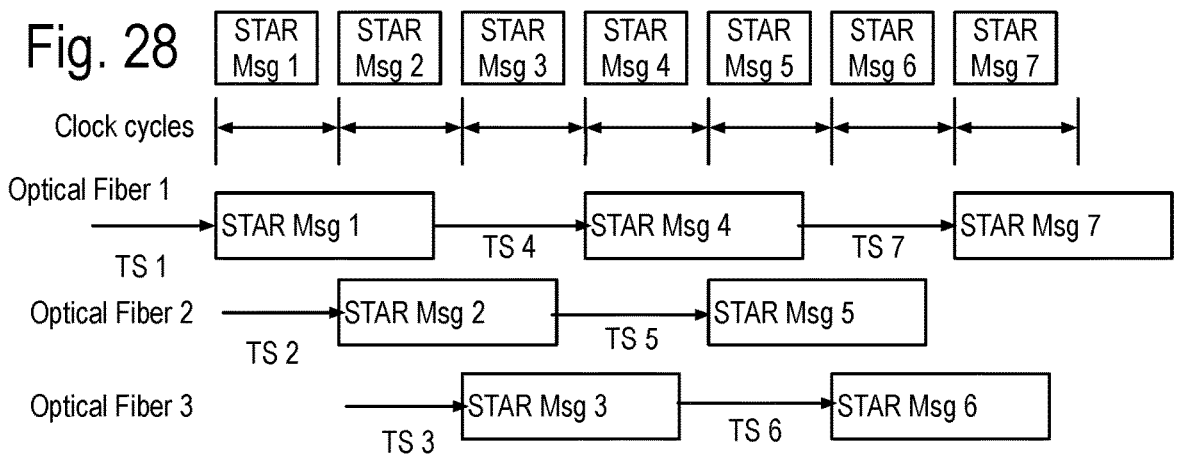
Figure 29:
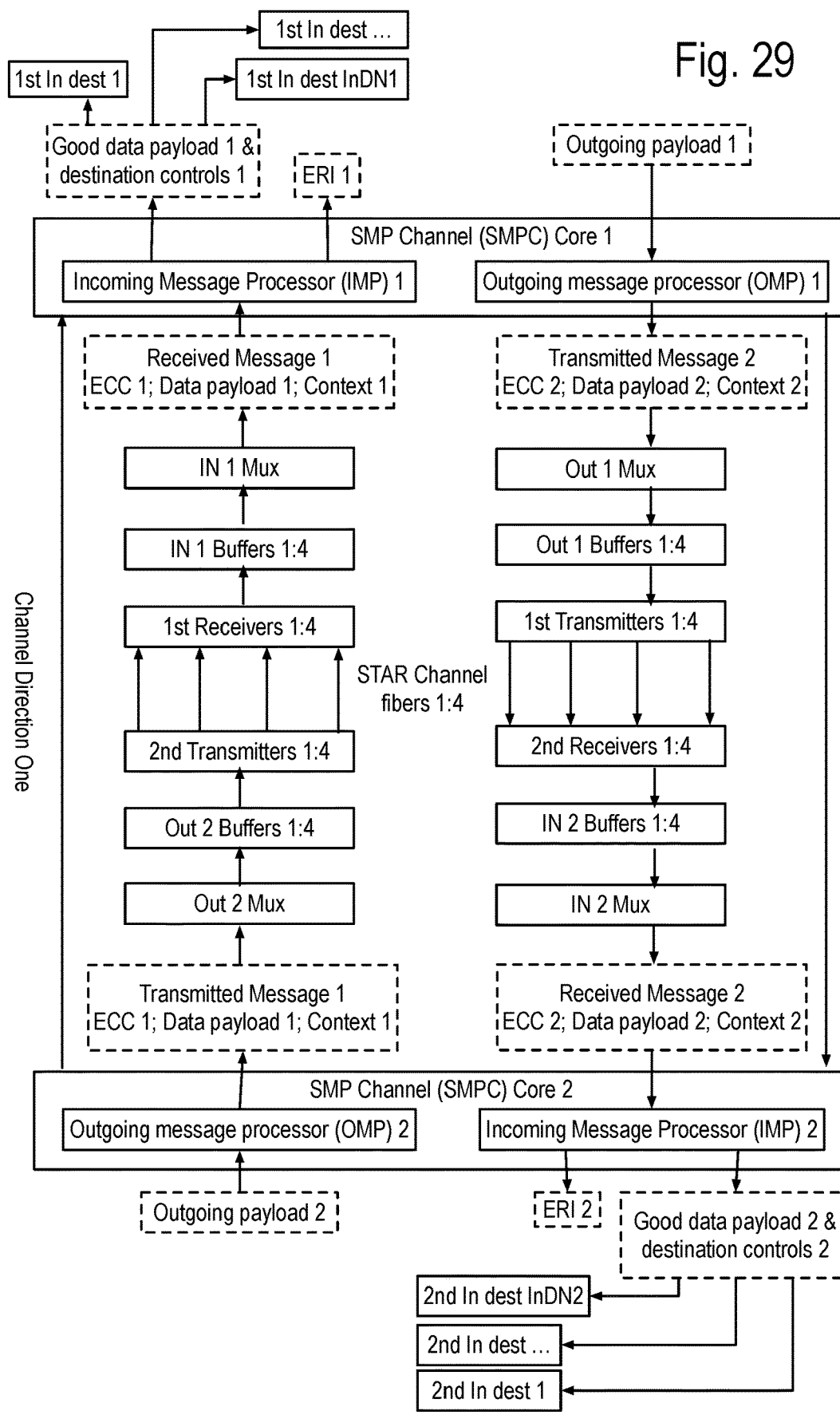
Figure 30:
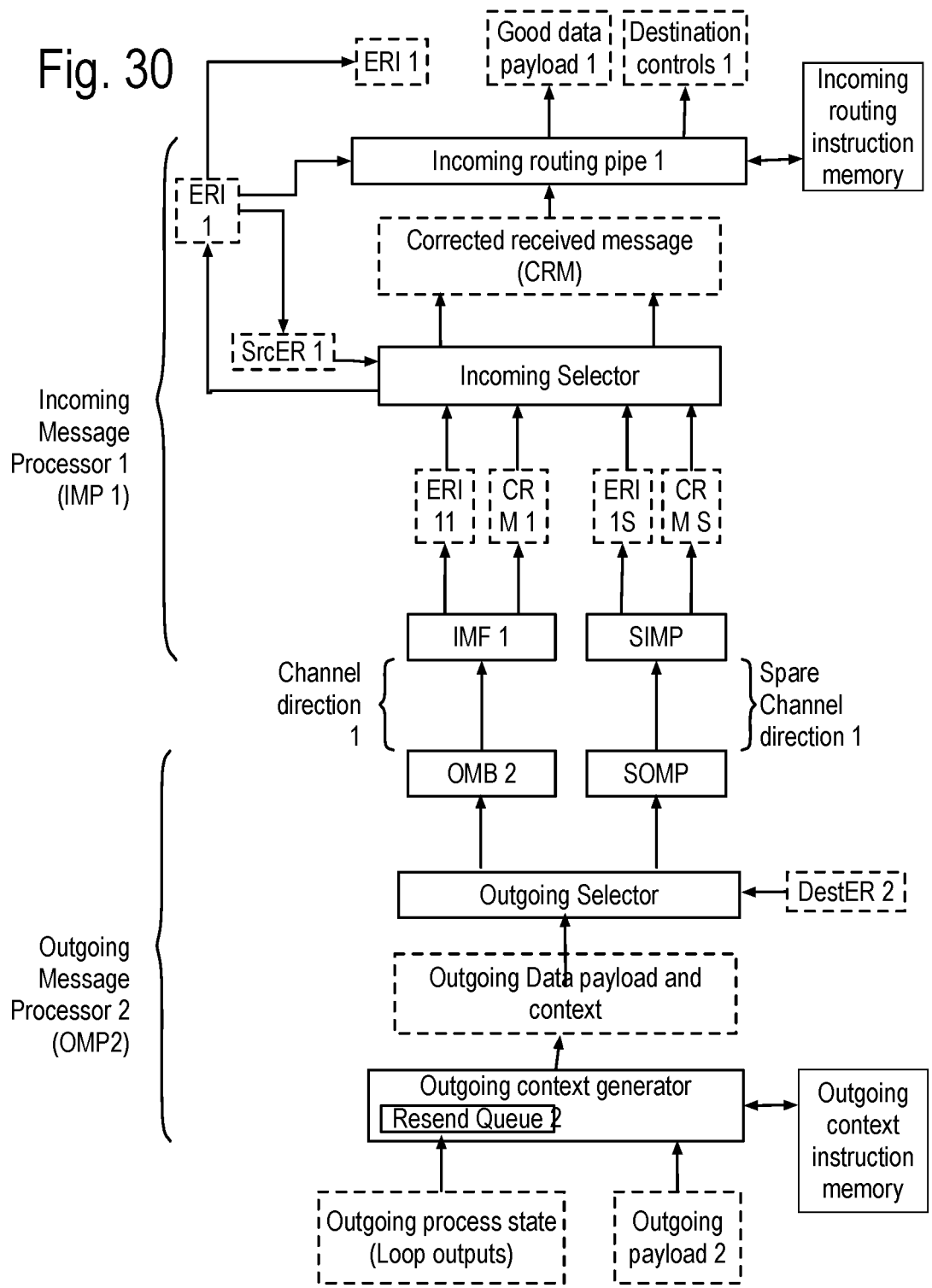

Structured injection of multiple errors into a single code word could disrupt the error detection mechanism as presented. FIG. 25E shows and example of implementations can include multiple code words of differing length, possibly implemented with further scrambling of the code words. The scrambling could be different on every channel, rendering the scrambled, encoded messages nearly immune to disruption.

This capability, combined with previously disclosed fault resilience response circuitry, can enable the advent of optical communications to carry the bulk of the communication between chips in a data center, removing today's limitation of optical communications to only communications between racks and similar units.

FIG. 26 to FIG. 30 show further details of the STAR communications apparatus, providing an optical communications capability down to individual integrated circuits, which can robustly respond to faults, through configuration of the ECC components first mentioned in FIG. 25A to FIG. 25E. The apparatus also retains transmitted data packages until their correct reception is confirmed, and if not, reconfiguring not only ECC, but also timing and phase controls, and resending once the reconfiguration is stable. Should that fail, the apparatus can substitute a spare optical fiber, and reuse it instead in a similar fashion.

Returning to FIG. 21: There are three central DRAM issues required for big data.
   First, each DRAM array containing a Terabyte cannot implement the standard approach to DRAM access. That standard approach requires between 10-20 Watts to operate 8 Gbytes. Scaling that by a factor of a 128 would make the power requirement for DRAM array, at least 1 Kilowatt, which is unacceptable. Another access approach is required to solve this, which is discussed in the next paragraph.
   Second, big data programs and sparse matrix solvers, routinely trigger cache faults, because they do not fetch data only from an already accessed local neighbor in the DRAM. Consequently, in a typical three level cache, they trigger a 64 byte page fault on the first level, a $64^2=4K$ page fault on the second, and a $64^3=256K$ page fault on the third level, which fetches 256K bytes from DRAM. This has been unofficially confirmed through contacts in the DRAM industry.
   Third, there are far more likely to be memory faults in each of these DRAM arrays compared to DRAM accesses in notebooks and other common computers. DRAM ECC approaches will be used, but are not new, and do not resolve these issues.

The first two DRAM issues through a combination of the SiMulPro core architecture, the PEM and ASIC 1 each implementing a memory access request and response protocol.
   DRAM access is requested in anticipation to its operation, and the requested operations only cause access to exactly what is required for the operation, nothing more. This access protocol removes somewhere between a factor of 100 and 1000 in memory access overhead to fill the caches with data which will not be used.
   Additionally, part of the DRAM array can be held in reserve and used through a logic to physical table access scheme discussed in FIG. 31B to FIG. 38. Research performed at the University of Toronto indicates that no more than a 10% overhead would insure removal of 90% or more memory faults in a system the size of the *Sequoia*. Sequestering degrading pages removes them before they fail. These tools provide far better efficiency and reliability with enough data memory and communication to directly support big data applications.

Figure 31A:
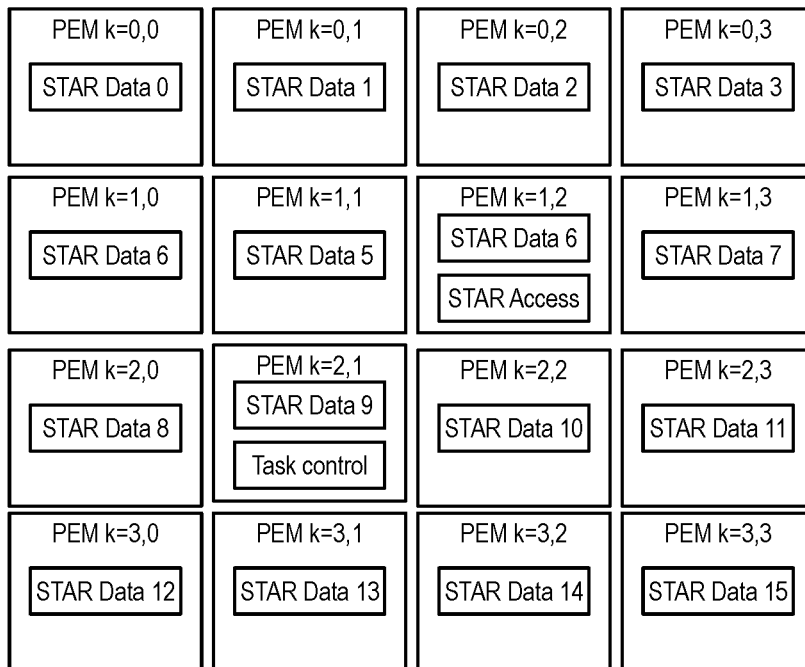
FIG. 31A show the distribution of one STAR bundle's channel input and output ports throughout the PEM Array (PEM 0:3, 0:3) of ASIC 1.

FIG. 31A show the distribution of one STAR bundle's channel input and output ports throughout the PEM Array (PEM 0:3, 0:3) of ASIC 1.

Figure 31B:
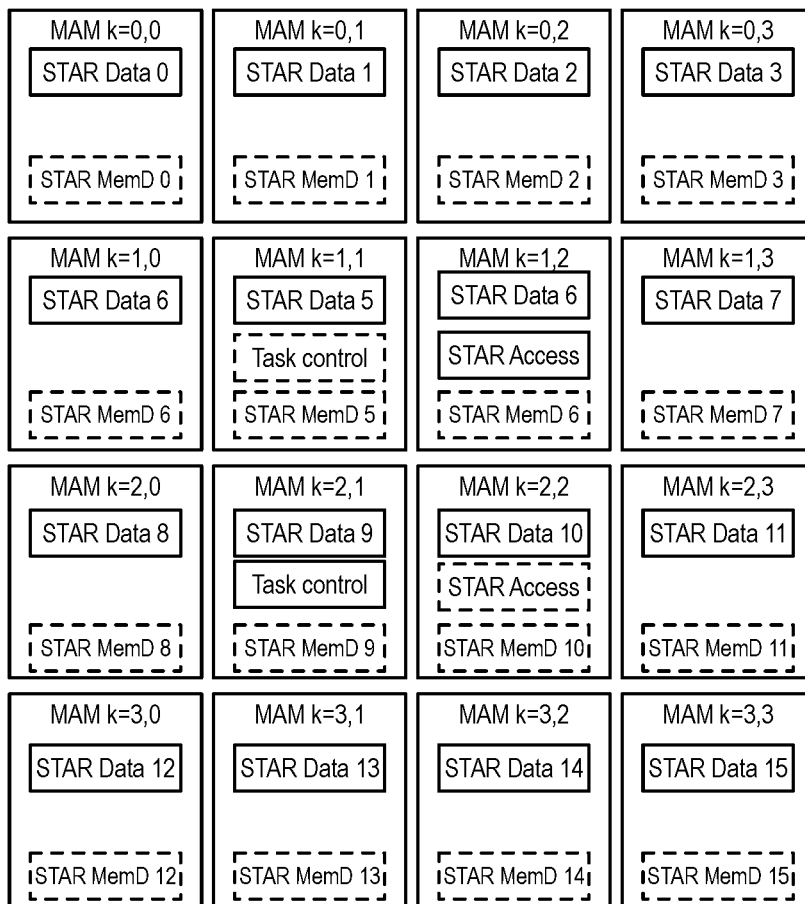
FIG. 31B shows the distribution of two STAR bundles' channel input and output ports throughout the Memory Access Module array (MAM 0:3, 0:3).
Figure 36A:
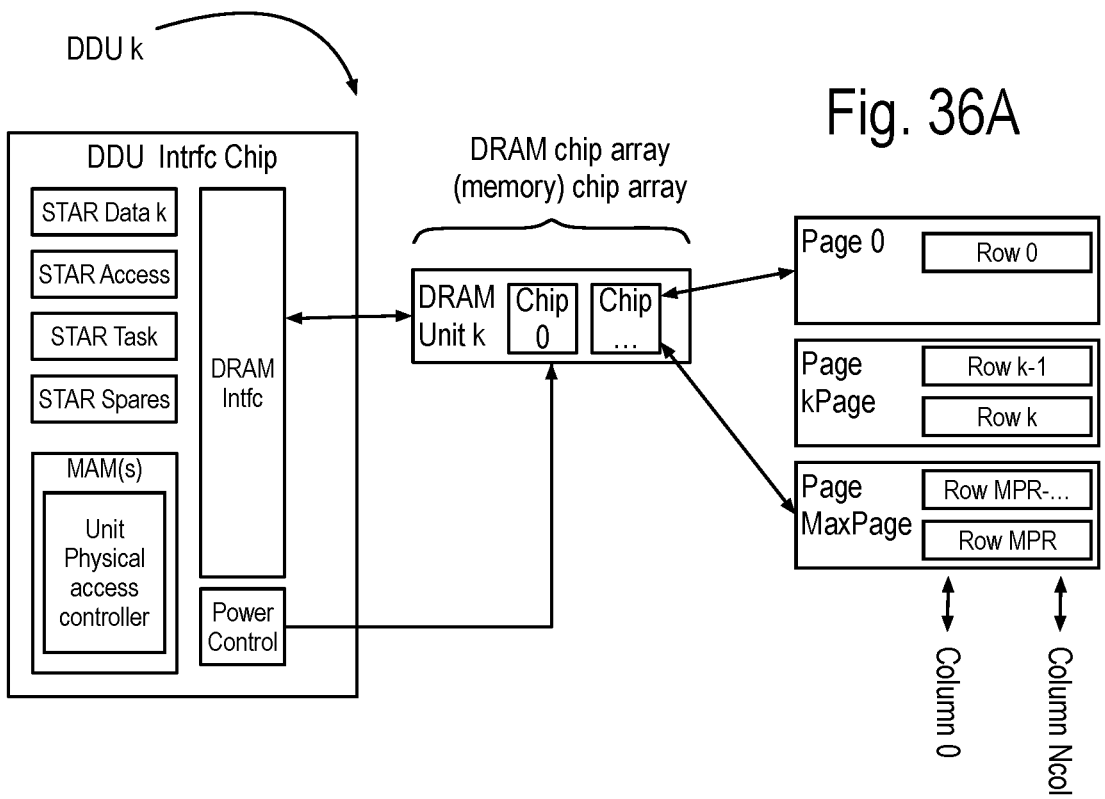
Figure 36B:
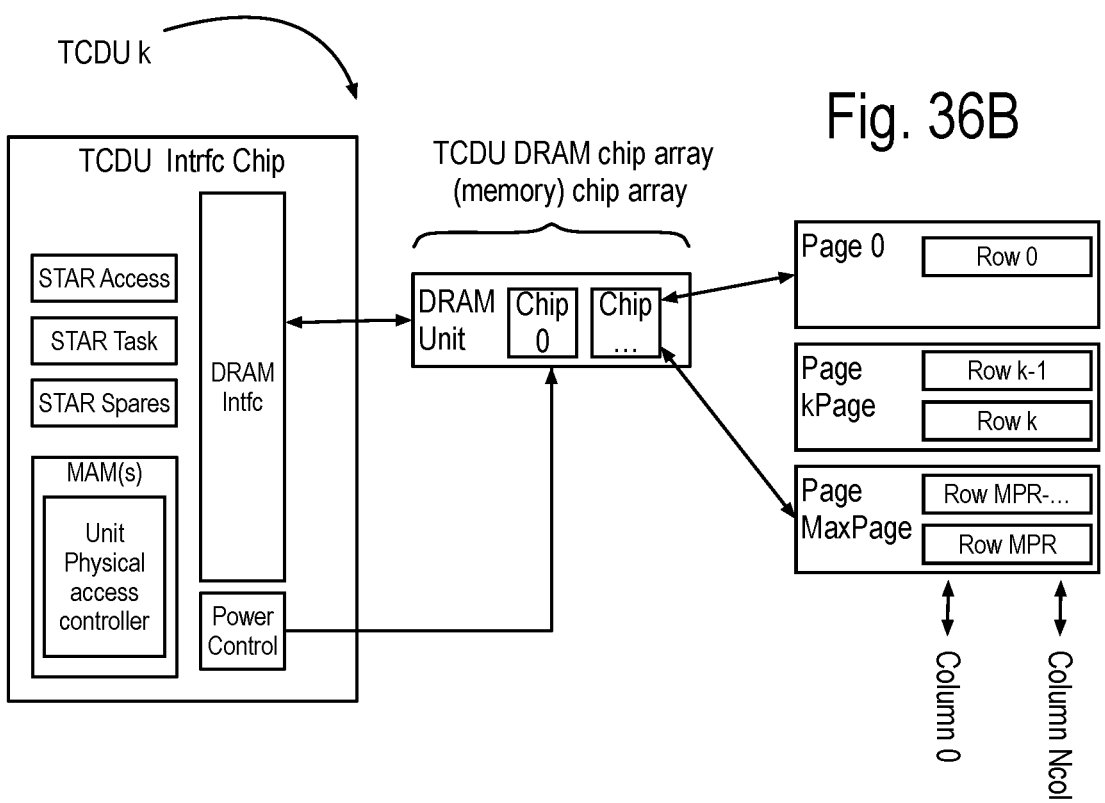

FIG. 31B shows the distribution of two STAR bundles' channel input and output ports throughout the Memory Access Module array (MAM 0:3, 0:3). The first STAR channel bundle communicates with ASIC 1. The second STAR channel bundle communicates with the DRAM Unit Array first introduced in FIG. 21.

FIG. 32 shows an example of the Memory Access processor Module (MAM) including 4 instances of the Memory Access Processors, first shown FIG. 5A to FIG. 5C, each constrained to perform only unsigned integer arithmetic. Because of this constraint, the Memory Access Processors can never calculate an address before the starting address of a buffer, thereby eliminating, by construction, an avenue by which viruses and rootkits can move around in the data memory of a system. Each Memory Access Processor also includes one or more instances of local static RAM, which is frequently used for temporary buffers in the transfer of data or information between DRAM (or other dense, fast memory devices) and their communication across the STAR channel bundle to ASIC 1.

Figure 40:
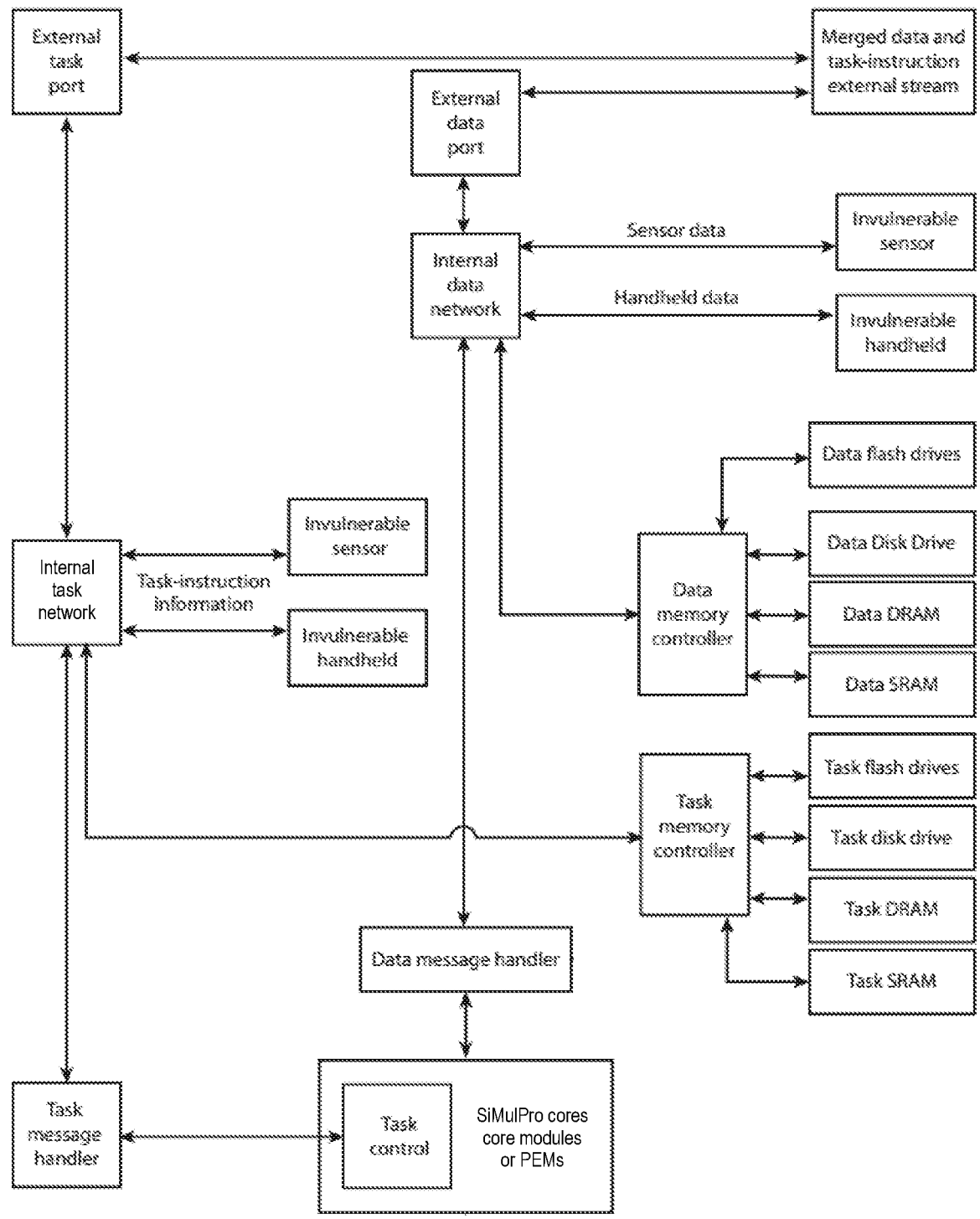
FIG. 40 shows a system in accord with the embodiments disclosed herein which is immune by construction to infection by data memory devices, data messages, and/or data operations.

FIG. 33 to FIG. 38 show some details of the memory controllers of FIG. 40 implementing separate controllers and data memory devices for data and for task control to enforce, by construction, immunity to virus infection by viruses and rootkits as discussed in FIG. 40.
   FIG. 33 shows some details of the DRAM controller of FIG. 21, which maintains separate task control and data related logical to physical address translators, each separately configured to access separate elements of the DRAM Unit Array shown in FIG. 34. This is a system component virus and rootkit immune system of FIG. 40. It contains separate memory controllers for data and for task control memory components shown in FIG. 34.
   FIG. 34 shows some details of the DRAM Unit Array of FIG. 21, which includes a DRAM Data Unit (DDU) array and at least one Task Control DRAM Unit (TCDU), which provides separate DRAM devices for data and task control information. This is a system component which supports virus and root kit infection immunity as discussed in FIG. 40.
   FIG. 35A shows the STAR communication ports of the DRAM Data Unit (DDU) of FIG. 34.
   FIG. 35B shows the STAR communication ports of the Task Control DRAM Unit (TCDU) of FIG. 34. Note that the TCDU does not show the STAR data channel found in the DDU of FIG. 35A. If the TCDU and DDU are both instances of a single manufactured chip, this indicates that the TCDU instance is configured by the hardware to not interact with the circuitry related with the STAR data channel Often in today's technology, this can be achieved by tying a pin of the chip to a fixed logic signal, which in the instances of the DDU is ties to the opposite logic signal, assuming two valued logic signals. In other implementations, this may be achieved in other well understood ways.
   FIG. 36A and FIG. 36B show examples of the DDU interface chip and the TCDU interface chips, respectively. Each of these chips operates the DRAM unit including at least one DRAM chip organized as multiple pages, with each page typically including at least one row.

FIG. 37A to FIG. 38 show further details regarding the DRAM controller.

Figure 39:
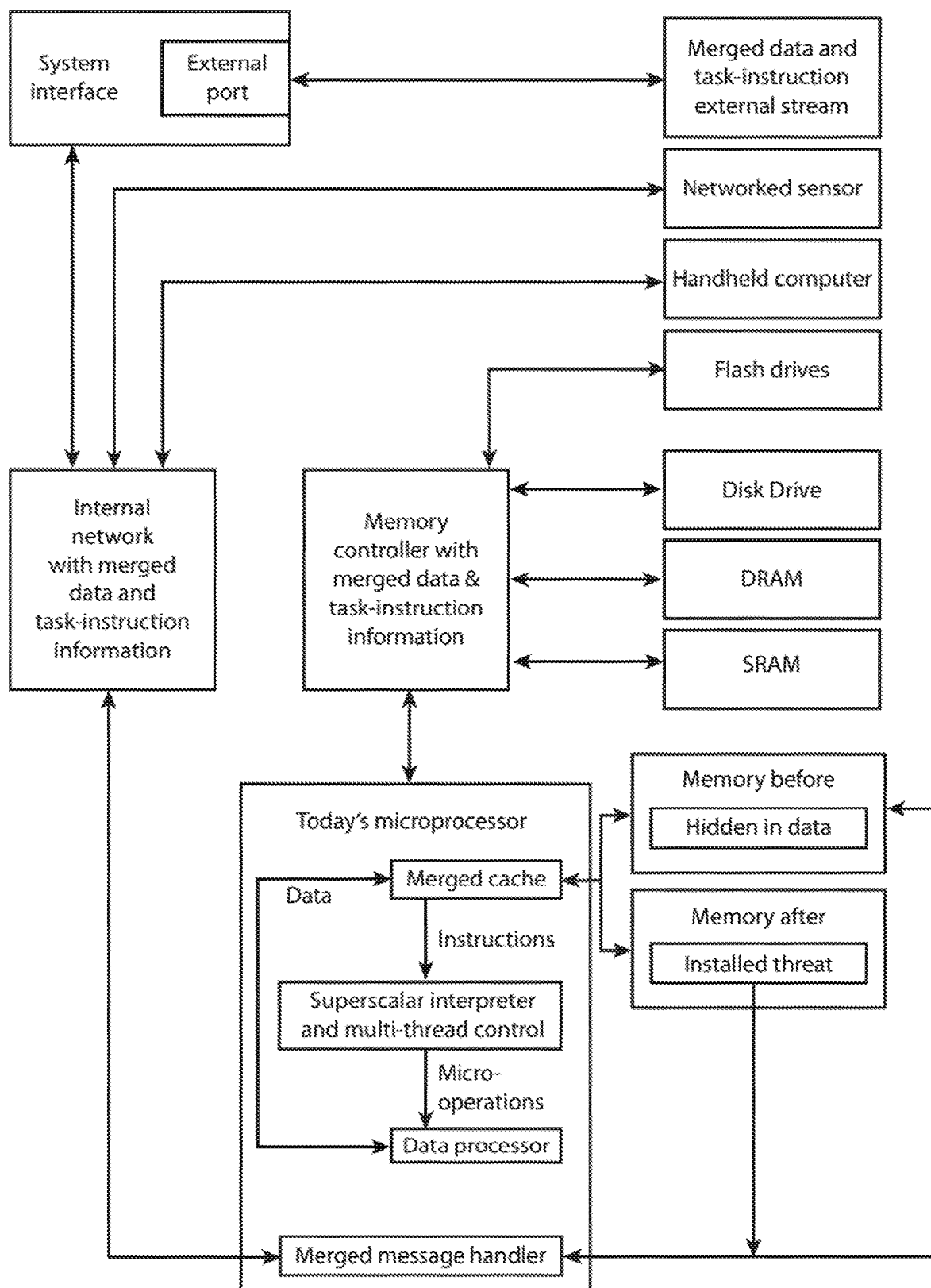
FIG. 39 shows a Prior Art example of the vulnerabilities of contemporary systems to infection by viruses and rootkits due to infected memory devices, messages and/or data operations.

FIG. 39 shows a Prior Art example of the vulnerabilities of contemporary systems to infection by viruses and rootkits due to infected memory devices, messages and/or data operations.

FIG. 40 shows a system in accord with the embodiments disclosed herein which is immune by construction to infection by data memory devices, data messages, and/or data operations.

FIG. 41A to FIG. 49 show some details related to the existing compiler and the new software toolchain of FIG. 12.

Figure 41A:
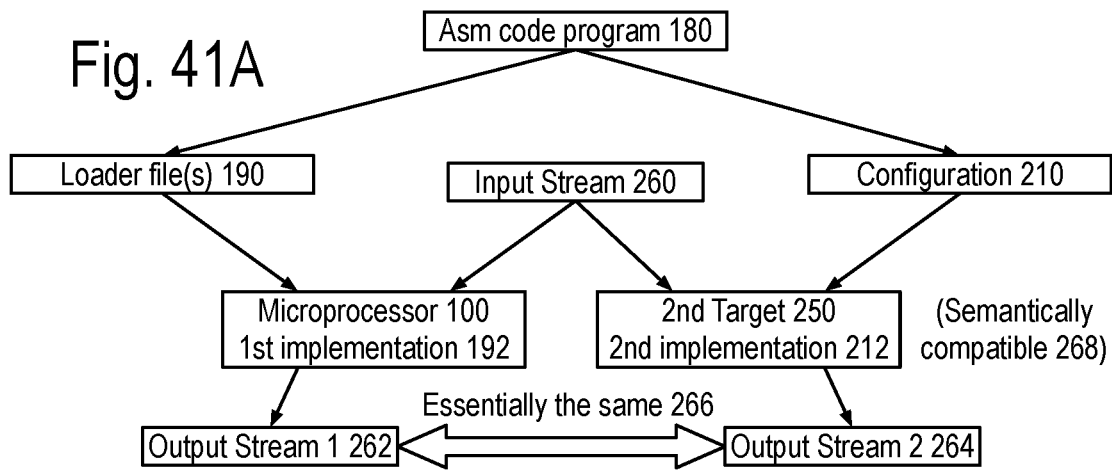
FIG. 41A, FIG. 41B, FIG. 42, FIG. 43.

FIG. 41A shows a definition of semantically compatibility between two implementations of the same assembly code program targeting two separate targets, the first target (represented as a microprocessor) and a second target.

Figure 41B:
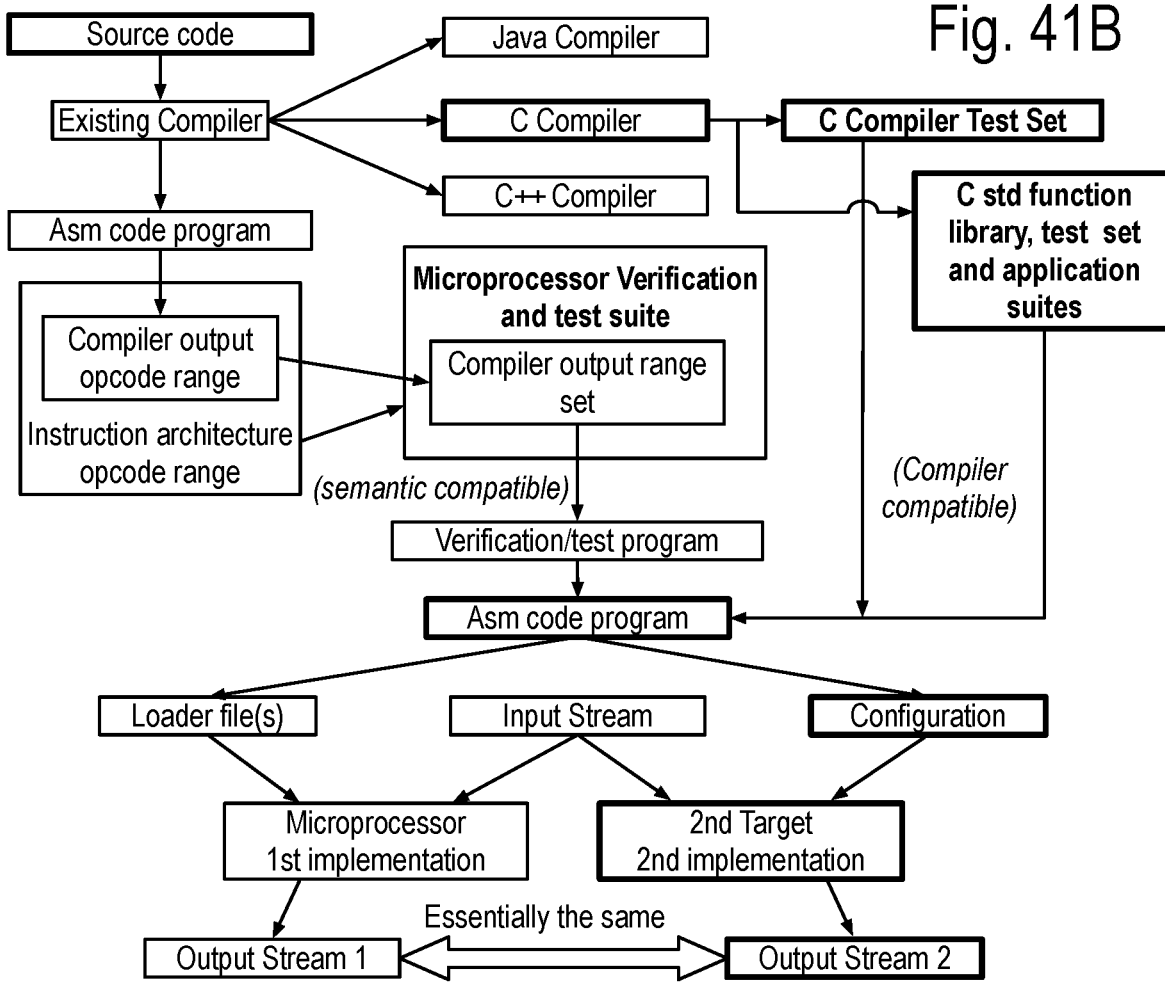

FIG. 41B shows a definition compiler compatibility using an existing compiler to generate the assembly code program. The assembly code program is then used to generate two implementations, which when run, generate essentially the same output streams. This can be implemented to prove to industrial standards that the first and second targets are compiler compatible for a programming languages such as C, C++ and/or Java, and possibly other languages.

Application and compiler compatibility with RISC V, an existing microprocessor, is a feature which enables rapid porting of the existing C/C++ program libraries. Today, the resistance of computer manufacturers to new architectures, in particular, non-von Neumann architectures, is based upon the enormous cost of porting applications. These new computers are incompatible with the old assembly languages and compilers targeting those assembly languages. It is essential for technology transfer and commercialization to overcome this resistance. Optimization of application development is directly served by C/C++ compiler compatibility. It enables rapid initial development on existing computers.

These debugged applications are then converted by the configuration tools of FIG. 12, starting with the assembly code level. This enables rapid development of all of the extensive software tools written in C/C++, which gives the system access to huge, pre-existing, debugged development libraries.

Existing C, C++, and Java compilers remain basically unchanged. The SiMulPro core (module) is semantically compatible with the RISC V and its assembly language as discussed regarding FIG. 41A and FIG. 41B. Each assembly language program generates two applications, one for the RISC V, and one for the SiMulPro core (module), without the RISC V's ISA. Semantic compatibility is verified and confirmed when both applications respond to the same input stream by generating essentially equal output streams. This develops stepwise refinements as successive FPGA emulations, confirming compatibility. Compiler compatibility is also shown in FIG. 7. Consider the C compiler. It has a compiler test set, the LLVM compiler test set, used today to confirm generated assembly code targeting the RISC V. The first step of verifying application compatibility, uses this C compiler test set, to verify semantic compatibility from its generated assembly language programs. A second step uses the assembly code programs of one, or more, C function libraries, each with their verification set, to extend verification, which continues to the C++ compiler, it's test sets, and so on. The verification can extend beyond the compiler output opcode range, to include more of the ISA. The verification and test set of the RISC V is publicly available.

This new software tool chain unifies all levels of the system, minimizing the complexity of the process, and the training required for application developers. Using the C and C++ compiler compatibility, the entire body of C/C++ program tools for High Performance Computers (HPC) can now be cost-effectively ported into this new operating environment. This allows already tested and proven software tools, the C and C++ gnu (of LLVM) compilers to be reused. It also allows access to the huge body of high performance software tools in these languages.

The thread collector activity replaces the RISC V's superscalar interpreter hardware, collecting threads of a program function as the assembler instructions between branches. This removes the superscalar interpreters from the hardware. These threads are then converted into simultaneous processes triggered by casting each process state into one or more Execution Wave Fronts traversing the typed SiMulPro core supporting its data type, such as integer or floating point. The thread source code is a translation of the microcode of the RISC V instructed resources, combined with translation of the primary loop constructs found in C and C++ (for loops, while do, and do while, constructs) into appropriate SiMulPro process primitives for these control structures. These constructs are very similar to the when do construct found in Hansen's Edison programming language for real time system programs.

The thread merge and place activity (initially manually performed) serves to merge the thread source code into simultaneous processes.

ASIC 1 may have 128 or more program threads which can be configured and placed at compile time, to address the varying big data workloads through a library of configurations. ASIC 1 can be reconfigured by the TWF in each SiMulPro core, with little or no overhead, because this occurs without interference during the EWFs of the active task.

Figure 42:
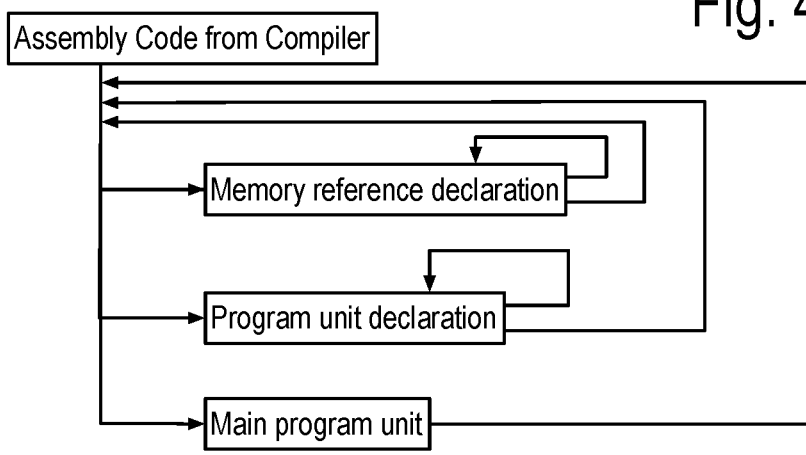

FIG. 42 shows an example of the assembly code from the compiler. In this and the subsequent drawings, to clarify and simplify this discussion, assume that the entire program is arranged as a single structure, which could be implemented in a variety of ways. The assembly code program can be considered to include a main program unit, possibly additional program unit declaration(s), and possibly memory reference declaration(s).

Figure 43:
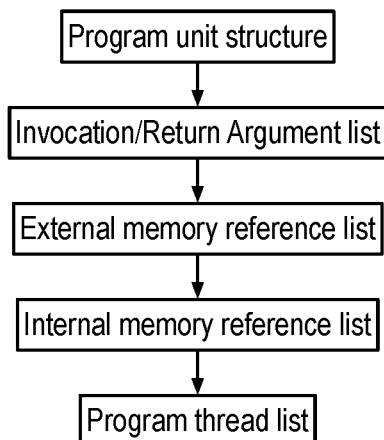

FIG. 43 shows an example of a program unit structure for a program unit of FIG. 42. The program unit structure may include any of the following an invocation and/or return argument list, an external memory reference list, an internal memory reference list, and/or a program thread list. While in many situations the structure may requires at least one of these components to be non-trivial, for the purposes of test, it may be useful to include each component with a null entry.

Figure 44:
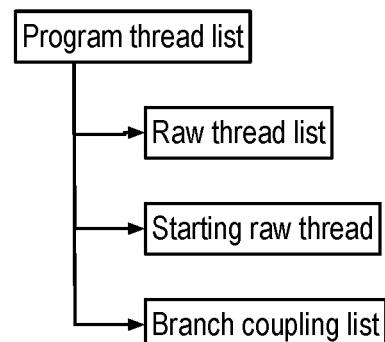

FIG. 44 shows some details of the program thread list of FIG. 43. The program thread list includes a raw thread list, a starting raw thread, and a branch coupling list.

Figure 45:
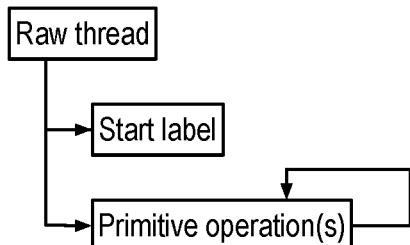

FIG. 45 shows an example of the raw thread implemented in FIG. 44 either as the starting raw thread and/or as a member of the raw thread list. In the simplest situation, a raw thread includes a start label. In many situations, the raw thread may further include at least one primitive operation.

Figure 46:
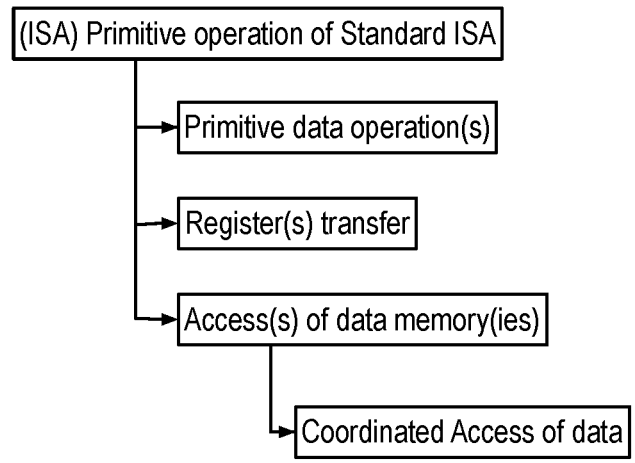

FIG. 46 shows an example of a primitive operation of a standard Instruction Set Architecture (ISA), which will in subsequent drawings be referred to as an ISA primitive operation. The ISA operation typically includes at least one primitive data operation, at least one register transfer, and possibly one or more accesses to data memory(ies). The access of data memory may further be a coordinated access of data, to share a result between two or more program threads. Note that again, there are situations in which one, or more, or all, of these components may be null. Also note that while this discussion does not address computer architectures which do not have registers, they can be addressed. They have not been discussed because they represent a very small part of the manufactured computers of today.

FIG. 47 shows an example of part of the thread collector utility as a process of primitive operation translation between the ISA primitive operation to a derived raw operation. Note that the register transfer(s) are transformed into internal feed operations and that the coordinated access of data is transformed into coordinated data feeds. Because the SiMulPro triggers action in a simultaneous processor based upon the availability of the coordinated feed of data, the threads of the program only act with the coordinated feed delivers its data, and no complex atomic access hardware mechanism is required.

FIG. 48 shows the raw thread translation of the thread collector using the primitive operation translation to transform the raw thread of FIG. 45 into the derived raw thread typically including derived raw operations essentially replacing the ISA primitive operations of the raw thread.

FIG. 49 shows a process of the thread collector known as data type partitioning which transforms derived raw operation(s) into a type partitioned raw operation(s).

The primitive data operation(s) of the derived raw operation(s) are transformed into type partitioned operation(s) of the type partitioned raw operation(s).

The internal feed operations of the derived raw operation(s) are transformed into the internal type partition feed operation(s) of the type partitioned raw operation(s).

The coordinated data feeds of the derived raw operation(s) are transformed into the coordinated typed data feeds or the type partitioned raw operation(s).

FIG. 50 shows an example C++ program unit without any input or output arguments, which acts upon a 2-D matrix A and a column vector B to form a row vector C. A, B and C elements are of floating point Type_1 and the internal Sum is of floating point Type_2. The comments on the right show the basic considerations to be discussed. Essentially, how big can M become before there is a significant chance of overwhelming rounding errors, or overflow.

FIG. 51 shows a table of potentially exemplary values for M, particularly for Type_1 being FP16, given the various choices for Type_2.

FIG. 52 shows the operational use of the SiMulPro cores of a core module of FIG. 4 implementing the type partitioned operations of FIG. 49. The integer core (or memory access processor) generates addresses, which are used to access the Big RAM, providing the FP16 core with data.

If the decision is made that Type_2 is FP16, then the accumulation is performed in the FP16 core. When completed, the result is stored back into the Big RAM.

If the decision is made that Type_2 is FP32, then the FP32 core receives and converts the data from FP16 to FP32 formats and accumulates the results. Once the accumulation is completed, the results are sent back to the FP16 core as FP16 numbers, which are then stored in the big RAM.

If Type_2 is FP64, then the FP32 core receives and converts the FP data to FP32 format, before sending the converted product data to FP64. The FP64 receives the data and it is converted to FP64 format, and interacts with an adder to accumulate the products. When completed, the result is sent to the FP32 core, converted to FP32 format, and then sent to the FP16 core, where it again is converted to FP16 format, before being stored in the Big RAM. Note that in some implementations, there may be separate feed paths implemented between the FP16 and FP64 cores.

The access request needed to setup all big memory interactions can be initiated by a single access request STAR message. Note also that the data fetched from the DRAM may be implemented as a sequence of block accesses of the 2-D matrix A and of the vectors B and C. Because of the size of the matrix and vectors, this may further be implemented using a Sum vector, which is the same size as the C vector, but of Type_2 floating point format, rather than Type-1. If these blocks are allocated to fit within one or more DRAM rows, then their access minimizes the energy and time required to fetch and send these blocks to wherever they are needed. The difference between a naïve approach to access of the matrix and vectors, and this block oriented approach, can reduce row access startup overhead by as much as a factor of 100.

What is claimed is:

1. An apparatus including:
   UA) a communication network consisting essentially of a task network and a data network, both implementing a Simultaneous Transmit And Receive (STAR) communications protocol, wherein said task network is communicatively separated from said data network,
      UA1) wherein a data message traversing said data network cannot alter a second task related message traversing said task network, and
      UA2) wherein said second task related message cannot alter said data message;
   UB) a core, a core module, a Programmable Execution Module (PEM), an ASIC, a chip, a Memory Access Processor (MAP), a Memory Access processor Module (MAM), a DRAM Data Unit (DDU) and/or a Task Control DRAM Unit (TCDU) including
      UB1) a task controller communicatively coupled to said task network and adapted to respond to at least one received task message to generate a Task Wave Front (TWF) issued to at least one instruction pipe, each instruction pipe containing at least one instructed resource further containing a task resource for each of at least two tasks, referred to as task 0 and task 1; and
      UB2) wherein said TWF includes a task command which can halt, run, or set which of said tasks is active, wherein no more than one of said tasks can be active at one time;
   UC) wherein said STAR message protocol implements a STAR message received in more than zero clock cycle and a STAR message transmitted in more than said zero clock cycle, simultaneously;
      U91) wherein said STAR messages are received in about one of said clock cycle; and
      U92) wherein said STAR messages are transmitted in about one of said clock cycle; and UD) wherein said apparatus further comprises a system including said ASIC, a first STAR optical bundle, a DRAM controller, a second STAR optical bundle, and a DRAM Unit array;
U2D) wherein said ASIC includes a STAR bundle module with an opto-transceiver interface to a first STAR optical bundle communicatively coupled to a DRAM controller; and
U2E) wherein said DRAM controller includes
U2E1) a first STAR bundle module optically interfaces to said first STAR optical bundle and
U2E2) a second STAR bundle module optically interfaced to said second STAR optical bundle.

2. The apparatus of claim 1, wherein at least one of said core, said core module, said PEM, said ASIC, said chip, said MAP, said MAM, said DDU and/or said TCDU implements at least one Simultaneous Multi-Processor (SiMulPro) core providing the $V^2LIW$ instruction processing to at least two of said instructed resources.

3. The apparatus of claim 2, wherein at least one of said instructed resource includes at least one of said task resources, which further includes a local literal table adapted and configurable to provide a literal, which cannot be altered by any of a data memory device, any of said data messages and any data operations.

4. The apparatus of claim 2, wherein at least one of said instructed resources responds to data received from an Execution Wave Front (EWF) to perform an arithmetic operation for a data type, wherein said data type at least implements said arithmetic operations of an Integer (Int) type, a Floating Point (FP) type and/or a Non-Linear Acceleration (NLA) type, wherein said arithmetic operations include multiplication of said data type and addition of said data type, with said instructed resource referred to as a typed arithmetic resource.

5. The apparatus of claim 1,
wherein said STAR messages are received in not more than a member of the group consisting essentially of one, two, four, eight, and ten clock cycles; and/or
wherein said STAR messages are transmitted in not more than a member of the group consisting essentially of one, two, four, eight, and ten of said clock cycles.

6. The apparatus of claim 1, said clock cycle has a period of not more than two nanosecond (ns) and more than zero of said ns.

7. The apparatus of claim 1,
U2F) wherein said DRAM Unit Array includes an optical interface to said second STAR optical bundle adapted and configured to bidirectionally communicate data at a bandwidth of at least 1 Terabit (TBit) per second and not exceeding a sustained bandwidth of each opto-transceiver in said optical interface; and
U2G) wherein said DRAM Unit array operates at least one half a Terabyte of DRAM and not exceeding a byte for each flop of said floating point performance of said ASIC and
U2H) wherein said DRAM Unit Array consumes an average of no more than 0.025 Watts per Gigabyte as a contemporary DRAM controller for a notebook and/or desktop computer;
U2I) wherein said sustained bandwidth is not more than Mbits Gigabits per second where Mbits a member of the group consisting of 50, 100 and 200.

8. The apparatus of claim 7, wherein said DRAM Unit Array includes a second optical interface to said second STAR optical bundle adapted and configured to bidirectionally communicate data at a bandwidth of at least one half TBits per second and not exceeding said sustained bandwidth of each opto-transceiver in said second optical interface.

9. The apparatus of claim 7, wherein said DRAM Unit array operates at most one Terabyte of said DRAM.

10. The apparatus of claim 7, wherein said system consumes on an average over one hour no more than N watts and more than 0 Watts, where N is a member of group consisting of 100, 50, 25, 12[period]5, 6[period]25 and 3[period]125.

11. The apparatus of claim 7, wherein at least one of said opto-transceiver is compliant with an Ethernet.

12. The apparatus of claim 11, wherein each of said opto-transceiver is compliant with said Ethernet.

13. The apparatus of claim 7, wherein at least one of said opto-transceiver is adapted to transmit and receive messages with a bandwidth of at least Nbits Gigabits per second and no more than Mbits Gigabits per second,
U25A) wherein said Nbits is no more than said Mbits,
U25B) wherein said Nbits is at least one member of the group consisting of 20, 40, 50, 60, 80, and 100, and
U25C) wherein said Mbits is at least one member of the group consisting of 50, 100 and 200.

14. The apparatus of claim 13, wherein each of said opto-transceiver is adapted to send and receive messages at said bandwidth.

15. An apparatus for optical communication, comprising:
U17A) a first chip coupled to a Simultaneous Transmit And Receive (STAR) message channel adapted for optical communication between said first chip and a second chip;
U17B) said STAR message channel comprising N optical fibers, each of said N of said optical fibers is coupled between said first chip and said second chip; wherein said N is at least two and not more than 128;
U17C) said first chip and said second chip, each include a channel core further comprising an incoming message processor and an outgoing message processor simultaneously processing optical signals across said N of said optical fibers, each adapted to communicate a sustainable bandwidth in both a first direction and a second direction; wherein said first direction is from said first chip to said second chip and said second direction is from said second chip to said first chip;
U17D) wherein each of said N of said optical fibers is simultaneously operated separately to insure time-offset transmission and time-offset delivery of said STAR messages in both of said first direction and said second direction to implement sending each of said STAR messages in no more than N1 clock cycles and receiving said STAR messages in no more than N2 clock cycles, respectively; and
U17E) wherein each of said STAR messages is communicated on exactly one of said optical fibers, said N1 and said N2 are both more than 0, and said N1 and said N2 are both not more than a member of the group consisting of 1, 2, 4, 8 and 10.

16. The apparatus of claim 15, wherein each of said first chip and said second chip retain at least a data package of every STAR message sent until it is confirmed to have been correctly received.

17. The apparatus of claim 16, further comprising at least one spare STAR message channel instance, with each of said optical fibers coupled between said first chip and said second chip; wherein said first chip and said second chip respond to said one retained STAR message sent being confirmed to have been incorrectly received by swapping one of said optical fibers in said STAR message channel with another one of said optical fibers in said spare STAR message channel instance.

18. The apparatus of claim 17, wherein each of said STAR messages consist essentially of a fixed length payload, a fixed length command and an Error Correcting Code (ECC), wherein said ECC forms a fraction F of the total of said fixed length payload, said fixed length command and said ECC; wherein said F is between 20% and 50%.

19. The apparatus of claim 18, wherein said first chip and said second chip respond to an increase in incorrectly received messages by increasing said F through altering said ECC of said STAR messages.

20. The apparatus of claim 15, wherein said second chip is an instance of said first chip.

* * * * *